(12) United States Patent
Aoyama et al.

(10) Patent No.: US 7,499,892 B2
(45) Date of Patent: Mar. 3, 2009

(54) INFORMATION PROCESSING APPARATUS, INFORMATION PROCESSING METHOD, AND PROGRAM

(75) Inventors: Kazumi Aoyama, Saitama (JP); Katsuki Minamino, Tokyo (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 459 days.

(21) Appl. No.: 11/397,299

(22) Filed: Apr. 4, 2006

(65) Prior Publication Data

US 2006/0230140 A1 Oct. 12, 2006

(30) Foreign Application Priority Data

Apr. 5, 2005 (JP) ............................. 2005-108185

(51) Int. Cl.
*G06E 1/00* (2006.01)
*G06E 3/00* (2006.01)
*G06F 15/18* (2006.01)
*G06G 7/00* (2006.01)
*G10L 15/00* (2006.01)
*G10L 15/16* (2006.01)
*G10L 15/06* (2006.01)
*G10L 15/04* (2006.01)

(52) U.S. Cl. ........................ 706/16; 901/46; 704/232; 704/243; 704/251

(58) Field of Classification Search .................. 706/15, 706/16; 901/48; 704/232, 243, 251
See application file for complete search history.

(56) References Cited

U.S. PATENT DOCUMENTS 5,729,662 A * 3/1998 Rozmus ........................ 706/20
2004/0103116 A1* 5/2004 Palanisamy et al. ...... 707/104.1

OTHER PUBLICATIONS

Rigoll, G. "Information Theory Principles for the design of self-orgnaizing maps in combination with hidden Markov Modeling for continuous speech recognition" Neural Networks, 1990. 1990 IJCNN International Joint Conference On. Jun. 17-21, 1990.*

* cited by examiner

*Primary Examiner*—David Vincent
*Assistant Examiner*—Ben M Rifkin
(74) *Attorney, Agent, or Firm*—Frommer Lawrence & Haug LLP; William S. Frommer; Thomas F. Presson

(57) ABSTRACT

An information processing apparatus includes a first learning unit adapted to learn a first SOM (self-organization map), based on a first parameter extracted from an observed value, a winner node determination unit adapted to determine a winner node on the first SOM, a searching unit adapted to search for a generation node on a second SOM having highest connection strength with the winner node, a parameter generation unit adapted to generate a second parameter from the generation node, a modification unit adapted to modify the second parameter generated from the generation node, a first connection weight modification unit adapted to modify the connection weight when end condition is satisfied, a second connection weight modification unit adapted to modify the connection weight depending on evaluation made by a user, and a second learning unit adapted to learn the second SOM based on the second parameter obtained when the end condition is satisfied.

7 Claims, 23 Drawing Sheets

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2005-108185 filed in the Japanese Patent Office on Apr. 5, 2005, the entire contents of which are incorporated herein by reference.

BACKGROUND OF THE INVENTION

1. Field of the Invention

The present invention relates to an information processing apparatus, an information processing method, and a program, and more particularly, to an information processing apparatus, an information processing method, and a program, which make it possible for a robot or the like to more properly generate information needed to actively change actions of the robot to adapt the actions to stimuli applied to the robot from the outside.

2. Description of the Related Art

For a robot expected to communicate with a human user via a voice, it is required to have a phoneme structure similar to the phoneme structure possessed by the user so that the robot can recognize phonemes uttered by the user and can utter phonemes similar to those uttered by the user. That is, the robot needs to be capable of recognizing speeches in a language spoken by the user and uttering speeches (by means of speech synthesis) in that language.

In a conventional speech recognition/synthesis technique, speeches in a language used by a user are recognized or synthesized using a dictionary of phonemes or words prepared depending on the language used by the user.

In human societies, different phonemes and languages are used depending on nations or areas. Thus, in techniques in which speech recognition or speech synthesis is performed using dictionaries that have been prepared in advance, it is necessary to prepare different dictionaries depending on nations or areas.

However, the preparation of dictionaries needs a huge cost. Thus, in the technology of robots that communicate with human users via voice, there has been in recent years a need to develop a technique to acquire phonological structures similar to those of human users via interactions such as dialogues with users without using dictionaries.

For example, in a paper entitled A Constructive Model of Mother-Infant Interaction towards Infant's Vowel Articulation" (Y. Yoshikawa, J. Koga, M. Asada, and K. Hosoda, Proc. of the 3rd International Workshop on Epigenetic Robotics, pp. 139-146, 2003 (hereinafter, this paper will be referred to as Non-Patent Document 1)), there is disclosed a robot that has an articulator and an auditory organ and that is capable of organizing itself by acquiring a phonological structure identical to that used in a human society via an interaction with a caregiver.

In the robot disclosed in Non-Patent Document 1, the articulator randomly generates parameters (motor commands) and utters sounds according to the generated parameters.

A user called a caregiver listens to the sounds uttered by the robot. If the caregiver recognizes a sound as being identical to one of phonemes used in a human society, the caregiver utters the phoneme so that the robot learns that the sound is identical to the phoneme. The learning is performed repeatedly so that the robot acquires many phonemes used in the human society.

The robot has a self-organization map associated with the auditory organ (hereinafter, referred to as the auditory SOM (Self-Organization Map) and a self-organization map associated with the articulator (hereinafter, referred to as the articulate SOM).

Each self-organization map (SOM) has a plurality of nodes, and each node has a parameter When input data (a parameter) is given to a self-organization map, a node having a parameter that is most similar to the input data is selected from all nodes (hereinafter, such a selected node will be referred to as a winner), and the parameter of the winner is modified so as to become more similar to the input data. In the self-organization map, parameters associated with nodes neighboring the winner node are also slightly modified toward the input data.

Thus, if a large number of input data is given to the self-organization map, the nodes in the self-organization map is organized such that nodes with similar parameters are located close to each other and nodes with dissimilar parameters are located far from each other. As a result, a map corresponding to a pattern of input data is formed in the self-organization map. Arranging of nodes in accordance with input data such that nodes whose parameters are similar to each other are located close to each other and a map is formed in accordance with patterns included in the input data is called self-organization.

In the technique disclosed in Non-Patent Document 1, the robot selects one of nodes in the articulate SOM, randomly changes the parameter of the selected node, and utters a sound according to the resultant parameter.

The caregiver listens to the sound uttered by the robot. If the caregiver recognizes the uttered sound as being identical to one of phonemes used in a human society, the caregiver utters the phoneme so that the robot understands that the sound is identical to the phoneme. If, in response to the sound uttered by the robot, the caregiver utters the same sound, the robot accepts the sound uttered by the caregiver as input data and determines a winner node for this input data in the auditory SOM. Furthermore, the auditory SOM (parameters associated with the node of interest and neighboring nodes) is modified, and the connection strength between the node of interest in the articulate SOM and the winner node in the auditory SOM is increased.

By performing the above-described process repeatedly, the articulate SOM and the auditory SOM are gradually established such that the connection between a node of the articulate SOM and a node of the auditory SOM, which is determined as a winner node for a sound uttered by the caregiver in response to listening to a sound generated in accordance with the parameter associated with the node of the articulate SOM, that is, the connection between the node of the articulate SOM associated with the parameter used by the robot to generate the sound and the node of the auditory SOM which is determined as the winner node for the sound which is uttered by the caregiver as the same sound as the sound generated by the robot is strengthened more greater than connections between other nodes. This makes it possible for the robot to acquire phonemes actually used in human societies and to output sounds similar to those input from the outside.

More specifically, when a voice is input to the robot from the outside, the robot searches for a node of the articulate SOM having the strongest connection with a node of the auditory SOM determined as a winner node for the input voice, and utters a sound in accordance with a parameter associated with the detected node of the articulate SOM.

In the technique disclosed in Non-Patent Document 1, the robot performs supervised learning such that when a sound uttered by the robot is identical to one of sounds actually used in a human society, the caregiver utters the same sound as that uttered by the robot to indicate that the sound is a right answer. In this technique, the robot cannot acquire phonemes unless the caregiver gives a right answer by uttering the same sound as that uttered by (a articulator of) the robot. In other words, it is impossible to perform unsupervised learning in which no right answers are given.

On the other hand, in a technique disclosed in "From Analogous to Digital Speech Sounds" (Oudeyer, P-Y, Tallerman M., editor, Evolutionary Pre-Requisites for Language. Oxford University Press, 2003) (hereinafter, this will be referred to as Non-Patent Document 2), learning is performed to acquire phonemes so that it becomes possible to generate phonemes from continuous sounds under as small a number of assumption as possible.

That is, in the learning method disclosed in Non-Patent Document 2, when there are a plurality of agents each having a auditory SOM corresponding to a auditory organ and a articulate SOM corresponding to a articulator wherein nodes of the auditory SOM and nodes of the articulate SOM are mapped (connected) to each other, initial values of parameters of respective nodes of the articulate SOM are given such that initial values are distributed uniformly and randomly over a parameter space (articulate space) before learning is started.

Note that before the learning is started, parameters associated with nodes of the articulate SOM are different among the plurality of agents.

In the learning, if a sound other than a sound uttered by a present agent, that is, a sound uttered by one of the other agents is input to the present agent, the present agent determines a winner node of the auditory SOM for the input sound and modifies parameters associated with nodes of the auditory SOM. The present agent then searches for a node of the articulate SOM having the strongest connection with the winner node of the auditory SOM and modifies the articulate SOM using the parameter associated with the detected node of the articulate SOM as a reference such that the parameter of each node of the articulate SOM becomes more similar to the parameter of the node of the articulate SOM having the strongest connection with the winner node of the auditory SOM.

Each agent selects a particular node of the articulate SOM possessed by the agent and utters a sound in accordance with a parameter associated with the selected node. If the same sound as that uttered by an agent is input to the agent, the agent determines a winner node of the auditory SOM for the input sound and increases the connection between the selected node of the articulate SOM and the winner node of the auditory SOM.

Via the repetition of the above process, the same set of sounds remains in each of the plurality of agents, that is, each agent acquires the same set of phonemes and all agents become capable of uttering the same set of phonemes.

The Non-Patent Document 2 also discloses that via the above-described learning, phonemes acquired by a plurality of agents converge on some phonemes.

Although the learning according to the technique disclosed in Non-Patent Document 2 is performed in the unsupervised learning mode in which no right answers are given, it is not intended to acquire phonemes actually used in a human society, and thus agents can not necessarily acquire same phonemes as those actually used in a human society. This is also true even when sounds uttered by a human user are input to each agent instead of sounds uttered by other agents.

This is because, in the learning according to the technique disclosed in Non-Patent Document 2, the modification of the articulate SOM is performed using parameters of some nodes of the articulate SOM as references (input), and thus parameters of nodes of the articulate SOM can change (can be modified) only within the range in which the initial values of parameters are distributed. To make it possible for each agent to acquire the same phonemes as those actually used in a human society, it is needed to give values distributed over the entire range, in which all phonemes used in the human society are included, as initial values of parameters of nodes of the articulate SOM. However, it is difficult to give such values.

It is troublesome for a user to give right answers on purpose to a robot that should acquire the same phoneme structure as that used by the user via dialogs between the user and the robot.

In view of the above, it is desirable that the robot should acquire the same phoneme structure as that used by the user via user-robot dialogs in which the user speaks without intention of giving right answers.

To acquire a phoneme structure in the above-described manner, the robot must be capable of adaptively behaving in response to stimuli applied to the robot, that is, the robot needs to adaptively speak depending on speeches of a user. That is, the robot needs to actively change a sound uttered as an action by the robot and self-evaluate the uttered sound, that is, the robot needs to evaluate (judges) whether the sound uttered by the robot is similar to the sound uttered by the user.

SUMMARY OF THE INVENTION

In view of the above, the present applicant has filed an application (Japanese Patent Application No. 2005-015533, hereinafter this application will be referred to simply as the previous application) in terms of a technique in which a robot or the like actively changes an action of the robot and self-evaluates the action to adapt the action to a stimulus given from an external world.

In the technique disclosed in the previous application, a self-organization algorithm using a combination of a HMM and SOMs is employed for self-organization maps associated with auditory sense and articulation (a auditory SOM and a articulate SOM), and the robot self-organizingly acquires phonemes used in a human society by imitating phonemes uttered by a user by using a framework using mapping between each node of the auditory SOM and each node of the articulate SOM (using a connection weight between each node of the auditory SOM and each node of the articulate SOM). With progress of acquiring phonemes, the robot becomes better capable of imitating phonemes.

That is, in the technique disclosed in the previous application, when a sound is input to the robot from the external world, the robot attempts to utter a sound similar to the input sound. If the robot succeeds in uttering a similar sound, a connection weight used to utter the sound is acquired. By repeatedly performing modification (learning) of connection weights, the robot becomes capable of uttering sounds substantially the same as those used in the external world. In other words, in the technique disclosed in the previous application, the robot learns connection weights based on the self-evaluation, that is, the robot optimizes the connection weights via unsupervised learning.

The learning method disclosed in the previous application makes it possible to establish proper mapping based on substantially only the self-evaluation.

However, the mapping established based on only the self-evaluation of the robot is not perfect, although it is highly proper. When the self-evaluation made by the robot is wrong, the robot cannot recognize that the self-evaluation is wrong, and thus mapping is established improperly.

More specifically, for example, when self-organization maps associated with auditory sense and articulation (the auditory SOM and the articulate SOM) and mapping (connection weights) between these self-organization maps are established via learning based on the self-evaluation made by the robot, if some phoneme such as "a" uttered by a human user is improperly related to a node of the articulate SOM corresponding to a wrong phoneme such as "e", it is very difficult (substantially impossible) to correct the wrong mapping by means of self-evaluation.

There is a possibility that a certain phoneme such as "u" actually used in a language is related to a node corresponding to a wrong phoneme, such as "v" that is not used in that language, on the articulate SOM. It is also very difficult (substantially impossible) to correct such wrong mapping by means of self-evaluation.

In conclusion, simple use of the learning method disclosed in the previous application can result in one of the following two types of errors.

A first type of error is that although a certain phoneme generated by the robot based on a articulate parameter is included in phonemes actually used in a human society, the phoneme is mapped to a wrong phoneme.

A second type of error is that a certain phoneme generated by the robot based on a articulate parameter is not included in phonemes actually used in a human society, and this phoneme is mapped to a particular phoneme actually used in the human society.

In view of the above, it is desirable to reduce the number of occurrences of errors of the first and second types to as low a level as possible, that is, it is desirable to make possible for the robot to establish more accurate mapping (connection weights) by actively changing actions of the robot to adapt the actions to stimuli applied to the robot from the outside.

In other words, it is desirable to make possible for the robot to more properly generate information (representing mapping or connection weight) needed to actively change actions of the robot to adapt the actions to stimuli applied to the robot from the outside.

According to an embodiment of the present invention, there is provided an information processing apparatus including connection network storage means for storing a connection network which includes a first self-organization map and a second self-organization map each including a plurality of nodes and which also includes connection weights indicating connection strengths of nodes between the first self-organization map and the second self-organization map, first learning means for learning the first self-organization map, based on a first parameter extracted from an observed value output by observation means that observes an external world and outputs the observed value, winner node determination means for detecting a node having highest likelihood that the first parameter is observed at the node in the first self-organization map and determining the detected node as a winner node, searching means for searching the second self-organization map for a node having highest connection strength with the winner node and employing the detected node as a generation node, parameter generation means for generating a second parameter from the generation node, determination means for determining whether an end condition is satisfied to end modification of the second parameter, the modification being performed in accordance with the winner node determined for a value which is observed by the observation means when driving means performs a driving operation in accordance with the second parameter, first connection weight modification means for modifying the connection weight when the end condition is satisfied, second connection weight modification means for modifying the connection weight when evaluation by a user on the result of driving performed by the driving means is given as a reward by the user, and second learning means for performing learning on the second self-organization map based on the second parameter obtained when the end condition is satisfied.

According to an embodiment of the present invention, there is provided an information processing method including the steps of based on a first parameter extracted from an observed value output by observation means that observes an external world and outputs the observed value, learning a first self-organization map stored in connection network storage means that stores a connection network which includes a first self-organization map and second self-organization map each including a plurality of nodes and which also includes connection weights indicating connection strengths of nodes between the first self-organization map and the second self-organization map, determining a winner node by detecting a node having highest likelihood that the first parameter is observed at the node in the first self-organization map and determining the detected node as the winner node, searching the second self-organization map for a node having highest connection strength with the winner node and employing the detected node as a generation node, generating a second parameter from the generation node, modifying the second parameter generated from the generation node, determining whether an end condition is satisfied to end modification of the second parameter, the modification being performed in accordance with the winner node determined for a value which is observed by the observation means when driving means performs a driving operation in accordance with the second parameter, modifying the connection weight when the end condition is satisfied, modifying the connection weight when evaluation by a user on the result of driving performed by the driving means is given as a reward by the user, and learning the second self-organization map based on the second parameter obtained when the end condition is satisfied.

According to an embodiment of the present invention, there is provided a program including the steps of based on a first parameter extracted from an observed value output by observation means that observes an external world and outputs the observed value, learning a first self-organization map stored in connection network storage means that stores a connection network which includes a first self-organization map and second self-organization map each including a plurality of nodes and which also includes connection weights indicating connection strengths of nodes between the first self-organization map and the second self-organization map, determining a winner node by detecting a node having highest likelihood that the first parameter is observed at the node in the first self-organization map and determining the detected node as the winner node, searching the second self-organization map for a node having highest connection strength with the winner node and employing the detected node as a generation node, generating a second parameter from the generation node, modifying the second parameter generated from the generation node, determining whether an end condition is satisfied to end modification of the second parameter, the modification being performed in accordance with the winner node determined for a value which is observed by the observation means when driving means performs a driving operation in accordance with the second parameter, modifying the connection weight when the end condition is satisfied, modifying the connection weight when evaluation by a user on the result of driving performed by the driving means is given as a reward by the user, and learning the second self-organization map based on the second parameter obtained when the end condition is satisfied.

In the present invention, based on the first parameter extracted from the observed value output by observation means that observes the external world and outputs the observed value, learning is performed on the first self-organization map stored in the connection network storage means that stores the connection network which includes the first self-organization map and the second self-organization map each including a plurality of nodes and which also includes connection weights indicating connection strengths of nodes between the first self-organization map and the second self-organization map. Of nodes of the first self-organization map, a winner node is determined which has highest likelihood that the first parameter is observed at the node, and a generation node, which is a node having the strongest connection with the winner node, is searched for from the second self-organization map. The second parameter generated from the generation node is then modified. Based on the winner node determined for the value observed by the observation means when the driving operation by the driving means is performed in accordance with the modified second parameter, the determination is made as to whether the end condition to end the process of modifying the second parameter is satisfied. If the end condition is satisfied, the connection weights are modified. When evaluation on the result of the driving operation performed by the driving means is given as a reward by the user, the connection weights are also modified. Furthermore, learning on the second self-organization map is performed based on the second parameter obtained when the end condition is satisfied.

As can be understood from the above discussion, the present invention provides great advantages. That is, the robot or the like can actively change its action and can self-evaluate the action to adapt the action to a stimulus given from the external world. That is, the robot can more properly generate (modify) information such as information representing mapping or connection weight needed to actively change actions of the robot to adapt the actions to stimuli applied to the robot from the external world.

DESCRIPTION OF THE PREFERRED EMBODIMENTS

Before embodiments of the present invention are described, correspondence between specific examples of parts/steps in the embodiments and those in the respective claims is described. This description is intended to assure that embodiment supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 14:
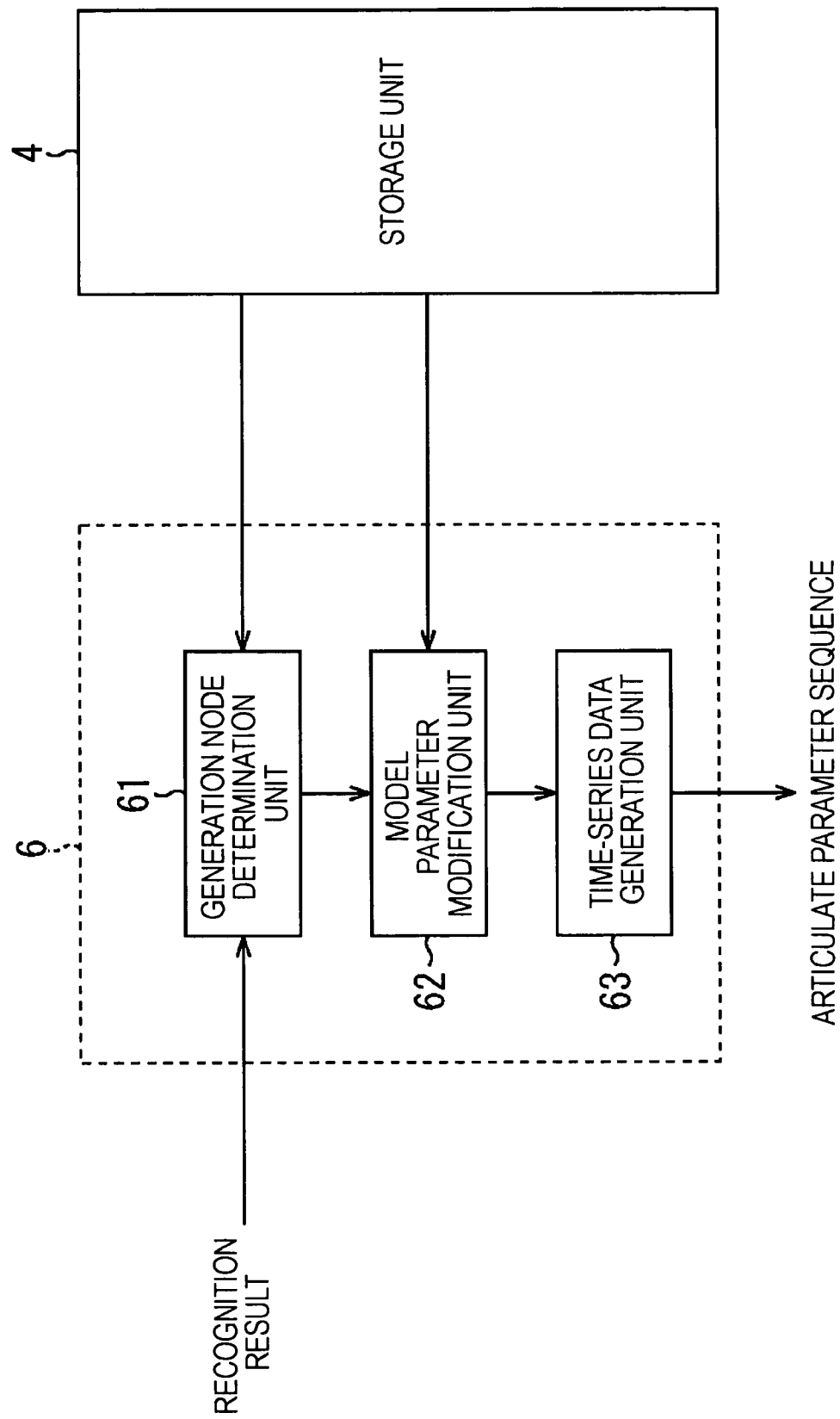
FIG. 14 is a block diagram showing an example of a structure of a generation unit.
Figure 16:
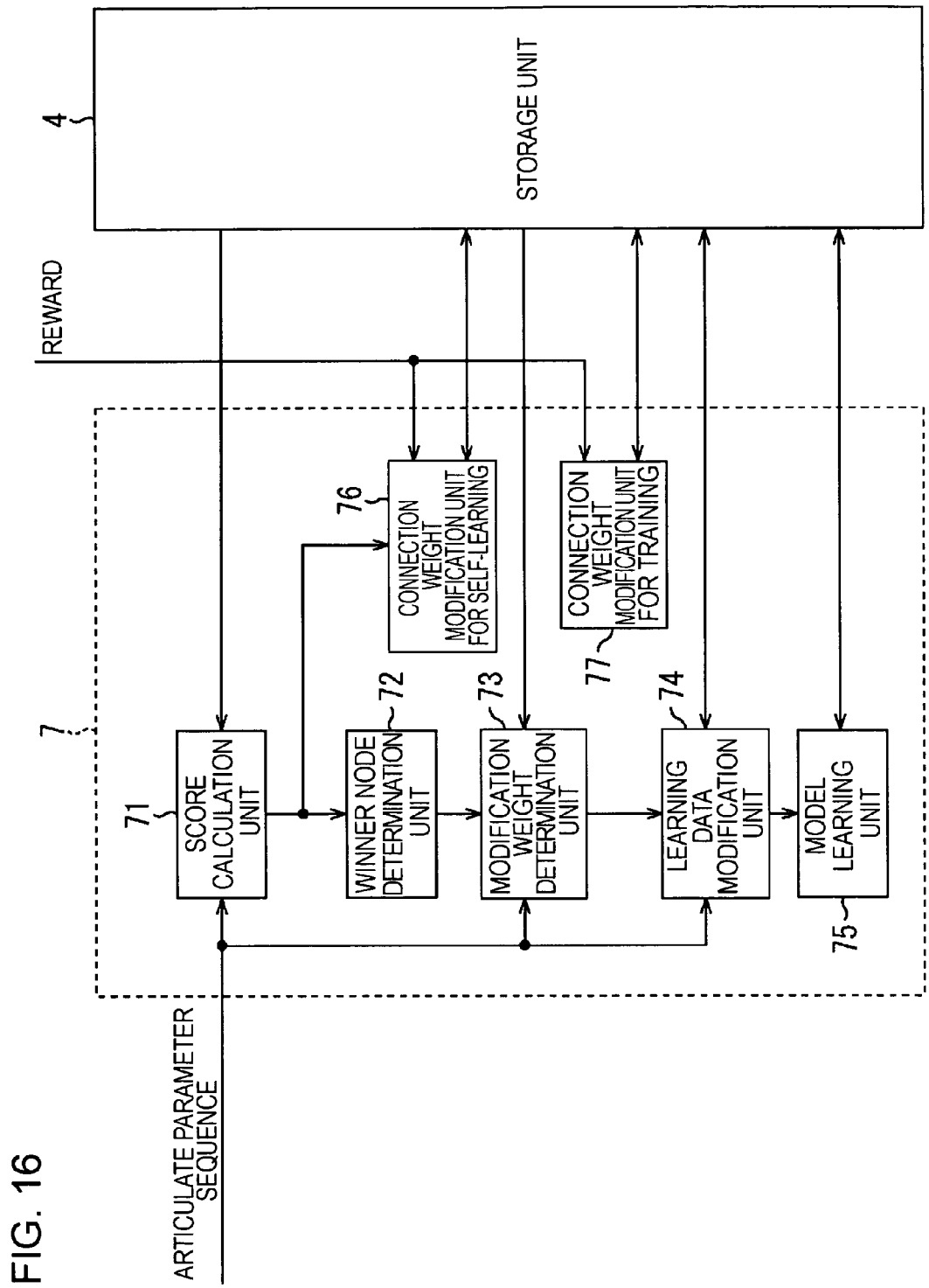
FIG. 16 is a block diagram showing an example of a structure of a learning unit.

According to an embodiment of the present invention, there is provided an information processing apparatus including connection network storage means (for example, a storage unit 4 shown in FIG. 1) for storing a connection network which includes a first self-organization map and a second self-organization map each including a plurality of nodes and which also includes connection weights indicating connection strengths of nodes between the first self-organization map and the second self-organization map, first learning means (for example, a learning unit 3 shown in FIG. 1) for observing an external world and performing learning of the first self-organization map based on a first parameter (for example, an acoustic parameter) extracted from an observed value output by observation means (for example, an observation unit 1 shown in FIG. 1), winner node determination means (for example, a winner node determination unit 52 shown in FIG. 12) for detecting a node having highest likelihood that the first parameter is observed at the node in the first self-organization map and determining the detected node as a winner node, searching means (for example, a generation node determination unit 61 shown in FIG. 14) for searching the second self-organization map for a node having highest connection strength with the winner node and employed the detected node as a generation node, parameter generation means (for example, a time-series data generation unit 63 shown in FIG. 14) for generating a second parameter (for example, a articulate parameter) from the generation node, modification means (for example, a model parameter modification unit 62 shown in FIG. 14) for modifying the second parameter generated from the generation node, determination means (for example, a control unit 9 shown in FIG. 1) for determining whether an end condition is satisfied to end modification of the second parameter, the modification being performed in accordance with the winner node determined for a value which is observed by the observation means when driving means (for example, a driving unit 8 shown in FIG. 1) performs a driving operation in accordance with the second parameter, first connection weight modification means (for example, a self-learning connection weight modification unit 76 shown in FIG. 16) for modifying the connection weight when the end condition is satisfied, second connection weight modification means (for example, a supervised learning connection weight modification unit 77 shown in FIG. 16) for modifying the connection weight when evaluation by a user on the result of driving performed by the driving means is given as a reward by the user, and second learning means (for example, a learning unit 7 shown in FIG. 1) for learning the second self-organization map based on the second parameter obtained when the end condition is satisfied.

Figure 17:
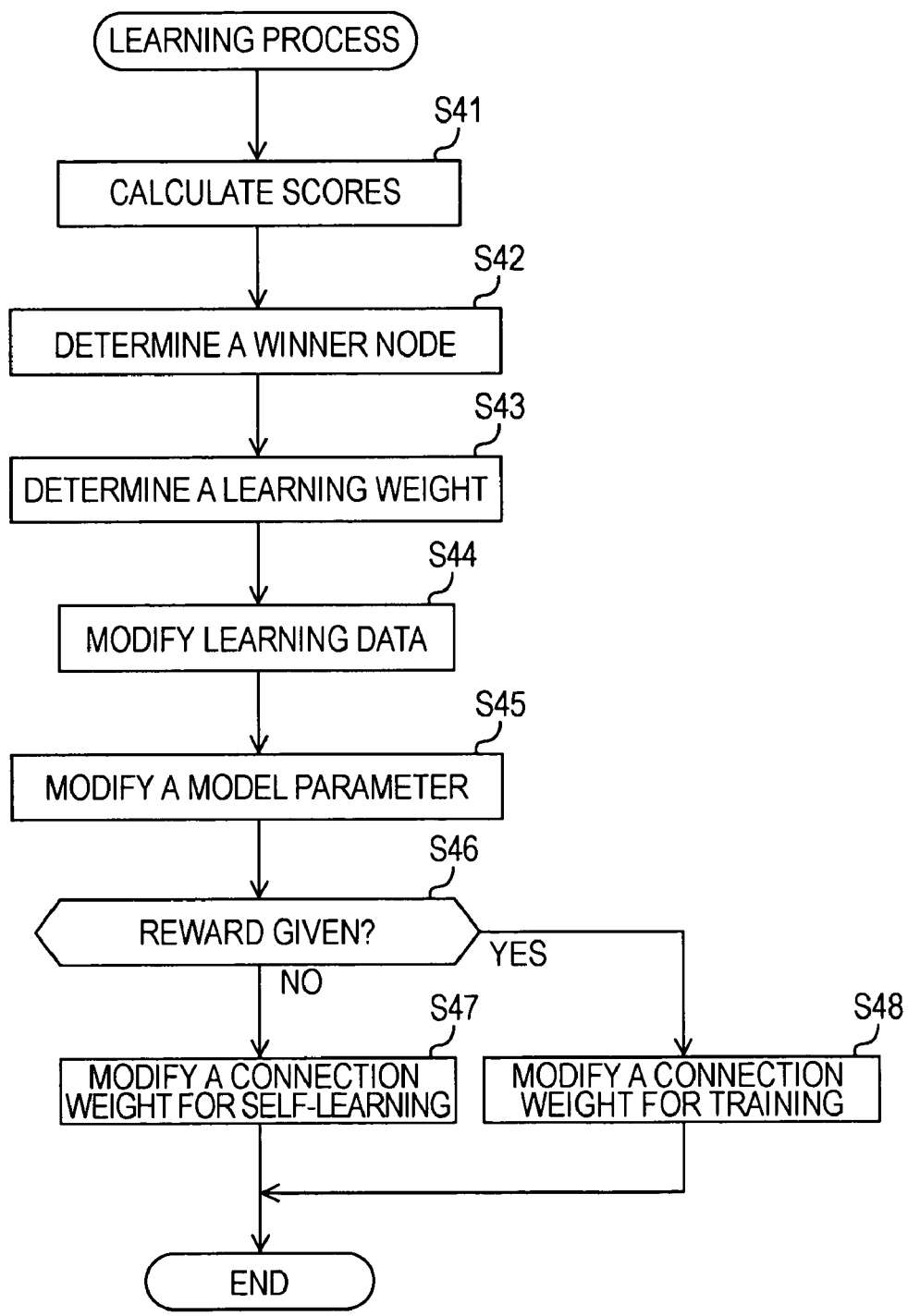
FIG. 17 is a flow chart showing a learning process performed by a learning unit.
Figure 18:
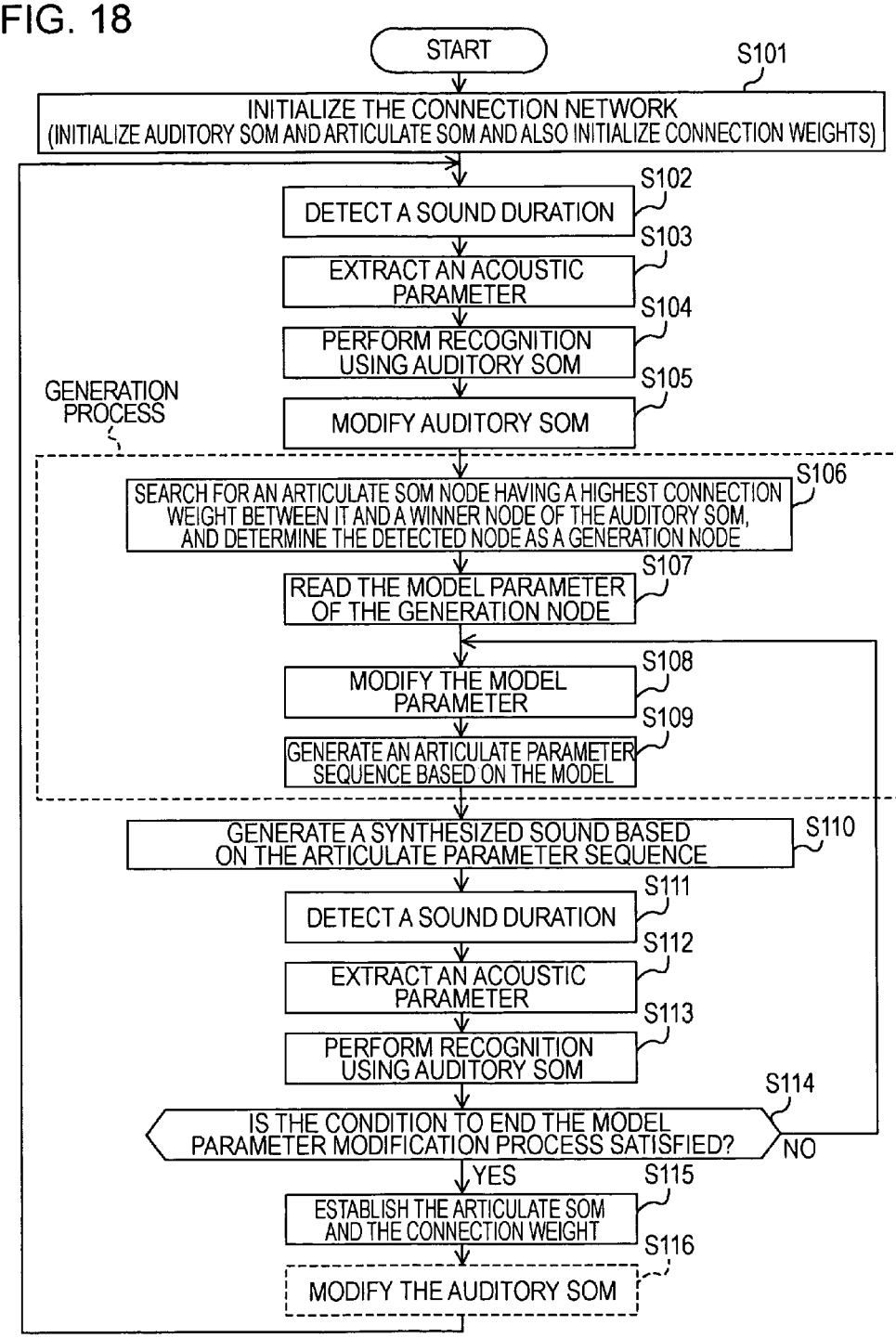
FIG. 18 is a flow chart showing an operation of an information processing apparatus.

According to an embodiment of the present invention, there is provided an information processing method including the steps of, based on a first parameter (for example, a acoustic parameter extracted from an observed value output by observation means (for example, a observation unit 1 shown in FIG. 1) that observes an external world and outputs the observed value, learning a first self-organization map stored in connection network storage means (for example, a storage unit 4 shown in FIG. 1) that stores a connection network which includes a first self-organization map and second self-organization map each including a plurality of nodes and which also includes connection weights indicating connection strengths of nodes between the first self-organization map and the second self-organization map (for example, in step S105 shown in FIG. 18), determining a winner node by detecting a node having highest likelihood that the first parameter is observed at the node in the first self-organization map and determining the detected node as the winner node (for example, in step S104 shown in FIG. 18), searching the second self-organization map for a node having highest connection strength with the winner node and employing the detected node as a generation node (for example, in step S106 shown in FIG. 18), generating a second parameter (for example, a articulate parameter) from the generation node (for example, in step S109 shown in FIG. 18), modifying the second parameter generated from the generation node (for example, in step S108 shown in FIG. 18), determining whether an end condition is satisfied to end modification of the second parameter, the modification being performed in accordance with the winner node determined for a value which is observed by the observation means when driving means (for example, a driving unit 8 shown in FIG. 1) performs a driving operation in accordance with the second parameter (for example, in step S114 shown in FIG. 18), modifying the connection weight when the ending condition is satisfied (for example, in step S47 shown in FIG. 17 performed in step S115 shown in FIG. 18), modifying the connection weight when evaluation by a user on the result of driving performed by the driving means is given as a reward by the user (for example, in step S48 shown in FIG. 17 performed in step S115 shown in FIG. 18), and learning the second self-organization map based on the second parameter obtained when the end condition is satisfied (for example, in step S45 performed in step S115 shown in FIG. 18).

According to an embodiment of the present invention, there is provided a program to be executed by a computer, the program including the steps of, based on a first parameter (for example, a acoustic parameter extracted from an observed value output by observation means (for example, a observation unit 1 shown in FIG. 1) that observes an external world and outputs the observed value, learning a first self-organization map stored in connection network storage means (for example, a storage unit 4 shown in FIG. 1) that stores a connection network which includes a first self-organization map and second self-organization map each including a plurality of nodes and which also includes connection weights indicating connection strengths of nodes between the first self-organization map and the second self-organization map (for example, in step S105 shown in FIG. 18), determining a winner node by detecting a node having highest likelihood that the first parameter is observed at the node in the first self-organization map and determining the detected node as the winner node (for example, in step S104 shown in FIG. 18), searching the second self-organization map for a node having highest connection strength with the winner node and employing the detected node as a generation node (for example, in step S106 shown in FIG. 18), generating a second parameter (for example, a articulate parameter) from the generation node (for example, in step S109 shown in FIG. 18), modifying the second parameter generated from the generation node (for example, in step S108 shown in FIG. 18), determining whether an end condition is satisfied to end modification of the second parameter, the modification being performed in accordance with the winner node determined for a value which is observed by the observation means when driving means (for example, a driving unit 8 shown in FIG. 1) performs a driving operation in accordance with the second parameter (for example, in step S114 shown in FIG. 18), modifying the connection weight when the ending condition is satisfied (for example, in step S47 shown in FIG. 17 performed in step S115 shown in FIG. 18), modifying the connection weight when evaluation by a user on the result of driving performed by the driving means is given as a reward by the user (for example, in step S48 shown in FIG. 17 performed in step S115 shown in FIG. 18), and learning the second self-organization map based on the second parameter obtained when the end condition is satisfied (for example, in step S45 performed in step S115 shown in FIG. 18).

Now, specific embodiments according to the present invention are described below with reference to the accompanying drawings.

Figure 1:
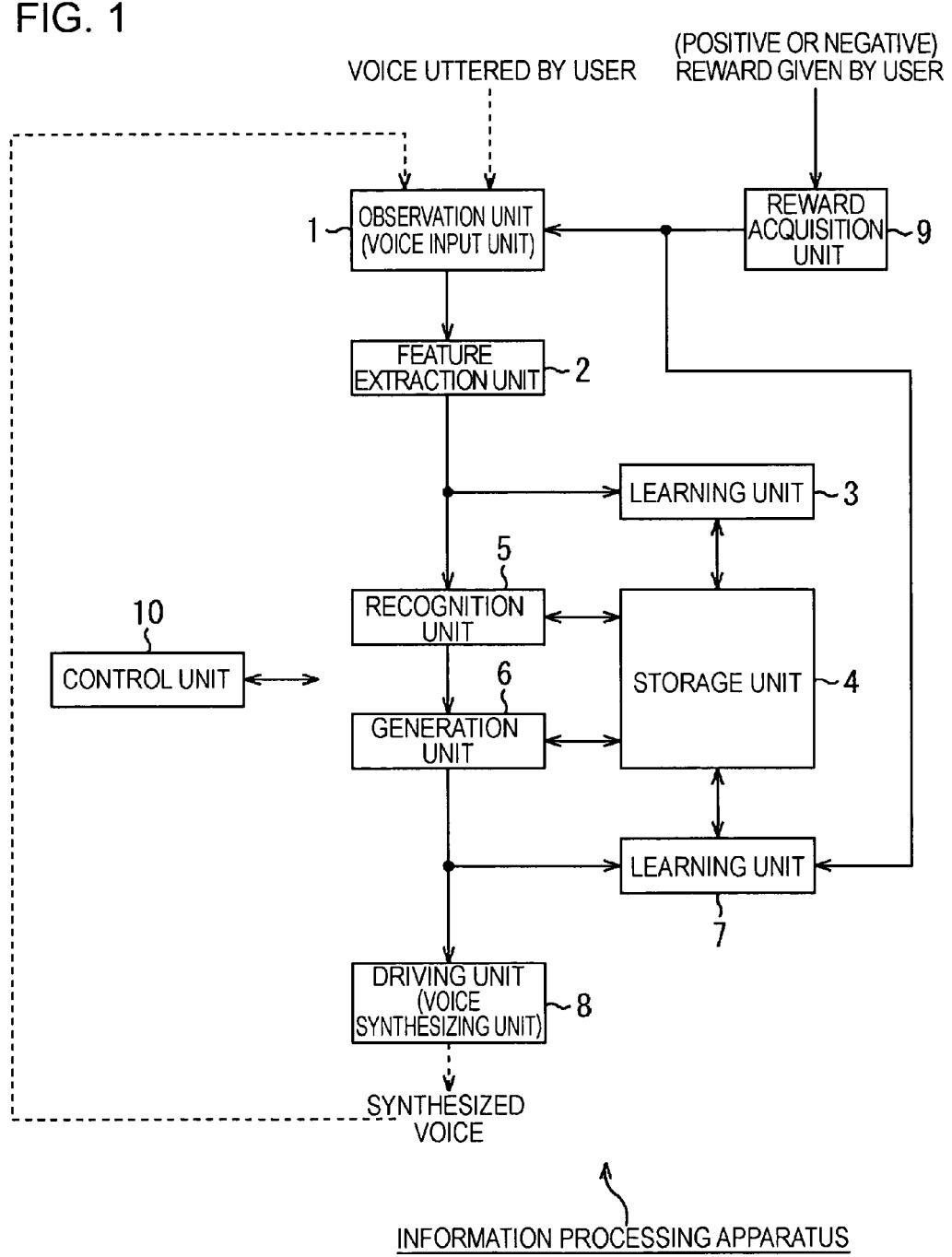
FIG. 1 is a block diagram showing an information processing apparatus according to an embodiment of the present invention.

FIG. 1 shows an information processing apparatus according to an embodiment of the present invention.

This information process apparatus may be applied, for example, to a part responsible for a process associated with a voice/sound of a robot such as a bipedal or quadrupedal walking robot.

A observation unit 1 observes an external world and outputs an observed value. The observation unit 1 includes, for example, a sensor such as a microphone for detecting a voice (sound), an amplifier, and an analog-to-digital converter. If the observation unit 1 detects a voice uttered by a user and other sounds, the observation unit 1 supplies obtained voice/sound data indicating an observed value to a feature extraction unit 2.

Note that in the above-descried process, the observation unit 1 detects a sound duration of a voice (sound) input from the outside, and supplies voice/sound data detected in the sound duration to the feature extraction unit 2. However, it is not necessarily needed that the voice/sound data supplied from the observation unit 1 to the feature extraction unit 2 should have a length equal to the sound duration but the voice/sound data may have a properly determined length. For example, the observation unit 1 may supply voice/sound data to the feature extraction unit 2 in units of phonemes, words, sentences, or phrases delimited by pauses. The voice/sound data supplied from the observation unit 1 to the feature extraction unit 2 may be delimited by a fixed method or a variable method.

Although in the present embodiment, it is assumed that the observation unit 1 observes voices/sounds that occur in the external world, such as a voice uttered by a user, and the observation unit 1 outputs voice/sound data as observed values, the event subjected to observation is not limited to voices/sounds. For example, the observation unit 1 may include a camera serving as a sensor to observe light occurring in the external world and may output image data as observed values. Alternatively, the observation unit 1 may include a sensor for observing another physical quantity such as ambient temperature, pressure applied from the outside, etc.

There are two types of voices/sounds observed by the observation unit 1. Voices/sounds of the first type is those uttered by a user, and voices/sounds of the second type are those output (synthesized) by a driving unit 8 that will be described later. Voices/sounds output by the driving unit 8 are further classified into two groups; voices/sounds to which a reward is given by the user, and voices/sounds to which no reward is given by the user. Note that the information processing apparatus shown in FIG. 1 is constructed such that the reward acquired by a reward acquisition unit 9 is supplied not only to a learning unit 7 (described in detail later) but also to the observation unit 1 so that, as required, the observation unit 1 can supply information indicating whether a reward has been given together with voice/sound data to the feature extraction unit 2.

The feature extraction unit 2 extracts a feature value (a first parameter) from the data output from the observation unit 1 and outputs the extracted feature value to a learning unit 3 and a recognition unit 5. That is, the feature extraction unit 2 extracts an acoustic parameter as the feature value of the voice/sound data output from the observation unit 1 and supplies the extracted acoustic parameter to the learning unit 3 and the recognition unit 5. More specifically, the feature extraction unit 2 periodically performs a process such as frequency analysis on the voice/sound data supplied from the observation unit 1 to extract an acoustic parameter such as a MFCC (Mel Frequency Cepstrum Coefficient) suitable for speech recognition, and the feature extraction unit 2 supplies the extracted acoustic parameter to the learning unit 3 and the recognition unit 5.

Because the voice/sound data supplied from the observation unit 1 to the feature extraction unit 2 is in the form of time-series data and the acoustic parameter output by the feature extraction unit 2 is obtained by periodically performing the process on the voice/sound data in the form of time-series data, the acoustic parameter output by the feature extraction unit 2 is also in the form of time-series data.

Hereinafter, the acoustic parameter in the form of time-series data will be referred to simply as the acoustic parameter sequence.

Based on the acoustic parameter sequence supplied from the feature extraction unit 2, the learning unit 3 performs learning (modification) in terms of a auditory SOM, which is a self-organization map associated with a connection network and which is stored in a storage unit 4. The details of the auditory SOM will be described later.

More specifically, a large number of acoustic parameter sequences are input to the learning unit 3 from the feature extraction unit 2, and the learning unit 3 acquires representative patterns (time-series patterns) that feature the large number of acoustic parameter sequences in a self-organizing manner by means of unsupervised learning. As a result, patterns representative of a large number of acoustic parameter sequences supplied from the feature extraction unit 2 to the learning unit 3 are stored in a highly efficient manner in the auditory SOM associated with the connection network stored in the storage unit 4. That is, the acoustic parameter sequences supplied from the feature extraction unit 2 to the learning unit 3 and the recognition unit 5 can be classified into representative patterns (time-sequence patterns), and the learning unit 3 performs learning to store representative time-sequence patterns of the acoustic parameter sequences in the auditory SOM.

The storage unit 4 also stores the connection network. The connection network includes the auditory SOM and the articulate SOM, which are self-organization maps each including a plurality of nodes, and connection weights indicating connection strengths among nodes of the auditory SOM and nodes of the articulate SOM. The details of the connection network will be described later.

The recognition unit 5 performs a speech recognition process on the voice/sound observed by the observation unit 1, using the acoustic parameter sequence supplied from the feature extraction unit 2 in accordance with the auditory SOM associated with the connection network stored in the storage unit 4, and the recognition unit 5 supplies the recognition result of the voice/sound to a generation unit 6.

Based on the recognition result supplied from the recognition unit 5, the generation unit 6 searches the storage unit 4 for a particular node of the articulate SOM associated with the connection network. Using the detected node, the generation unit 6 then generates an articulate parameter serving as a second parameter to drive a driving unit 8, and supplies the generated articulate parameter to the learning unit 7 and the driving unit 8.

The articulate parameter output by the generation unit 6 is also in the form of time-series data as with the acoustic parameter output by the feature extraction unit 2. Hereinafter, the articulate parameter in the form of time-series data will be referred to as the articulate parameter sequence.

Note that the parameter generated by the generation unit 6 is used to drive the driving unit 8, and there is no particular restriction on the type of the parameter generated by the generation unit 6 as long as the parameter can be accessed by the driving unit 8. For example, when the driving unit 8 is a motor that accepts a command indicating a rotation angle or a rotation velocity and that rotates in accordance with the command, the command is generated as the parameter by the generation unit 6. In a case in which the driving unit 8 is a voice synthesizer that synthesizes a voice in accordance with input vector whose elements include a phoneme, an accent, a pitch frequency, etc. associated with a voice waveform to be generated, the vector is generated as the parameter by the generation unit 6.

Based on the articulate parameter sequence supplied from the generation unit 6, the learning unit 7 performs learning (modification) in terms of the articulate SOM that is a self-organization map associated with the connection network stored in the storage unit 4, in a similar manner to the learning on the auditory SOM performed by the learning unit 3.

The learning unit 7 also performs learning (modification) in terms of the connection weights associated with the connection network stored in the storage unit 4. As will be described in detail later, the learning (modification) of the connection weights is performed in a supervised mode or an unsupervised mode. In the unsupervised learning mode, learning is performed based on self-evaluation on voices/sounds output (synthesized) by the information processing apparatus. In the supervised learning mode, voices/sounds output (synthesized) by the information processing apparatus are evaluated by a user, and rewards are given by the user depending on the evaluation. Using the given reward as a training signal, learning is performed.

The driving unit 8 performs the driving operation in accordance with the articulate parameter supplied from the generation unit 6. More specifically, the driving unit 8 includes, for example, a voice synthesizer, and an amplifier, a digital-to-analog converter, and a speaker, and the driving unit 8 synthesizes a voice in accordance with the articulate parameter and outputs the resultant synthesized voice.

As for the voice synthesizing apparatus used as the driving unit 8, a module of a TTS (Text To Speech) adapted to synthesize a voice corresponding to input text information, that is, a module adapted to synthesize a voice in accordance with a vector obtained as a result of analysis on input text information may be employed. In this case, the articulate parameter sequence is a time-series of vectors obtained based on the result of analysis on input text data.

Although in the present embodiment, the voice synthesizing apparatus is employed as the driving unit 8 to generate synthesized sounds, the driving unit 8 is not limited to the voice synthesizing apparatus. For example, an actuator (motor) may be employed as the driving unit 8 to move a part such as an arm or a foot of the robot. In this case, a parameter used to drive the actuator is generated and supplied to the learning unit 7 and the driving unit 8.

The reward acquisition unit 9 acquires evaluation given as a reward by a user on the synthesized voice output by the information processing apparatus itself, and the reward acquisition unit 9 supplies the acquired evaluation to the observation unit 1 a the learning unit 7. As will be described later in further detail, there are two types of rewards, one of which is a positive reward that is given when the user evaluates that the synthesized voice output by the information processing apparatus is substantially equal to the voice input from the outside, and the other type is a negative reward that is given when the user evaluates that the synthesized voice is different from the voice input from the outside.

A control unit 10 receives necessary data (information) from various parts (including the observation unit 1 to the reward acquisition unit 9), and the control unit 10 controls the respective parts (including the observation unit 1 to the reward acquisition unit 9) in accordance with the received data. The control unit 10 is connected to the respective parts (including the observation unit 1 to the reward acquisition unit 9) via a connection line to transmit/receive data to/from them. However, for the purpose of simplicity, the connection line is not shown in FIG. 1.

Figure 2:
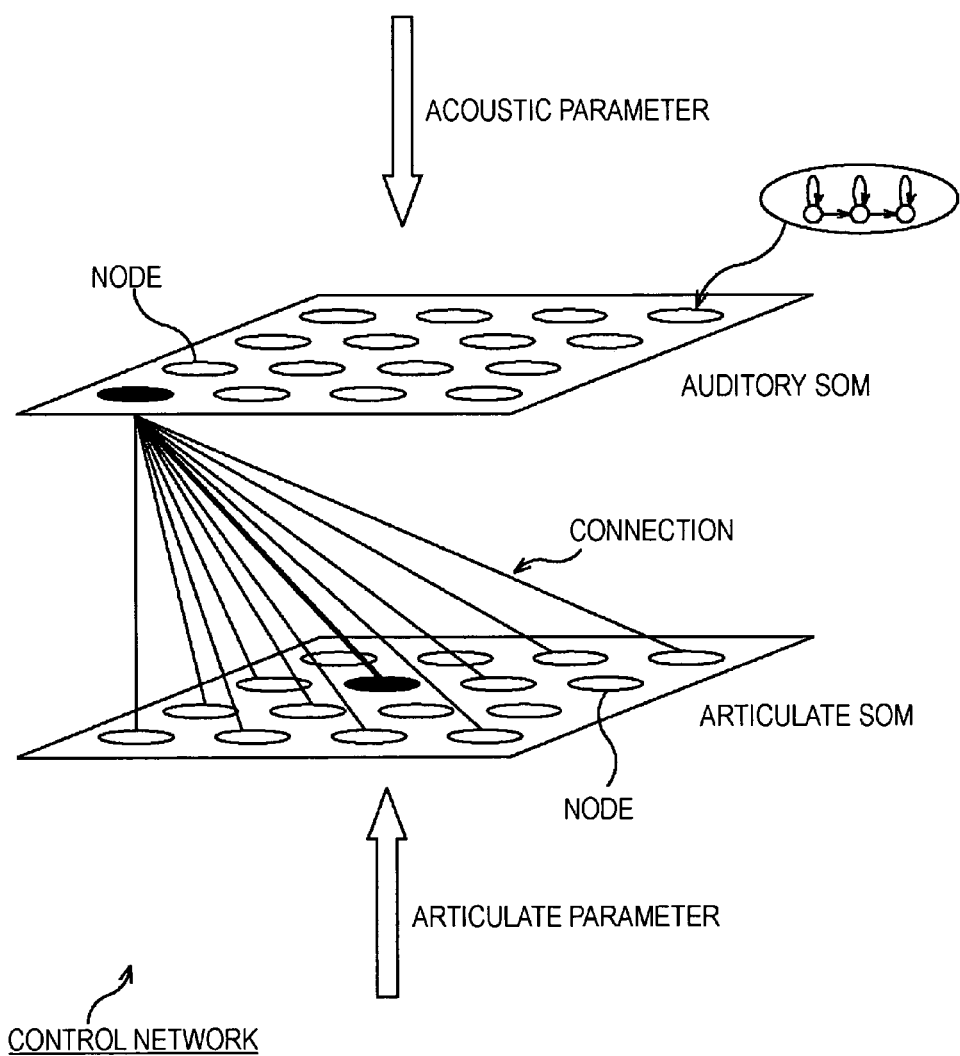
FIG. 2 is a diagram showing an example of a structure of a connection network.

FIG. 2 is a schematic diagram showing an example of a structure of the connection network stored in the storage unit 4 shown in FIG. 1.

As described above, the connection network includes the auditory SOM, the articulate SOM, and connection weights.

The auditory SOM and the articulate SOM are self-organization maps each including a plurality of nodes. In conventional self-organization maps, each node of each self-organization map has a parameter, and each parameter is in the form of a vector with a particular number of elements. In contrast, in the self-organization maps of the auditory SOM and the articulate SOM associated with the connection network, each node of each self-organization map has a time-series pattern model representing a time-series pattern. The details of the self-organization maps of the auditory SOM and the articulate SOM associated with the connection network will be described later.

Figure 3:
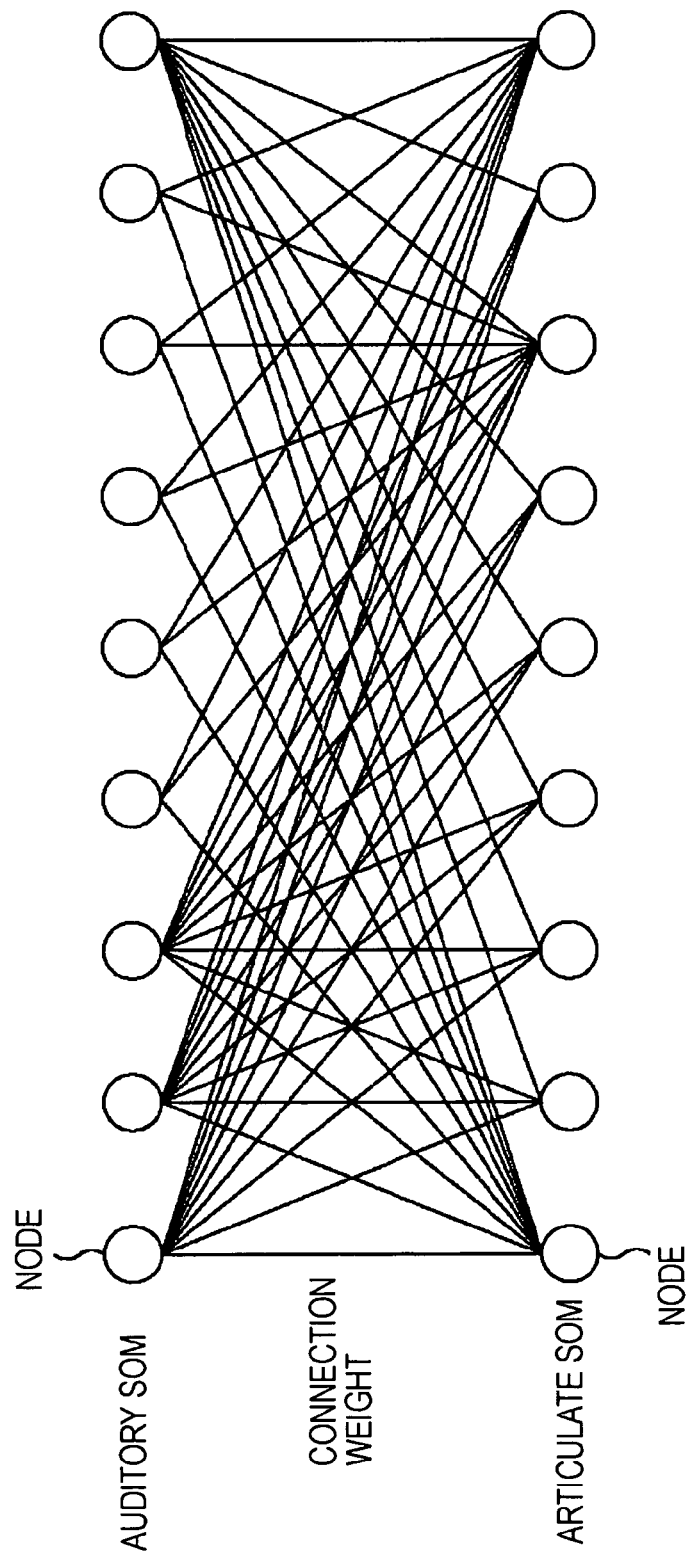
FIG. 3 shows a manner in which each node of a auditory SOM is connected with all nodes of a articulate SOM.

In the auditory SOM and the articulate SOM associated with the connection network, as shown in FIG. 3, each node of the auditory SOM is connected to all nodes of the articulate SOM. In the connection network, a connection weight indicating the connection strength between each node of the auditory SOM and each node of the articulate SOM is defined.

The self-organization maps of the connection network, that is, the auditory SOM and the articulate SOM, form a network including a plurality of nodes each having a time-series pattern model representing a time-series pattern, and thus they can be said to be a time-series pattern storage network in which time-series patters are stored. The time-series pattern storage network stores as many (clustering) time-series patterns as there are nodes in the time-series pattern storage network.

Figure 4:
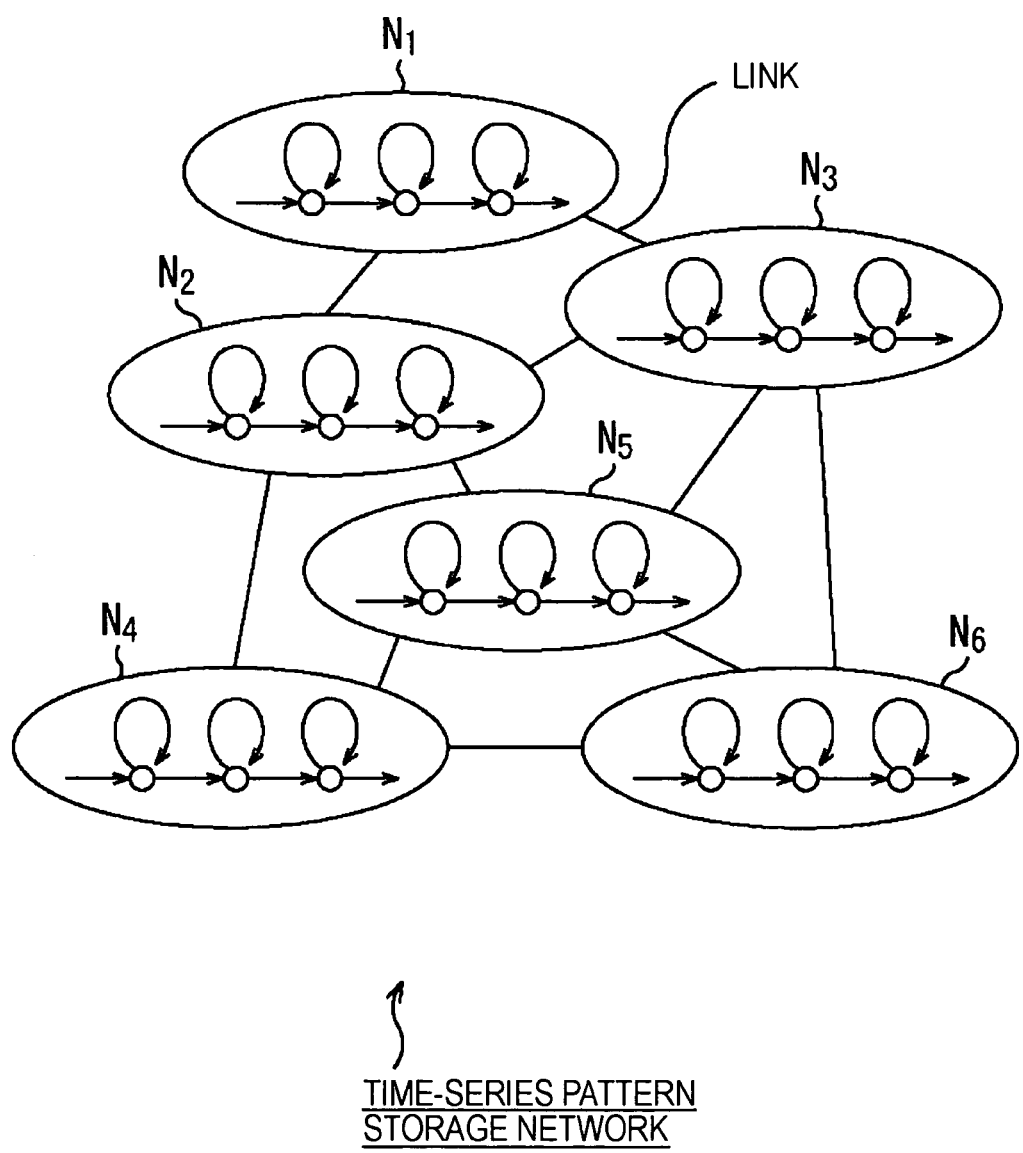
FIG. 4 shows an example of a structure of a auditory SOM (articulate SOM)

FIG. 4 is a schematic diagram showing an example of a time-series pattern storage network.

In the example shown in FIG. 4, the time-series pattern storage network includes six nodes N1 to N6.

Each node Ni (i=1, 2, . . . , 6 in the example shown in FIG. 4) of the time-series pattern storage network has a time-series pattern mode representing a time-series pattern. Each node Ni may has a connection with another node Nj (j=1, 2, . . . , 6 in the example shown in FIG. 4). This connection is referred to as a link. In the time-series pattern storage network shown in FIG. 5, for example, a node N1 is directly linked with nodes N2 and N3. On the other hand, a node N3 is directly linked with nodes N1, N2, N5 and N6, and thus the nodes N5 and N6 are indirectly linked with the node N1 via the node N3. The connection relationship between two nodes Ni and Nj is defined by a shortest connection path between the two nodes Ni and Ni.

Learning of the time-series pattern storage network is performed using time-series data as learning data in an unsupervised learning mode in which a right answer indicating a category (class) to which the learning data belongs is not given.

Figure 5:
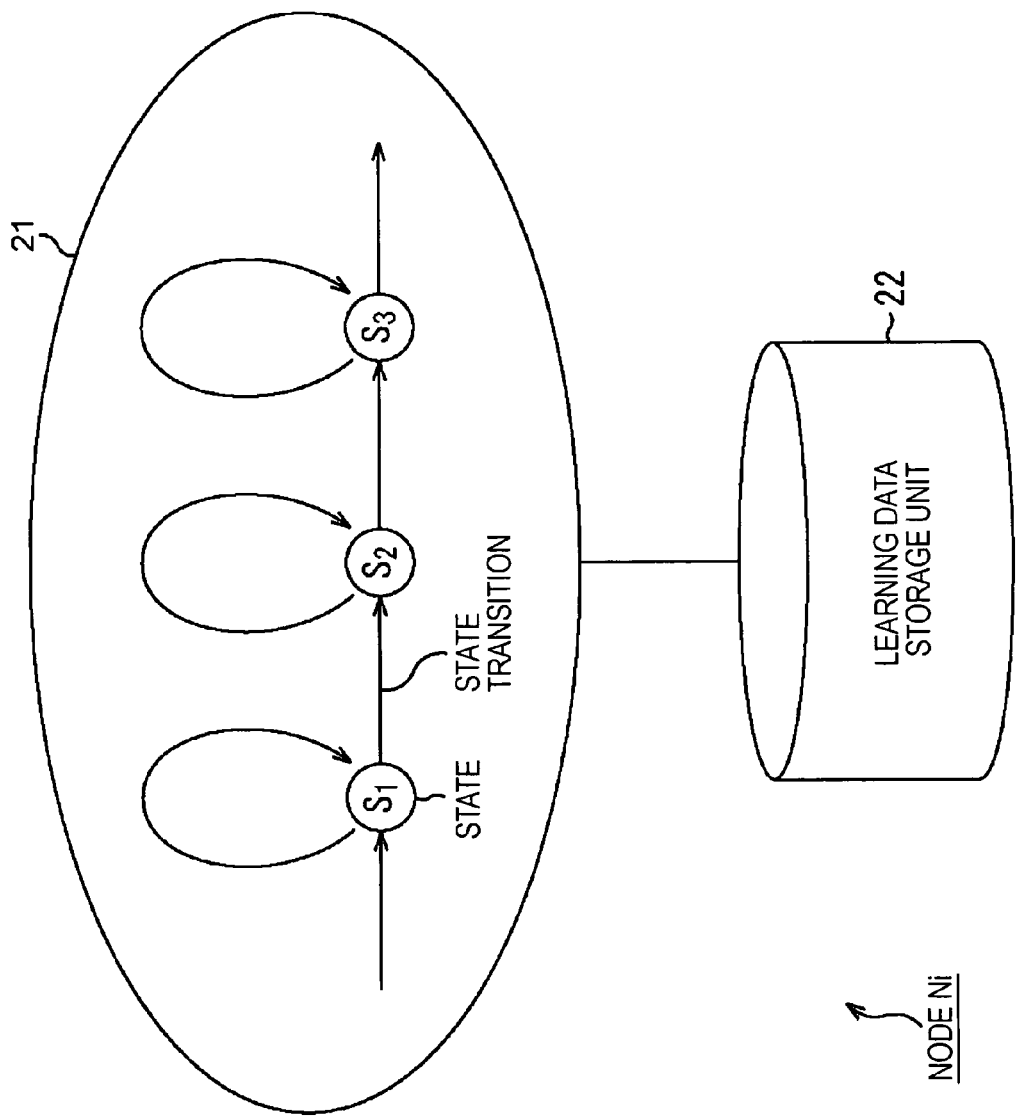
FIG. 5 shows an example of a structure of a node.

FIG. 5 is a schematic diagram showing an example of a structure of a node Ni of the time-series pattern storage network.

The node Ni includes a time-series pattern model 21 representing a time-series pattern and a learning data storage unit 22 adapted to store learning data that is time-series data used in learning of the time-series pattern model 21.

In the example shown in FIG. 5, a HMM (continuous HMM), which is one of state transition probability model, is used as the time-series pattern model 21. In the example shown in FIG. 5, the HMM has three states S1, S2, and S3 and the HMM is of a left-to-right type in which only a self loop and a transition to a next state (on the right) are allowed. In the time-series pattern model 21 shown in FIG. 5, each circle denotes a state, and each arrow denotes a state transition. Note that the HMM used as the time-series pattern model 21 is not limited to the left-to-right type, and the number of states is not limited to 3.

In the case in which a HMM such as that shown in FIG. 5 is used as the time-series pattern model 21, the HMM used as the time-series pattern model 21 is defined by state transition probabilities and output probability density functions (probabilities that discrete symbols, which are scalar quantities, are output, when the HMM is a discrete HMM).

The state transition probability refers to a probability that a state transition occurs in the HMM, and state transition probability is defined for each state transition denoted by each arrow in the time-series pattern model 21 shown in FIG. 5. The output probability density function indicates a probability density of a value observed from the HMM when a state transition occurs. For example, a contaminated normal distribution function is used as the output probability density function. Learning (estimation) of the parameters (the state transition probability and the output probability density function) of the HMM can be performed, for example, by using the Baum-Welch method.

At node Ni, a statistical characteristic of learning data stored in the learning data storage unit 22, that is, a time-series pattern of learning data stored in the learning data storage unit 22, is learned by the time-series pattern model 21, and thus the learning data stored in the learning data storage unit 22 is related to the time-series pattern model 21.

At a node Ni of the auditory SOM in the form of the time-series pattern storage network, a acoustic parameter sequence is stored as learning data in the learning data storage unit 22. On the other hand, at a node Ni of the articulate SOM in the form of the time-series pattern storage network, a articulate parameter sequence is stored as learning data in the learning data storage unit 22.

Figure 6:
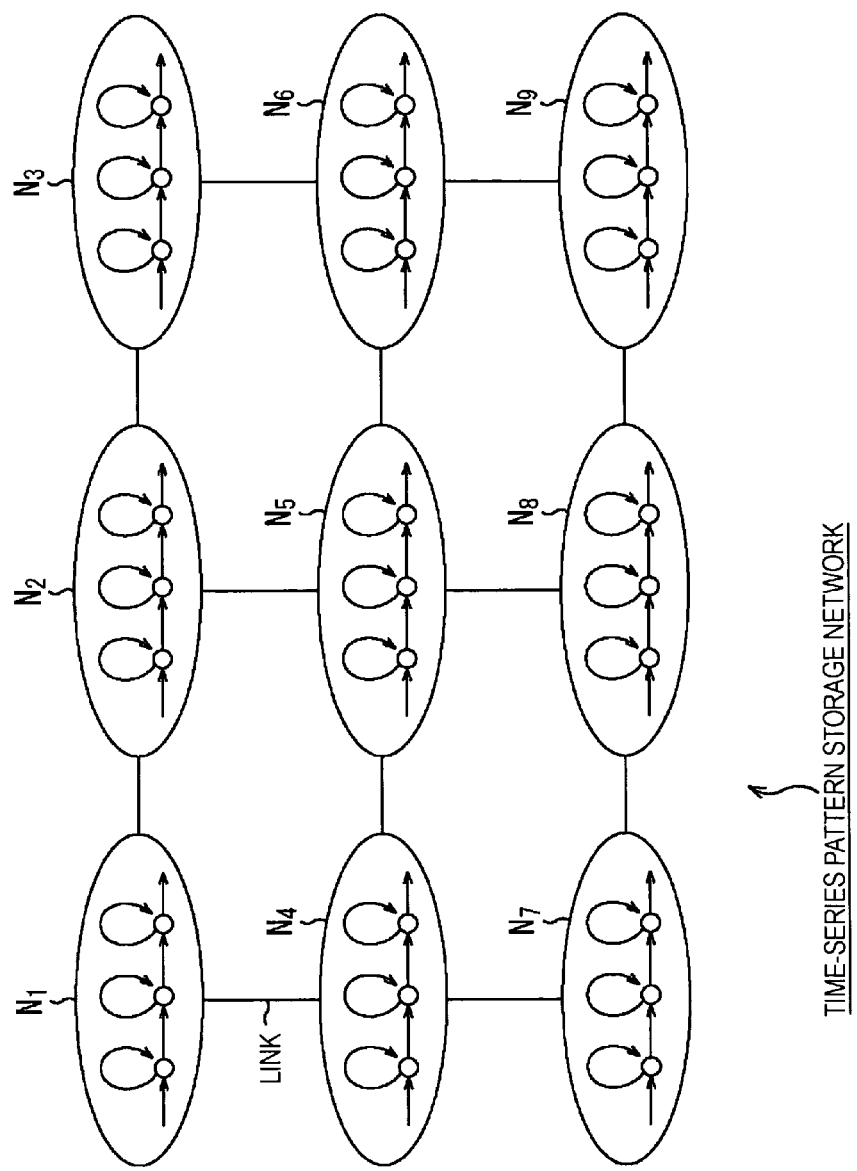
FIG. 6 shows another example of a structure of a auditory SOM (articulate SOM)

FIG. 6 is a schematic diagram showing another example of a time-series pattern storage network.

In the example shown in FIG. 6, the time-series pattern storage network includes nine nodes N1 to N9 arranged in a two-dimensional manner. More specifically, in the example shown in FIG. 6, nine nodes N1 to N9 are arranged in the form of a 3×3 array in a two-dimensional plane.

In the time-series pattern storage network shown in FIG. 6, the nine two-dimensionally arranged nodes N1 to N9 are linked such that nodes that are directly adjacent to each other in the horizontal direction are linked with each other, and nodes that are directly adjacent to each other in the vertical direction are linked with each other. By such links among nodes of the time-series pattern storage network, a two-dimensional spatial arrangement structure is defined.

In the time-series pattern storage network, the distance between arbitrary two nodes can be defined based on the spatial node arrangement structure defined by the linkage among nodes, and the distance between two nodes can be used as the inter-pattern distance indicating the distance between two time-series patterns represented by the time-series pattern model 21 at two nodes (note that the inter-pattern distance defined in this way indicates the similarity between two time-series patterns).

The inter-pattern distance between two time-series patterns defined by the distance between two nodes can be said to be defined based on the connection (link) relationship between two nodes.

The distance between two nodes can be defined by the number of links included in a shortest path between the two nodes. In this case, when a node of interest is given, a node having a direct link to the node of interest (in the example shown in FIG. 6, nodes directly adjacent to the node of interest in the vertical or horizontal direction) has a smallest distance to the node of interest, and a node that can be reached via one or more further links from a node having a directly link to the node of interest is far from the node of interest, and the distance increases with the number of links included in the path from the node of interest.

Note that links among nodes are not limited to those shown in FIG. 4 or FIG. 6. Although in the examples shown in FIG. 4 and FIG. 6, links define the two-dimensional node arrangement structure, links may be given such that a one-dimensional or three-dimensional node arrangement structure is defined by links. Note that nodes do not necessarily need to have links.

Figure 7:
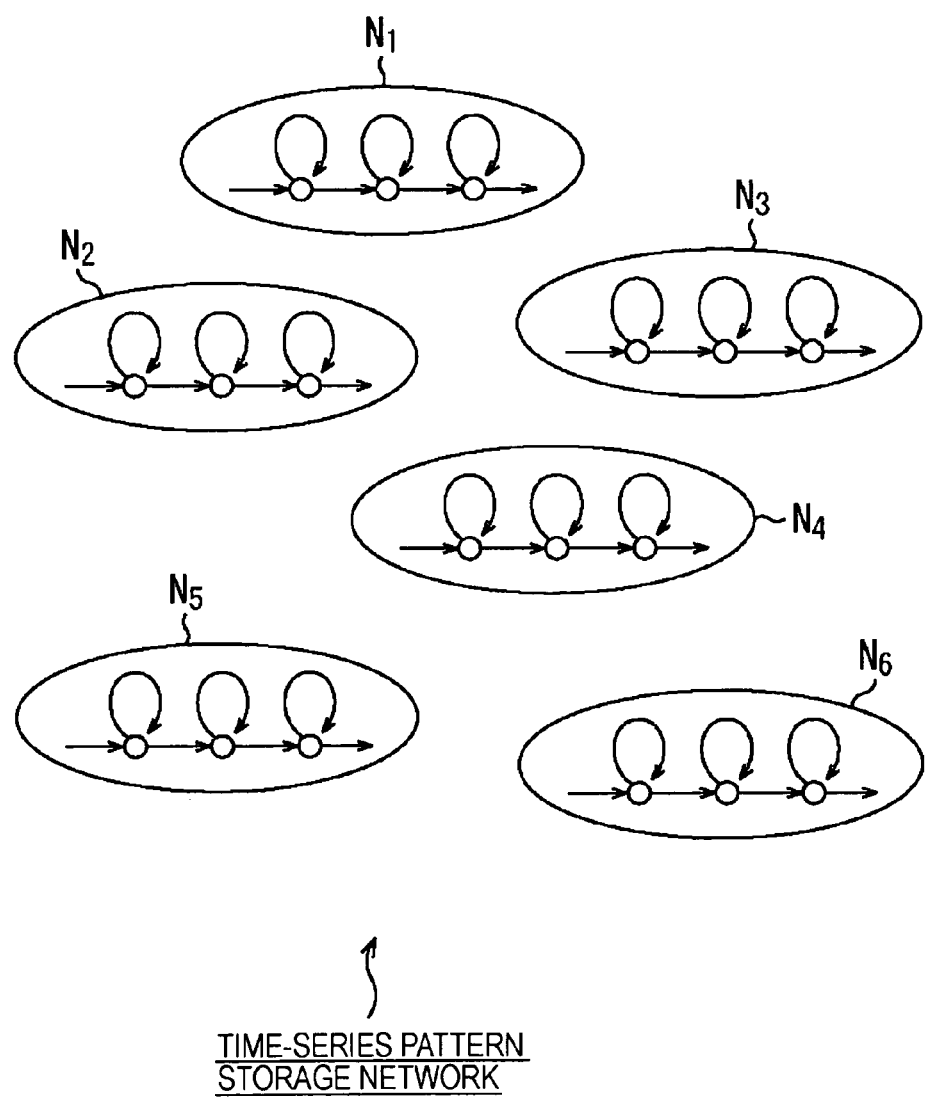
FIG. 7 shows still another example of a structure of a auditory SOM (articulate SOM)

FIG. 7 is a schematic diagram showing still another example of a time-series pattern storage network.

In the example shown in FIG. 7, the time-series pattern storage network is similar to the time-series pattern storage network shown in FIG. 4 in that it has six nodes N1 to N6 but it is different in that any of these six nodes N1 to N6 does have a link. Thus, in the example of the time-series pattern storage network shown in FIG. 7, nodes N1 to N6 do not have a spatial arrangement structure defined by links. Note that having no spatial arrangement structure can be said to have an arrangement structure having no spatial limitation.

When there is no link between two nodes, it is impossible to define the spatial distance between these two nodes, and thus it is impossible to use the inter-pattern distance based on the connection (link) relationship to represent the distance between time-series patterns represented by (the time-series pattern model 21 of) the two respective nodes. In such a case, the inter-pattern distance may be given by a value corresponding to the order of similarity of a node of interest to particular time-series data (observed value). Note that the order of similarity is 1 for a node that is most similar to the time-series data, 2 for a second most similar node, 3 for a third most similar node, and so on. Hereinafter, the order defined in this manner will be referred to simply as the similarity order.

That is, when time-series data is given, the similarity of a time-series pattern represented by a node to the given time-series data can be defined as similarity of the node. Herein, if, of all nodes of a time-series pattern storage network, a node having highest similarity to the given time-series data is referred to as a winner node, then the inter-pattern distance between the time-series pattern represented by the winner node and the time-series pattern represented by an arbitrary node of the time-series pattern storage network can be given by a value corresponding to the order of similarity (similarity order) of the node to the time-series data.

More specifically, of all nodes of the time-series pattern storage network, the winner node has the first similarity order and thus the inter-pattern distance of this node (winner node) to the winner node (more strictly, the inter-pattern distance between time-series nodes represented by these respective nodes) can be given, for example, by a value obtained by subtracting 1 from the similarity order, that is, the inter-pattern distance is given by 0.

In the time-series pattern storage network, the inter-pattern distance between a node with a second similarity order and the winner node may be given, for example, by a value obtained by subtracting 1 from the similarity order. Similarly, the inter-pattern distance between the winner node and an arbitrary node may be given by a value obtained by subtracting 1 from the similarity order of this arbitrary node.

The inter-pattern distance given by a value corresponding to the similarity order of a node in terms of similarity to particular time-series data can be said to be the inter-pattern distance based on the similarity of the node to the time-series data.

Figure 8:
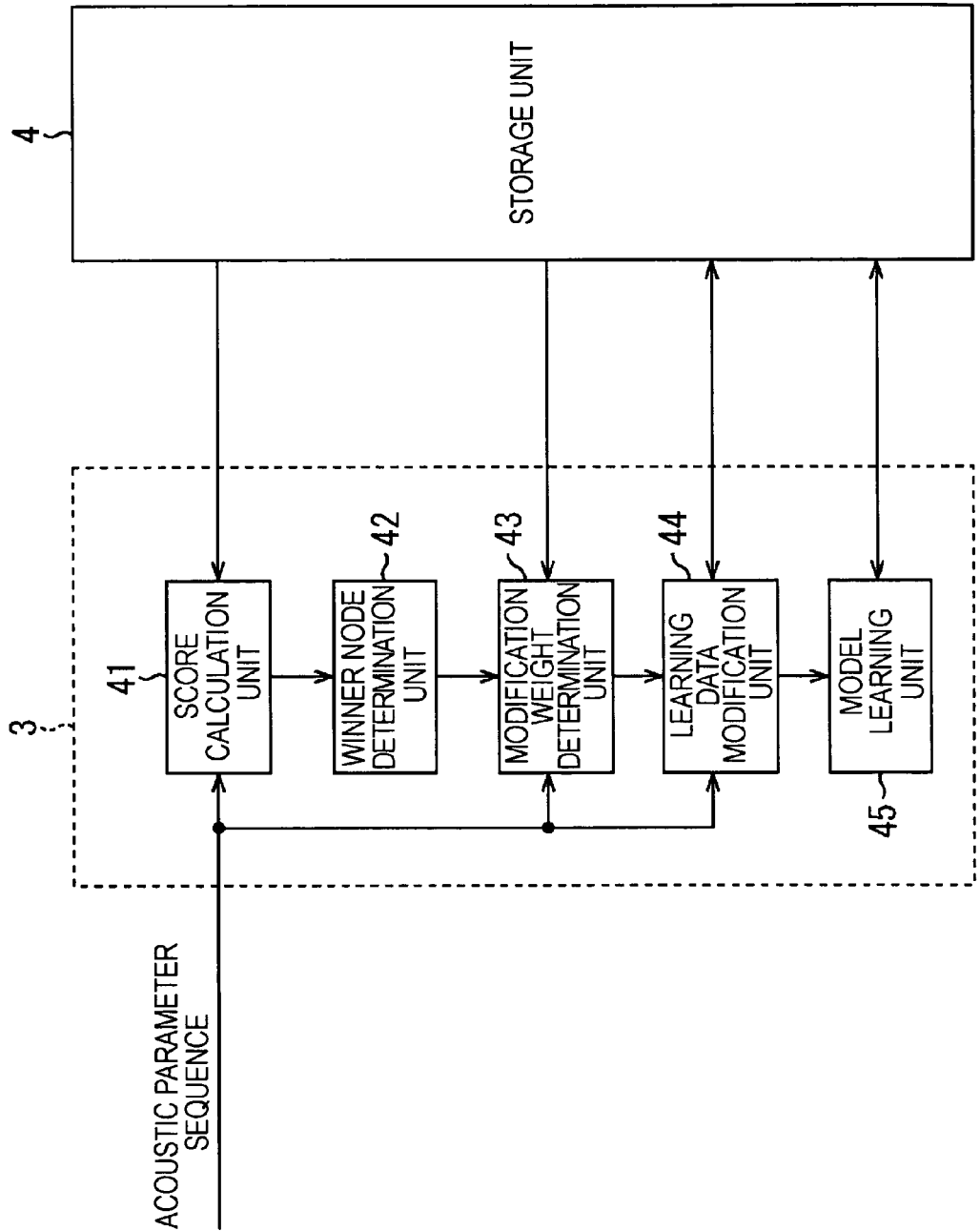
FIG. 8 is a block diagram showing an example of a structure of a learning unit.

FIG. 8 shows an example of a structure of the learning unit 3 shown in FIG. 1.

A acoustic parameter sequence is supplied as new time-series data (in a sound duration detected by the observation unit 1) to the learning unit 3 from the feature extraction unit 2 (FIG. 1). The learning unit 3 self-organizes the auditory SOM, in the form of the time-series pattern storage network, of the connection network stored in the storage unit 4 by modifying the time-series pattern storage network based on the new time-series data supplied from the feature extraction unit 2.

More specifically, a score calculation unit 41 calculates the score indicating the similarity of a node to the new acoustic parameter sequence in the form of time-series data supplied from the feature extraction unit 2, for all nodes of the auditory SOM in the form of the time-series pattern storage network stored in the storage unit 4, and the score calculation unit 41 supplies the calculated scores for the respective nodes to a winner node determination unit 42. For example, when a HMM such as that shown in FIG. 5 is used as the time-series pattern model 21 of each node, the score calculation unit 41 determines, from the HMM used as the time-series pattern model 21 of each node, the likelihood that the new acoustic parameter sequence supplied from the feature extraction unit 2 is observed, and the score calculation unit 41 supplies the calculated likelihood as the score for the node to the winner node determination unit 42.

The winner node determination unit 42, selects, from the nodes of the auditory SOM in the form of the time-series pattern storage network stored in the storage unit 4, a node that is most similar to the new acoustic parameter sequence supplied from the feature extraction unit 2, and the winner node determination unit 42 employs the selected node as the winner node.

That is, the winner node determination unit 42 detects a node having a highest score calculated by the score calculation unit 41 from the nodes of the auditory SOM stored in the storage unit 4, and the winner node determination unit 42 determines the detected node as a winner node. The winner node determination unit 42 supplies information indicating the winner node to the modification weight determination unit 43.

To identify the nodes of the time-series pattern storage network, node labels may be assigned to the respective nodes, and a node label assigned to the winner node may be used as the information indicating the winner node. Note that the node label simply identifies a node and does not indicate a right answer.

Depending on the winner node indicated by the node label supplied from the winner node determination unit 42, the modification weight determination unit 43 determines a determination weight, which will be described in detail later, for each node of the auditory SOM stored in the storage unit 4, and the modification weight determination unit 43 supplies the determined determination weight of each node to a learning data modification unit 44.

More specifically, the modification weight determination unit 43 determines the determination weight for each node (including the winner node) of the auditory SOM stored in the storage unit 4 in accordance with the inter-pattern distance between each node and the winner node, and the modification weight determination unit 43 supplies the determined determination weight for each node to the learning data modification unit 44.

Thus, the time-series pattern model 21 (FIG. 5) of each node is modified using the new acoustic parameter sequence supplied from the feature extraction unit 2. In the modification of the time-series pattern model 21, the determination weight specifies the degree of influence of the new acoustic parameter sequence on the modification. For example, when the determination weight for a particular node is 0, the time-series pattern model 21 of that node is not influenced (not modified) by the new acoustic parameter sequence.

As for the inter-pattern distance used by the modification weight determination unit 43 in the process of determining the determination weight for each node of the auditory SOM stored in the storage unit 4, the inter-pattern distance based on the connection relationship between each node and the winner node may be used in the case in which the nodes of the auditory SOM have links as in the example shown in FIG. 4 or FIG. 6. In the case in which the nodes of the auditory SOM do not have links as in the example shown in FIG. 7, the inter-pattern distance may be defined based on the order of similarity of each node of the auditory SOM to the new acoustic parameter sequence supplied from the feature extraction unit 2.

More specifically, the modification weight determination unit 43 examines the auditory SOM stored in the storage unit 4 to determine the inter-pattern distance based on the connection relationship between each node of the auditory SOM and the winner node indicated by the node label supplied from the winner node determination unit 42, and the modification weight determination unit 43 determines the determination weight for each node of the auditory SOM based on the inter-pattern distance.

Alternatively, the modification weight determination unit 43 may examine the auditory SOM stored in the storage unit 4 to determine the score indicating the similarity of each node of the auditory SOM to the new acoustic parameter sequence supplied from the feature extraction unit 2 in a similar manner to the manner in which the score calculation unit 41 determines scores. The modification weight determination unit 43 may further determine a value corresponding to the similarity order based on the score of each node and may employ the value as the inter-pattern distance based on the similarity to the new acoustic parameter sequence for each node of the auditory SOM. Based on the inter-pattern distance, the determination weight may be determined for each node of the auditory SOM.

The score for each node may be determined by the modification weight determination unit 43, or the score determined by the score calculation unit 41 may be supplied to the modification weight determination unit 43.

The learning data modification unit 44 modifies the learning data stored in the learning data storage unit 22 (FIG. 5) for each node of the auditory SOM stored in the storage unit 4.

More specifically, for each node, the learning data modification unit 44 mixes the existing learning data stored in the learning data storage unit 22 and the new acoustic parameter sequence supplied from the feature extraction unit 2, at a ratio corresponding to the determination weight for each node supplied from the modification weight determination unit 43, and the learning data modification unit 44 stores the result as new learning data in the learning data storage unit 22 thereby modifying the content of the learning data storage unit 22.

After the learning data modification unit 44 modifies the learning data stored in the learning data storage unit 22 (FIG. 5) in the above-described manner, the learning data modification unit 44 supplies a completion notification to a model learning unit 45 to notify that the modification is completed.

If the model learning unit 45 receives the completion notification from the learning data modification unit 44, the model learning unit 45 modifies the time-series pattern model 21 of each node of the auditory SOM stored in the storage unit 4 by performing learning on the time-series pattern model 21 using the learning data modified by the learning data modification unit 44 and stored in the learning data storage unit 22 (FIG. 5).

Thus, in the process performed by the model learning unit 45 to modify the time-series pattern model 21 of each node, the modification is performed based on (part of) the learning data associated with each node stored in the learning data storage unit 22 (FIG. 5) and based on the new acoustic parameter sequence supplied from the feature extraction unit 2. Because the content of the learning data storage unit 22 is modified depending on the determination weight, it can be said that the modification of the time-series pattern model 21 performed by the model learning unit 45 is based on the determination weight.

Figure 9:
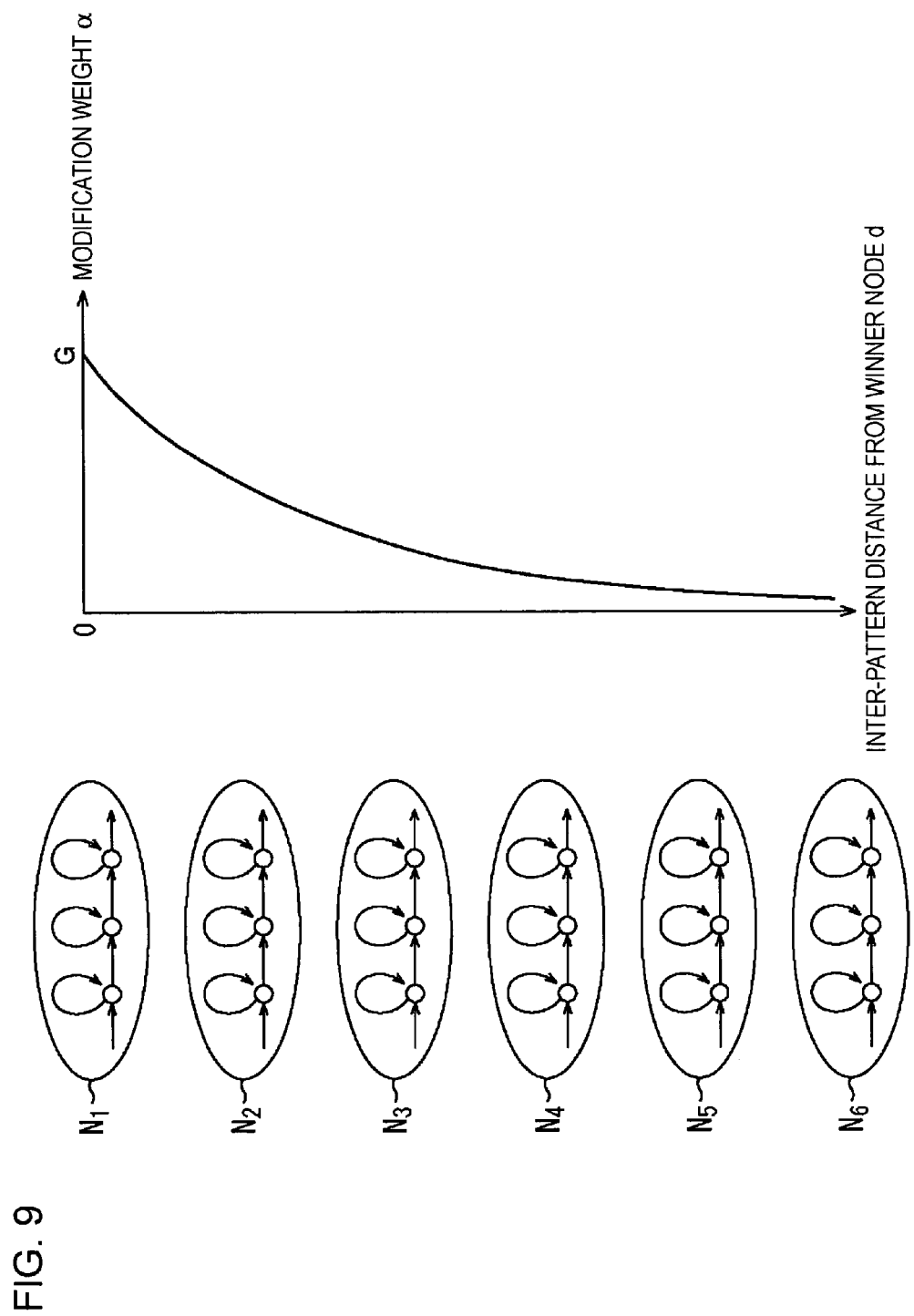
FIG. 9 shows a method of determining a determination weight.

FIG. 9 shows a method of determining a determination weight by the modification weight determination unit 43 shown in FIG. 8.

The modification weight determination unit 43 determines the determination weight for each node, for example, in accordance with a curve (distance-weight curve) indicating the dependence of the determination weight ($\alpha$) on the inter-pattern distance (d) between the node and the winner node (note that the determination weight ($\alpha$) decreases with the inter-pattern distance (d) as shown in FIG. 9). In accordance with the distance-weight curve, the determination weight ($\alpha$) is determined for each node such that the determination weight ($\alpha$) increases with decreasing inter-pattern distance (d) between each node and the winner node, and the determination weight ($\alpha$) decreases with increasing inter-pattern distance (d) between each node and the winner node.

In the distance-weight graph shown in FIG. 9, the horizontal axis represents the modification weight $\alpha$ (increasing from left to right), and the vertical axis represents the inter-pattern distance d (increasing from up to down).

In FIG. 9, the inter-pattern distance d is defined based on the node connection relationship, that is, the inter-pattern distance d is defined by the distance of each node from the winner node, and six nodes N1 to N6 of the auditory SOM are drawn at locations along the vertical axis such that the location of each node Ni in FIG. 9 indicates the distance of each node Ni from the winner node.

In FIG. 9, the distance of the six nodes N1 to N6 of the auditory SOM to the winner node increases in the order from N1 to N6. Of the six nodes N1 to N6 of the auditory SOM, the distance of the node N1 to the winner node is smallest (equal to 0), that is, the node N1 is the winner node itself.

In the case in which the auditory SOM has a two-dimensional node arrangement structure such as that shown in FIG. 6, and, for example, a node N6 is the winner node, the distance between the node N6 and the winner node (the node N6 itself) is equal to 0 (that is, smallest), and the inter-pattern distance d between the node N6 and the winner node (the node N6 itself) is also equal to 0. The distance from the winner node N6 to each of nodes N3, N5, and N9 is equal to 1 (that is the second smallest), and the inter-pattern distance d from any of the nodes N3, N5, and N9 to the winner node N6 is also equal to 1. The distance from the winner node N6 to each of nodes N2, N4, and N8 is equal to 2 (that is the third smallest), and the inter-pattern distance d from any of the nodes N2, N4, and N8 to the winner node N6 is also equal to 2. The distance from the winner node N6 to each of nodes N1 and N7 is equal to 3 (that is the greatest), and the inter-pattern distance d from either one of the nodes N1 and N7 to the winner node N6 is also equal to 3.

On the other hand, in a auditory SOM in which nodes have no links as in the case of the auditory SOM shown in FIG. 7, the inter-pattern distance d between each node and the winner node is defined based on the order of similarity of each node to a acoustic parameter sequence given as a new time-series data, that is, the inter-pattern distance d is given by a value corresponding to the order of similarity of each node to the given new acoustic parameter sequence. In this case, the inter-pattern distance d between a node with a highest score (that is, the winner node itself) and the winner node is 0, and the inter-pattern distance d between a node with a second highest score and the winner node is 1. Similarly, the inter-pattern distance d between a node with a k-th highest score and the winner node is given by k−1.

Note that the definition of the inter-pattern distance d between each node and a winner node on the auditory SOM is similar to the definition employed by T. Kohonen to define the distance on a SOM or the distance in the Neural-Gas algorithm.

The distance-weight curve indicating the dependence of the determination weight $\alpha$ on the inter-pattern distance d, such as that shown in FIG. 9, may be given by, for example, equation (1).

$$\alpha = G\gamma^{\frac{d}{\Delta}} \quad (1)$$

where G is a constant indicating the determination weight for the winner node, $\gamma$ is a constant indicating an attenuation constant within the range of $0<\gamma<1$, and $\Delta$ is a variable used to adjust the modification weight $\alpha$ for nodes in the vicinity of the winner node (that is, for nodes with a small inter-pattern distance d from the winner node) when SMA (Soft-Max Adaptation) is employed as the method to modify the auditory SOM.

When the SMA is employed to modify a SOM (such as the auditory SOM) including a plurality of elements (such as nodes), not only an element with a smallest distance to a new input (not only an element with a highest score) but also elements at locations within a rather short range are also modified. It is known that the SMA can avoid a problem of lapsing into a local solution, which can occur when only an element located closest to a new input is modified by using a WTA (Winner-Take-All) method.

When the inter-pattern distance d of a node determined as a winner node is 0, and inter-pattern distances for the other nodes are given as 1, 2, 3 and so on according to the distance to the winner node or according to the similarity order, if $G=8$, $\gamma=0.5$, and $\Delta=1$ in equation (1), then the determination weight $\alpha$ for the winner node is given by 8 ($=G$). Similarly, for the other nodes, the determination weights $\alpha$ are given as 4, 2, 1, and so on, such that the determination weight $\alpha$ decreases with the distance from the winner node or with the order of similarity.

When the attenuation coefficient $\Delta$ in equation (1) is large, the determination weight $\alpha$ changes gradually with the change in the inter-pattern distance d. Conversely, when the attenuation coefficient $\Delta$ is close to 0, the determination weight $\alpha$ changes greatly with the change in the inter-pattern distance d.

Therefore, if the attenuation coefficient $\Delta$ is adjusted while gradually decreasing the attenuation coefficient $\Delta$ from 1 to 0, then the change in the determination weight α with the change in the inter-pattern distance d becomes greater, and the determination weight α decreases with increasing inter-pattern distance d. When the attenuation coefficient Δ becomes close to 0, the determination weight α for nodes other than the winner node becomes almost equal to 0. In this case, the auditory SOM is modified in substantially the same manner as in the case in which the above-described WTA method is used.

In the case in which the auditory SOM is modified using the SMA method, it is possible to adjust the determination weight α for nodes in the neighborhood of the winner node by adjusting the attenuation coefficient Δ in the above-described manner.

The attenuation coefficient Δ may be set to a large value at the beginning of the modification (learning) of the auditory SOM, and the attenuation coefficient Δ may be reduced with passage of time, that is, with increasing number of times that modification has been performed. In this case, at the beginning of the modification of the auditory SOM, the determination weight α for each node of the determination weight α is determined in accordance with the distance-weight curve whose value of the determination weight α gradually changes with the change in inter-pattern distance d. With the progress of the modification (learning) process, the distance-weight curve has a greater ratio of the change in the determination weight α to the change in the inter-pattern distance d, and the determination weight α for each node of the auditory SOM is determined in accordance with the distance-weight curve with the increased ratio of the change in the determination weight α to the change in the inter-pattern distance d.

That is, regardless of the progress of the modification (learning) process, the modification of the winner node is performed such that the new acoustic parameter sequence in the form of time-series data supplied from the feature extraction unit 2 has a great contribution. On the other hand, the modification of nodes other than the winner node is performed such that at the beginning of the modification (learning) process, the new acoustic parameter sequence has a large influence on the modification for nodes in a large range of the inter-pattern distance d with reference to the winner node. With the progress of the modification (learning) process, the modification for nodes other than the winner nodes is performed such that the new acoustic parameter sequence has a large influence on the modification for nodes in a decreasing range of the inter-pattern distance d with reference to the winner node.

The modification weight determination unit 43 shown in FIG. 8 determines the determination weight α for each node of the auditory SOM in the above-described manner, and the learning data modification unit 44 modifies the learning data stored in the learning data storage unit 22 for each node in accordance with the determined determination weight α.

Now, referring to FIG. 10, the method of modifying the learning data stored in the learning data storage unit 22 for each node is described below.

In the following discussion, it is assumed that learning data associated with a node Ni has been stored in the learning data storage unit 22, and the time-series pattern model 21 of the node Ni has been subjected to learning using the existing learning data stored in the learning data storage unit 22.

As described above, the learning data modification unit 44 mixes the existing learning data associated with the node Ni stored in the learning data storage unit 22 (hereinafter, such learning data will be referred to as simply old learning data) and the new acoustic parameter sequence in the form of time-series data supplied from the feature extraction unit 2 at a ratio determined according to the determination weight α specified for the node Ni by the modification weight determination unit 43, and the learning data modification unit 44 stores the result as new learning data in the learning data storage unit 22. Thus, the content of the data stored in the learning data storage unit 22 is updated with the new learning data.

That is, the learning data modification unit 44 generates the new learning data by mixing the old learning data with the given new acoustic parameter sequence in the form of time-series data at the ratio determined according to the determination weight α.

If the new acoustic parameter sequence and the old learning data are mixed at a ratio of 1:0, then the resultant new learning data is identical to the new acoustic parameter sequence. Conversely, if the new acoustic parameter sequence and the old learning data are mixed at a ratio of 0:1, then the resultant new learning data is identical to the old learning data. When the time-series pattern model 21 (FIG. 5) associated with the node Ni is modified using the new learning data, the influence of the new acoustic parameter sequence on the modification of the time-series pattern model 21 can be changed by changing the mixing ratio of the new acoustic parameter sequence to the old learning data.

For the node Ni, the mixing ratio of the new acoustic parameter sequence to the old learning data is determined according to the determination weight α for example, such that the mixing ratio of the new acoustic parameter sequence to the old learning data increases with the determination weight α.

More specifically, a particular number of acoustic parameter sequences (learning data) in the form of time-series data are stored in the learning data storage unit 22 for the learning of the node Ni. Hereinafter, the particular number of acoustic parameter sequences will be denoted by H. In this case, the learning of the time-series pattern model 21 associated with the node Ni is always performed using H learning data (H acoustic parameter sequences in the form of time-series data).

In the case in which the particular number (H) of learning data always exist in the learning data storage unit 22, it is required that as many new learning data as H should be generated by mixing the old data and the new acoustic parameter sequences. One of methods to mix the new acoustic parameter sequences and the old learning data at a ratio corresponding to the determination weight α specified for the node Ni is to mix the new acoustic parameter sequences and the old learning data at a ratio of α:H−α.

Figure 10:
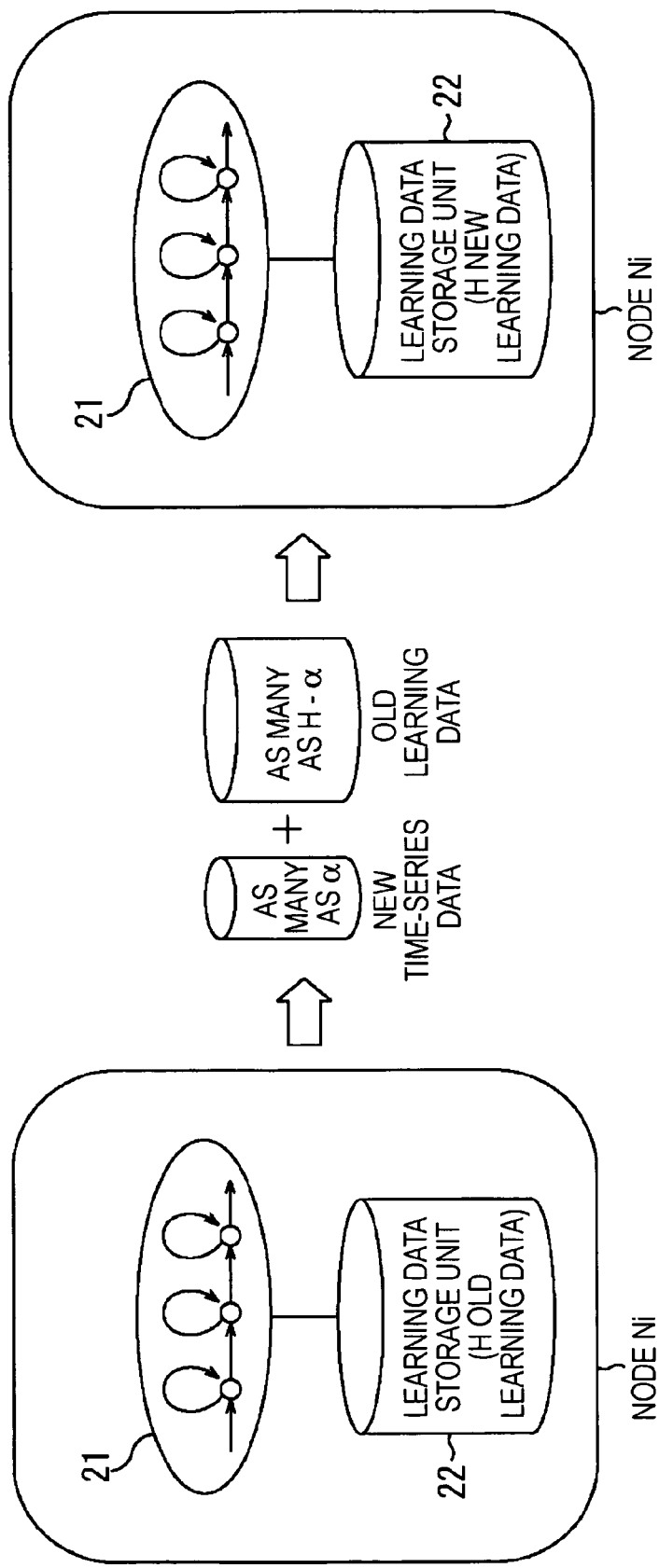
FIG. 10 is a diagram showing a method of modifying learning data stored in a learning data storage unit.

A specific method to mix the new acoustic parameter sequences and the old learning data at a ratio of α:H−α is to generate H new learning data by adding a new acoustic parameter sequences to H−α old learning data of the total of H old learning data as shown in FIG. 10.

More specifically, if the number, H, of learning data in the form of time-series data stored in the learning data storage unit 22 is, for example, 100 and the determination weight α for the node Ni is, for example, 8, the content of the data stored in the learning data storage unit 22 is changed to 100 new learning data obtained by adding 8 new acoustic parameter sequences to 92 old learning data of the total of 100 old learning data.

One method of adding new α acoustic parameter sequences to H−α old learning data of the total of H old learning data is to perform addition when all new α acoustic parameter sequences have been obtained. However, in this method, it is impossible to update the content of the data stored in the learning data storage unit 22 each time one new acoustic parameter sequence is obtained.

In the present embodiment, to avoid the above problem, the content of the data stored in the learning data storage unit 22 is updated each time one new acoustic parameter sequence (for example, one acoustic parameter sequence in a sound duration) is obtained, by adding new α acoustic parameter sequences to H−α old learning data. More specifically, when one new acoustic parameter sequence is given, new α acoustic parameter sequences are generated by copying the given one new acoustic parameter sequence, and the new α acoustic parameter sequences are added to H−α old learning data obtained by removing oldest α of the old learning data from the total of H old learning data, thereby updating the content of the data stored in the learning data storage unit 22. In this method, each time one new acoustic parameter sequence is obtained, the content of the data stored in the learning data storage unit 22 is updated.

By updating the content of the data stored in the learning data storage unit 22 in the above-described manner, newest H time-series data (acoustic parameter sequences) are always stored in the learning data storage unit 22, wherein the ratio of the new acoustic parameter sequences to the total number of learning data is adjusted according to the determination weight α.

Now, referring to a flow chart shown in FIG. 11, the process of learning (modifying) in terms of the auditory SOM performed by the learning unit 3 shown in FIG. 8 is described below.

If the learning unit 3 receives an acoustic parameter sequence as new time-series data from the feature extraction unit 2, the learning unit 3 starts the learning process to modify the auditory SOM stored in the storage unit 4.

That is, in the learning unit 3 (FIG. 8), in step S1, the score calculation unit 41 calculates the score indicating the similarity of each node of the auditory SOM stored in the storage unit 4 to the new acoustic parameter sequence supplied from the feature extraction unit 2.

More specifically, when a HMM such as that shown in FIG. 5 is used as the time-series pattern model 21 of each node, the logarithmic likelihood that the new acoustic parameter sequence is observed is determined as the score from the HMM. The logarithmic likelihood can be calculated, for example, using a Viterbi algorithm.

If the score associated with the new acoustic parameter sequence has been calculated for all nodes of the auditory SOM, the score calculation unit 41 supplies the score for each node to the winner node determination unit 42. Thereafter, the process proceeds from step S1 to S2.

In step S2, the winner node determination unit 42 selects a node having a highest score calculated by the score calculation unit 41 from all nodes of the auditory SOM, and the winner node determination unit 42 employs the selected node as the winner node. The winner node determination unit 42 supplies a node label as information indicating the winner node to the modification weight determination unit 43. Thereafter, the process proceeds from step S2 to S3.

In step S3, the modification weight determination unit 43 determines the determination weight for each node of the auditory SOM, by using, as a reference, the winner node indicated by the node label supplied from the winner node determination unit 42.

More specifically, as described above with reference to FIG. 9, the modification weight determination unit 43 determines the determination weight α for each node of auditory SOM in accordance with the distance-weight curve represented by equation (1), which changes such that the change in the determination weight α becomes more sensitive to the change in the inter-pattern distance d with the progress of the modification (learning) of the auditory SOM, and the modification weight determination unit 43 supplies the resultant determination weight α for each node to the learning data modification unit 44.

The process then proceeds from step S3 to step S4. In step S4, the learning data modification unit 44 modifies the learning data stored in the learning data storage unit 22 (FIG. 5) for each node of the auditory SOM in accordance with the determination weight determined by the modification weight determination unit 43. More specifically, the learning data modification unit 44 acquires H pieces of learning data by mixing the new acoustic parameter sequence supplied from the feature extraction unit 2 and old learning data of nodes stored in the learning data storage unit 22 at a ratio of α:H−α where α is the determination weight associated with each node, as described above with reference to FIG. 10. Thus, the content of the data stored in the learning data storage unit 22 is modified by the H pieces of new learning data.

If the learning data modification unit 44 modifies the content of the learning data storage unit 22 (FIG. 5) for all nodes of the auditory SOM, the learning data modification unit 44 supplies a completion notification to the model learning unit 45 to notify that the modification is completed.

If the model learning unit 45 receives the completion notification from the learning data modification unit 44, the process proceeds from step S4 to step S5. In step S5, the model learning unit 45 modifies the parameter of the auditory SOM (the parameter of the time-series pattern model 21 (FIG. 5) of each node of the auditory SOM in the form of the time-series pattern storage network (hereinafter, referred to simply as the model parameter)). If the modification of the model parameter is completed for all nodes, the learning process is ended.

That is, the model learning unit 45 modifies the time-series pattern model 21 of each node of the auditory SOM by performing learning on the time-series pattern model 21 using the new learning data modified by the learning data modification unit 44 and stored in the learning data storage unit 22.

More specifically, for example, when a HMM is used as the time-series pattern model 21 of each node, learning of the HMM is performed using the new learning data stored in the learning data storage unit 22 for each node. In this learning process, for example, a new state transition probability and a new output probability density function are determined by the Baum-Welch method using the current state transition probability and output probability density function of HMM as initial values and using the new learning data. In accordance with the new state transition probability and the new output probability density function, the model parameters of the auditory SOM, that is, the state transition probability and the output probability density function of the HMM (more specifically, the average vector, the co-variance matrix, etc. thereof) are modified.

Figure 11:
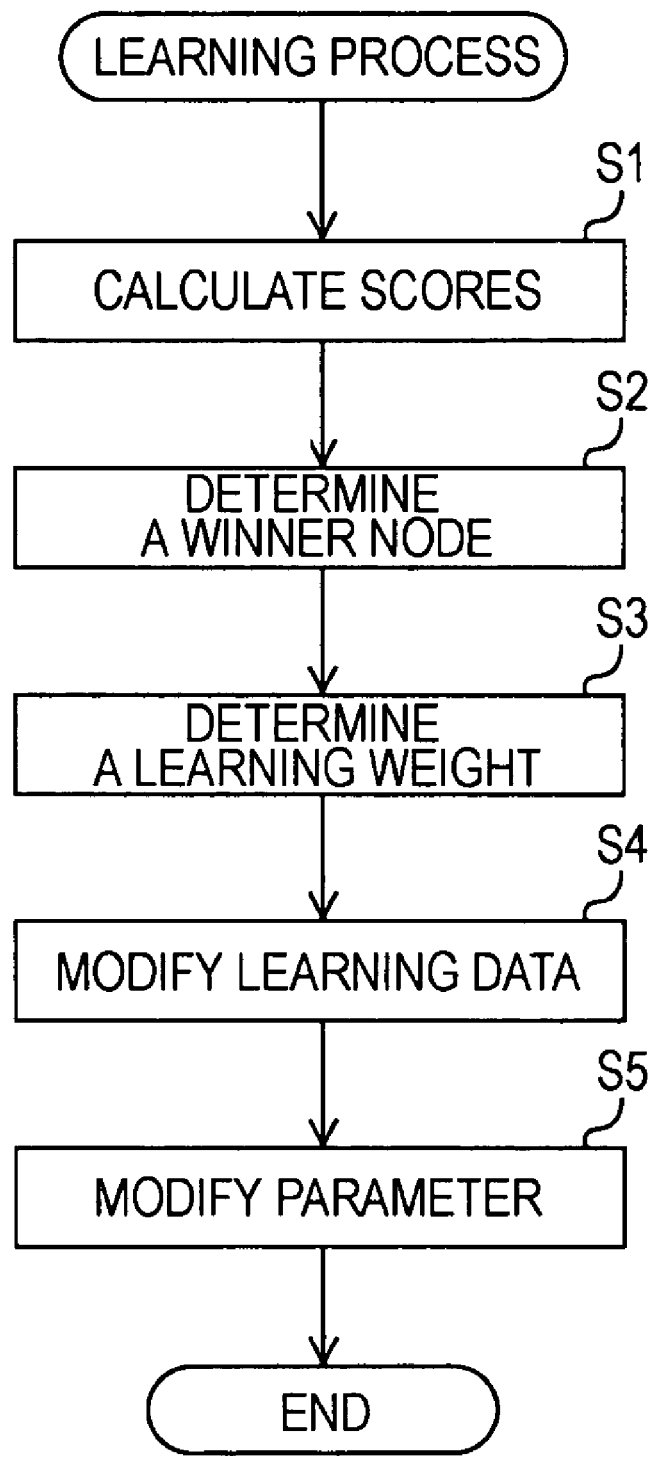
FIG. 11 is a flow chart showing a learning process performed by a learning unit.

In the learning process shown in FIG. 11, when one acoustic parameter sequence is obtained as new time-series data, a winner node for this new acoustic parameter sequence is determined from the nodes of the auditory SOM. Furthermore, using the winner node as a reference, the determination weight is determined for each node of the auditory SOM. Thereafter, according to the determination weight, the model parameters (the state transition probability and the output probability density function of the HMM in the present example) of the time-series pattern model 21 (FIG. 5) of each node of the auditory SOM are modified.

That is, in the learning process shown in FIG. 11, the modification of the model parameters of the nodes of the auditory SOM is performed once for one new acoustic parameter sequence, and the modification of the model parameters of the nodes is performed in a similar manner each time a new acoustic parameter sequence is obtained. Thus, the learning is performed in a self-organizing manner.

By performing sufficient learning, the time-series pattern model 21 of each node of the auditory SOM acquires a particular time-series pattern. The total number of time-series patterns of the auditory SOM is equal to the total number of nodes of the auditory SOM. Therefore, when the total number of nodes of the auditory SOM is equal to, for example, 100, the learning is performed for as many time-series patterns as 100.

Figure 12:
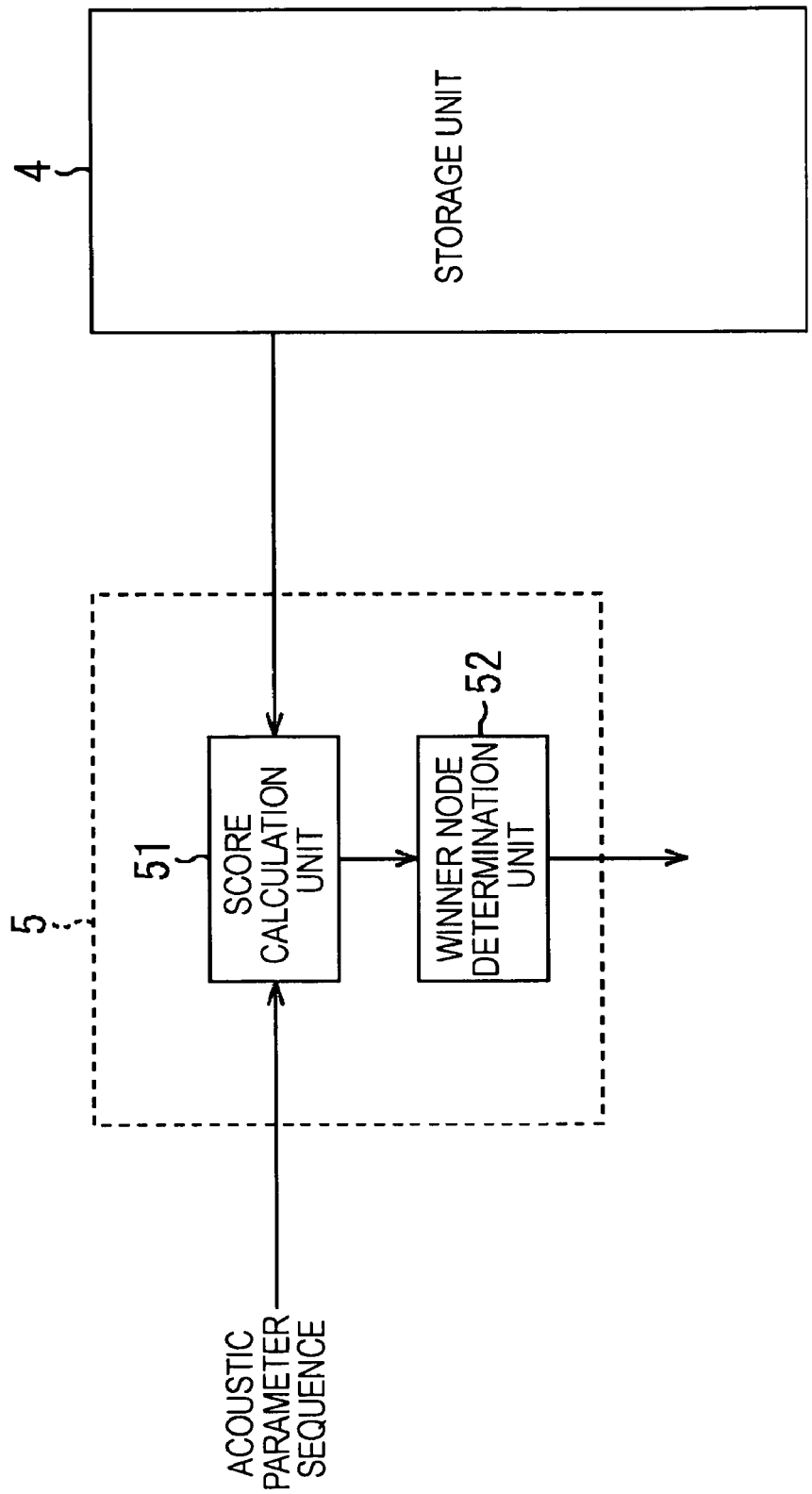
FIG. 12 is a block diagram showing an example of a structure of a recognition unit.

FIG. 12 shows an example of a structure of the recognition unit 5 shown in FIG. 1.

As described above with reference to FIG. 1, an acoustic parameter sequence is supplied as new time-series data to the recognition unit 5 from the feature extraction unit 2, and this new acoustic parameter sequence is supplied to the score calculation unit 51.

The score calculation unit 51 calculates the score indicating the similarity of each node of the auditory SOM stored in the storage unit 4 to the new acoustic parameter sequence supplied from the feature extraction unit 2, and the score calculation unit 51 supplies the calculated score to a winner node determination unit 52. More specifically, for example, when a HMM such as that shown in FIG. 5 is used as the time-series pattern model 21 of each node, the score calculation unit 51 determines, from the HMM representing the time-series pattern model 21 of each node, the likelihood that the new acoustic parameter sequence supplied from the feature extraction unit 2 is observed, and the score calculation unit 51 supplies the calculated likelihood as the score for the node to the winner node determination unit 52.

As with the winner node determination unit 42 of the learning unit 3 (FIG. 8), the winner node determination unit 52 detects a node that is most similar to the new acoustic parameter sequence supplied from the feature extraction unit 2, from the nodes of the auditory SOM stored in the storage unit 4, and the winner node determination unit 42 determines the detected node as a winner node.

That is, the winner node determination unit 52 detects a node having a highest score calculated by the score calculation unit 51 from the nodes of the auditory SOM stored in the storage unit 4, and the winner node determination unit 52 determines the detected node as a winner node. The winner node determination unit 52 outputs a node label as information indicating the winner node determined for a new acoustic parameter sequence supplied from the feature extraction unit 2 or determines as a result of recognition of a voice from which the new acoustic parameter sequence was extracted and which was observed by the observation unit 1.

Note that one of the score calculation unit 51 of the recognition unit 5 and the score calculation unit 41 of the learning unit 3 (FIG. 8) may be used to perform calculations required in the recognition unit 5 and the learning unit 3. Note that one of the winner node determination unit 52 of the recognition unit 5 and the winner node determination unit 42 of the learning unit 3 (FIG. 8) may be used as a determination unit for both the recognition unit 5 and the learning unit 3. Thus, by making the score calculation unit 41 of the learning unit 3 operate also as the score calculation unit 51 of the recognition unit 5 and the winner node determination unit 42 operate also as the winner node determination unit 52 of the recognition unit 51, the recognition unit 5 can be constructed as a part of the learning unit 3.

Figure 13:
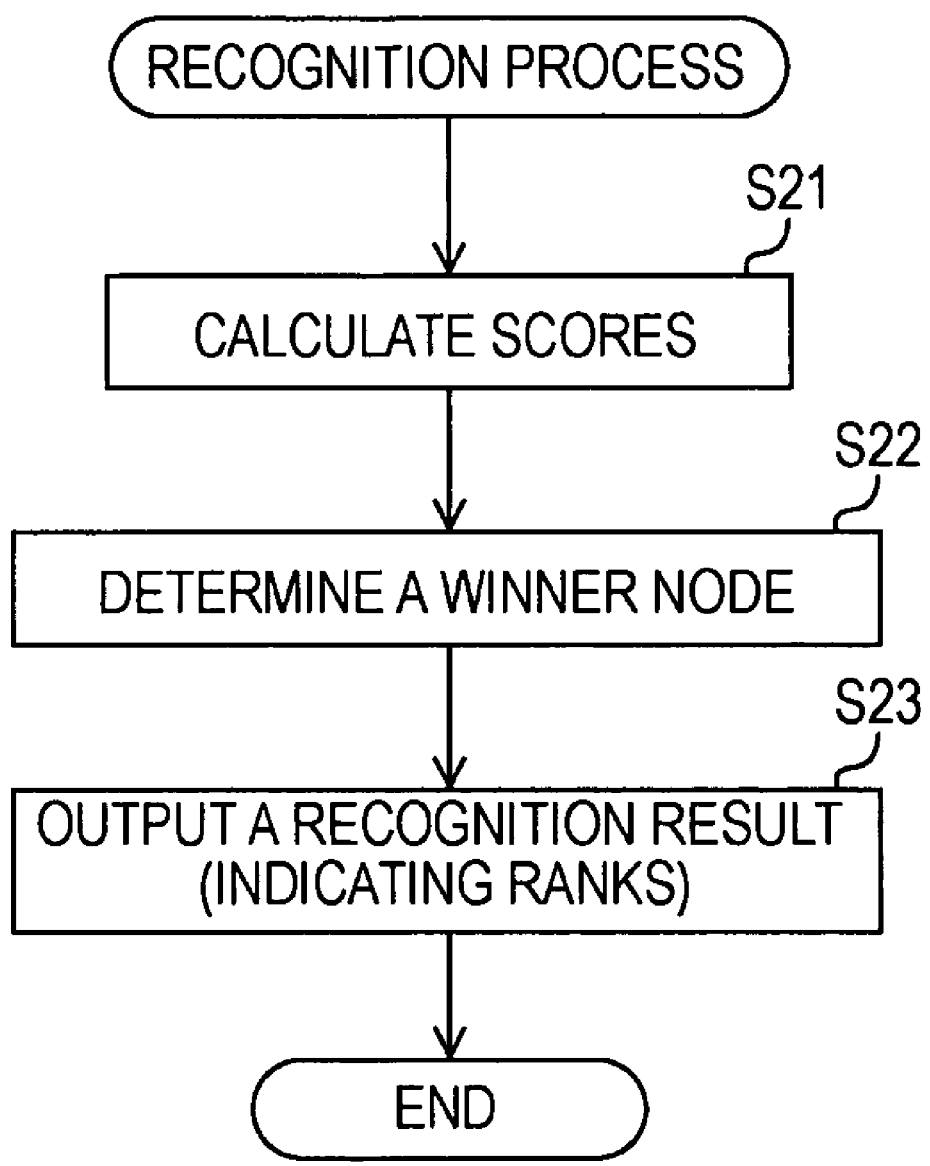
FIG. 13 is a flow chart showing a recognition process performed by a recognition unit.

Now, referring to a flow chart shown in FIG. 13, an explanation is given as to a recognition process performed by the recognition unit 5 shown in FIG. 12 to recognize a voice from which a new acoustic parameter sequence is extracted by the feature extraction unit 2.

If the recognition unit 5 receives a acoustic parameter sequence as new time-series data from the feature extraction unit 2, the recognition unit 5 starts a recognition process to recognize, using the auditory SOM stored in the storage unit 4, a voice from which the new time-series data was extracted by the feature extraction unit 2 (that is, the voice observed by the observation unit 1).

That is, in the learning unit 5 (FIG. 13), in step S21, the score calculation unit 51 calculates the score indicating the similarity of each node of the auditory SOM stored in the storage unit 4 to the new acoustic parameter sequence supplied from the feature extraction unit 2.

More specifically, for example, when a HMM is used as the time-series pattern model 21 (FIG. 5) of each node, the logarithmic likelihood that the new acoustic parameter sequence is observed is determined as the score from the HMM.

If the score associated with the new acoustic parameter sequence has been calculated for all nodes of the auditory SOM, the score calculation unit 51 supplies the score for each node to the winner node determination unit 52. Thereafter, the process proceeds from step S21 to S22.

In step S22, the winner node determination unit 52 detects a node having a highest score calculated by the score calculation unit 51 from the nodes of the auditory SOM and determines the detected node as a winner node. The process then proceeds from step S22 to S23. In step S23, the winner node determination unit 52 supplies the node label indicating the winner node as the voice recognition result to the generation unit 6. Thus, the recognition process is completed.

The above-described recognition process using the auditory SOM allows it to recognize a voice with high resolution determined by the number of nodes of the auditory SOM.

FIG. 14 shows an example of a structure of the generation unit 6 shown in FIG. 1.

If the node label indicating the winner node of the nodes of the auditory SOM stored in the storage unit 4 is supplied as the voice recognition result to the generation unit 6 from the recognition unit 5, this node label is input to the generation node determination unit 61 in the generation unit 6.

The generation node determination unit 61 searches the connection network stored in the storage unit 4 for a node having highest connection strength with the winner node of the auditory SOM indicated by the node label supplied from the recognition unit 5, that is, the generation node determination unit 61 searches for a node having a greatest connection weight with the winner node. If the generation node determination unit 61 detects, from the nodes of the articulate SOM, a node with the greatest connection weight with the winner node of the auditory SOM indicated by the node label supplied from the recognition unit 5, then the generation node determination unit 61 determines the detected node as a generation node to be used to generate a articulate parameter, and the generation node determination unit 61 supplies a node label identifying the generation node to a model parameter modification unit 62.

The model parameter modification unit 62 detects, from the nodes of the articulate SOM stored in the storage unit 4, the generation node identified by the node label supplied from generation node determination unit 61 and performs a modification control process to modify the articulate parameter sequence generated from the generation node.

The each node of the articulate SOM has the time-series pattern model 21 such as that shown in FIG. 5, and the learning (modification) of the time-series pattern model 21 associated with each node of the articulate SOM is performed by the learning unit 7 using a articulate parameter sequence that is a parameter to drive the driving unit 8 so that the time-series pattern model 21 of each node of the articulate SOM can generate a articulate parameter sequence.

More specifically, for example, when a HMM is used as the time-series pattern model 21 of each node, the HMM can generate an articulate parameter sequence with a greatest output probability indicating the likelihood that the articulate parameter sequence is observed.

A method of generating time-series data including an articulate parameter sequence using a HMM is to generate time-series data that smoothly varies according to a dynamic feature value. A specific example of such a method of generating time-series data is disclosed in a technical paper entitled "SPEECH PARAMETER GENERATION ALGORITHMS FOR HMM-BASED SPEECH SYNTHESIS" (K. Tokuda, T. Yoshimura, T. Masuko, T. Kobayashi, and T. Kitamura, Proc. of ICASSP 2000, vol. 3, pp. 1315-1318, June 2000).

Another method of generating time-series data using a HMM is to repeatedly generate time-series data based on random trials using parameters of the HMM and employ the average of generated time-series data. A specific example of such a method of producing time-series data is disclosed, for example, in "Extraction and restore of keyframes of time-series data using a continuous HMM" (Inamura et al., Proc. of ROBOMEC 2003, 2P1-3F-C6).

When a HMM is used as the time-series pattern model 21, model parameters thereof are a state transition probability and an output probability density function of the MM (more specifically, the average vector and the co-variance matrix thereof). It is possible to change time-series data generated by the HMM by changing the state transition probability and the output probability density function, that is, the model parameters of the HMM.

Thus, the model parameter modification unit 62 controls a time-series data generation unit 63 disposed at a following stage to change the model parameters associated with the generation node of the articulate SOM and generate a articulate parameter sequence in the form of time-series data using the changed model parameters. More specifically, the model parameter modification unit 62 supplies changed model parameters of the generation node to the time-series data generation unit 63 and controls the time-series data generation unit 63 to generate an articulate parameter sequence using the changed model parameters of the generation node. In this process, because the time-series data generation unit 63 generates the articulate parameter using the changed model parameters associated with the generation node, a change occurs in the articulate parameter sequence generated from the generation node.

Note that the changing of the model parameters of the generation node of the articulate SOM by the model parameter modification unit 62 is performed under the control of the control unit 10.

The time-series data generation unit 63 generates the articulate parameter sequence from the model parameters of the time-series pattern model 21 (FIG. 5) of the generation node supplied from the model parameter modification unit 62, and the time-series data generation unit 63 supplies the generated articulate parameter sequence to the learning unit 7 (FIG. 1) and the driving unit 8.

Now, referring to a flow chart shown in FIG. 15, a generation process performed by the generation unit 6 shown in FIG. 14 to generate an articulate parameter sequence is described below.

If a node label indicating a winner node of the auditory SOM is supplied as a recognition result to the generation unit 6 from the recognition unit 5, the generation unit 6 starts the generation process.

That is, in step S31, the generation node determination unit 61 in the generation unit 6 (FIG. 14) detects a node which is one of the nodes of the articulate SOM stored in the storage unit 4 and which has a greatest connection weight with the winner node which is one of the nodes of the auditory SOM stored in the storage unit 4 and which is indicated by the node label supplied from the recognition unit 5, and the generation node determination unit 61 determines the detected node as the generation node. The generation node determination unit 61 then supplies a node label indicating the generation node to the model parameter modification unit 62. Thereafter, the process proceeds from step S31 to S32.

In step S32, the model parameter modification unit 62 detects, from the nodes of the articulate SOM stored in the storage unit 4, the generation node identified by the node label supplied from generation node determination unit 61 and the model parameter modification unit 62 reads the generation node (more strictly, the model parameter of the time-series pattern model 21 (FIG. 5) associated with the generation node) from the storage unit 4. Furthermore, the model parameter modification unit 62 modifies or does not modify the generation node (more strictly, the model parameter of the time-series pattern model 21 associated with the generation node) in accordance with a command supplied from the control unit 10 (FIG. 1), and the model parameter modification unit 62 supplies the resultant generation node to the time-series data generation unit 63. Thereafter, the process proceeds from step S32 to S33.

In step S33, the time-series data generation unit 63 generates a articulate parameter sequence from the generation node (more strictly, the model parameter of the time-series pattern model 21 associated with the generation node) supplied from the model parameter modification unit 62, and the time-series data generation unit 63 supplies the generated articulate parameter sequence to the learning unit 7 (FIG. 1) and the driving unit 8. Thus, the generation process is completed.

FIG. 16 shows an example of a structure of the learning unit 7 shown in FIG. 1.

If the learning unit 7 receives a articulate parameter sequence in the form of time-series data from the generation unit 6 (FIG. 1), then, under the control of the control unit 10 (FIG. 1), the learning unit 7 modifies the time-series pattern storage network, that is, the articulate SOM of the connection network, stored in the storage unit 4 in accordance with the new articulate parameter sequence supplied from the generation unit 6 in a self-organizing manner.

More specifically, the score calculation unit 71 determines the score indicating the similarity relative to the new articulate parameter sequence in the form of time-series data supplied from the generation unit 6, for each node of the articulate SOM in the form of the time-series pattern storage network stored in the storage unit 4 in a similar manner to the calculation performed by the score calculation unit 41 shown in FIG. 8, and the score calculation unit 71 supplies the resultant score for each node to a winner node determination unit 72. Thus, in the case in which a HMM such as that shown in FIG. 5 is used as the time-series pattern model 21 of each node of the articulate SOM, the score calculation unit 71 determines, from the HMM representing the time-series pattern model 21 of each node, the likelihood that the new articulate parameter sequence supplied from the generation unit 6 is observed, and the score calculation unit 71 supplies the calculated likelihood as the score for the node to the winner node determination unit 72 and a self-learning connection weight modification unit 76.

The winner node determination unit 72 detects, from the nodes of the articulate SOM in the form of the time-series pattern storage network stored in the storage unit 4, a node that is most similar to the new articulate parameter sequence supplied from the generation unit 6, and the winner node determination unit 72 determines the detected node as a winner node.

That is, the winner node determination unit 72 detects a node having a highest score calculated by the score calculation unit 71 from the nodes of the articulate SOM stored in the storage unit 4, and the winner node determination unit 72 determines the detected node as a winner node. The winner node determination unit 72 supplies a node label indicating the winner node to the modification weight determination unit 73.

The modification weight determination unit 73 determines the determination weight for each node of the articulate SOM stored in the storage unit 4, based on the winner node indicated by the node label supplied from the winner node determination unit 72, in a similar manner to the manner in which the modification weight determination unit 43 shown in FIG. 8 determines the determination weight, and the modification weight determination unit 73 supplies the resultant determination weight for each node to the learning data modification unit 74.

That is, the modification weight determination unit 73 determines the determination weight for each node (including the winner node) of the articulate SOM stored in the storage unit 4 in accordance with the inter-pattern distance between each node and the winner node, and the modification weight determination unit 73 supplies the resultant determination weight for each node to the learning data modification unit 74.

The score for each node of the articulate SOM may be determined by the modification weight determination unit 73, or the score determined by the score calculation unit 71 may be supplied to the modification weight determination unit 73.

The learning data modification unit 74 modifies the learning data stored in the learning data storage unit 22 (FIG. 5) for each node of the articulate SOM stored in the storage unit 4 in a similar manner to the manner in which the learning data modification unit 44 shown in FIG. 8 modifies the learning data.

More specifically, the learning data modification unit 74 mixes the existing learning data associated with each node of the articulate SOM stored in the learning data storage unit 22 and the new articulate parameter sequence supplied from the generation unit 6 at a ratio determined according to the determination weight associated with the node supplied from the modification weight determination unit 73, and the learning data modification unit 74 stores the result as new learning data in the learning data storage unit 22 thereby updating the content of the learning data storage unit 22.

After the learning data modification unit 74 modifies the learning data stored in the learning data storage unit 22 (FIG. 5) in the above-described manner, the learning data modification unit 74 supplies a completion notification to the model learning unit 75 to notify that the modification is completed.

If the model learning unit 75 receives the completion notification from the learning data modification unit 74, the model learning unit 75 modifies the time-series pattern model 21 (more strictly, the model parameter of the time-series pattern model 21) of each node of the articulate SOM stored in the storage unit 4 by performing learning on the time-series pattern model 21 using the learning data modified by the learning data modification unit 74 and stored in the learning data storage unit 22 (FIG. 5).

Thus, in the process performed by the model learning unit 75 to modify the time-series pattern model 21 of each node of the articulate SOM, the modification is performed based on (part of) the learning data associated with each node stored in the learning data storage unit 22 (FIG. 5) and based on the new articulate parameter sequence supplied from the generation unit 6.

In a case in which no reward is supplied from the reward acquisition unit 9 (FIG. 1), the self-learning connection weight modification unit 76 modifies the connection weight of the connection network (indicating the connection strength between a node of the auditory SOM and a node of the articulate SOM) stored in the storage unit 4, in accordance with the score supplied from the score calculation unit 71 in terms of the new articulate parameter sequence supplied from the generation unit 6, for each node of the articulate SOM. On the other hand, if a reward is supplied from the reward acquisition unit 9, the self-learning connection weight modification unit 76 disables the modification of the connection weight.

If a reward is supplied from the reward acquisition unit 9, a supervised learning connection weight modification unit 77 employs the received reward as a training signal and modifies the connection weight (indicating the connection strength between nodes of the auditory SOM and the articulate SOM) stored in the storage unit 4 in accordance with the training signal. On the other hand, if a reward is supplied from the reward acquisition unit 9, the supervised learning connection weight modification unit 77 disables the modification of the connection weight.

Now, referring to a flow chart shown in FIG. 17, a learning process performed by the learning unit 7 to learn (modify) the articulate SOM and the connection weights is described below.

If a new articulate parameter sequence in the form of time-series data is supplied from the generation unit 6 and a command to perform learning using the new articulate parameter sequence is received from the control unit 10, then learning unit 7 starts a learning process to modify the articulate SOM and the connection weight stored in the storage unit 4.

That is, in the learning unit 7 (FIG. 16), in step S41, the score calculation unit 71 calculates the score indicating the similarity of each node of the articulate SOM stored in the storage unit 4 to the new articulate parameter sequence supplied from the generation unit 6.

More specifically, for example, when a HMM is used as the time-series pattern model 21 of each node of the articulate SOM, the logarithmic likelihood that the new acoustic parameter sequence is observed is determined from the HMM by using, for example, the Viterbi algorithm, and the resultant logarithmic likelihood is employed as the score in terms of the new articulate parameter sequence supplied from the generation unit 6 for each node of the articulate SOM.

If the score associated with the new acoustic parameter sequence has been calculated for all nodes of the articulate SOM, the score calculation unit 71 supplies the score for each node to the winner node determination unit 72 and the self-learning connection weight modification unit 76. Thereafter, the process proceeds from step S41 to S42.

In step S42, the winner node determination unit 72 detects a node having a highest score calculated by the score calculation unit 71 from the nodes of the articulate SOM and determines the detected node as a winner node. The winner node determination unit 72 supplies a node label indicating the winner node to the modification weight determination unit 73. Thereafter, the process proceeds from step S42 to S43.

In step S43, the modification weight determination unit 73 determines the determination weight for each node of the articulate SOM, by using, as a reference, the winner node indicated by the node label supplied from the winner node determination unit 72.

As described above with reference to FIG. 9, the modification weight determination unit 73 determines the determination weight $\alpha$ for each node of articulate SOM in accordance with the distance-weight curve represented by equation (1), which changes such that the change in the determination weight $\alpha$ becomes more sensitive to the change in the inter-pattern distance d with the progress of the modification (learning) of the articulate SOM, and the modification weight determination unit 73 supplies the resultant determination weight for each node to the learning data modification unit 74.

The process then proceeds from step S43 to step S44. In step S44, the learning data modification unit 74 modifies the learning data stored in the learning data storage unit 22 (FIG. 5) for each node of the articulate SOM in accordance with the determination weight determined by the modification weight determination unit 73. More specifically, the learning data modification unit 74 acquires H pieces of new learning data by mixing the new articulate parameter sequence supplied from the generation unit 6 and old learning data of nodes of the articulate SOM stored in the learning data storage unit 22 at a ratio of $\alpha$:H–$\alpha$ where $\alpha$ is the determination weight associated with each node, as described above with reference to FIG. 10. Thus, the content of the data stored in the learning data storage unit 22 is modified by the new H learning data.

If the learning data modification unit 74 modifies the content of the learning data storage unit 22 (FIG. 5) for all nodes of the articulate SOM, the learning data modification unit 74 supplies a completion notification to the model learning unit 75 to notify that the modification is completed.

If the model learning unit 75 receives the completion notification from the learning data modification unit 74, then the process proceeds from step S44 to step S45. In step S45, the model learning unit 75 updates the model parameters associated with the articulate SOM.

That is, the model learning unit 75 modifies the time-series pattern model 21 of each node of the articulate SOM by performing learning on the time-series pattern model 21 using the new learning data modified by the learning data modification unit 74 and stored in the learning data storage unit 22.

More specifically, for example, when a HMM is used as the time-series pattern model 21 of each node of the articulate SOM, learning of the HMM is performed using the new learning data stored in the learning data storage unit 22 for each node. In this learning process, for example, a new state transition probability and a new output probability density function are determined by the Baum-Welch method using the current state transition probability and output probability density function (the model parameters) of HMM as initial values and also using the new learning data. In accordance with the new state transition probability and the new output probability density function, the model parameters of the articulate SOM, that is, the state transition probability and the output probability density function of the HMM (more specifically, the average vector, the co-variance matrix, etc. thereof) are modified.

The process then proceeds from step S45 to step S46. In step S46, the self-learning connection weight modification unit 76 and the supervised learning connection weight modification unit 77 determine whether a reward has been given from the reward acquisition unit 9.

If the determination in step S46 is that no reward has been given, then the process proceeds to step S47. In step S47, the self-learning connection weight modification unit 76 modifies the connection weights of the connection network stored in the storage unit 4 in accordance with the scores, supplied in step S41 from the score calculation unit 71, in terms of the new articulate parameter sequence supplied from the generation unit 6 for respective nodes of the articulate SOM (hereinafter, this modification process will be referred to as the modification of the self-learning connection weights). If step S47 is completed, the learning process is ended.

On the other hand, if the determination in step S46 is that a reward has been given, the process proceeds to step S48. In step S48, the supervised learning connection weight modification unit 77 modifies the connection weights stored in the storage unit 4 in accordance with the reward (as a training signal) supplied in step S46 from the reward acquisition unit 9 (hereinafter, this modification process will be referred to as the modification of the supervised learning connection weights). After step S48 is completed, the learning process is ended.

Now, referring to a flow chart shown in FIG. 18, the operation of the information processing apparatus shown in FIG. 1 is described below. In the following discussion, it is assumed that the time-series pattern model 21 (FIG. 5) associated with each node of the auditory SOM and the articulate SOM is given, for example, in the form of a HMM.

First, in step S101, the control unit 10 initializes the connection network stored in the storage unit 4. Thereafter, the process proceeds to step S102.

More specifically, the control unit 10 sets proper values (for example, random numbers) as model parameters of the HMM associated with each node of the auditory SOM and the articulate SOM of the connection network stored in the storage unit 4, and the control unit 10 also sets proper values (for example, random numbers) as connection weights between the auditory SOM and the articulate SOM.

In step S102, if a speech is uttered by a user, the observation unit 1 detects a sound duration and supplies voice/sound data in the detected sound duration to the feature extraction unit 2. Thereafter, the process proceeds from step S102 to S103.

In step S103, the feature extraction unit 2 extracts an acoustic parameter from voice/sound data supplied from the observation unit 1 and supplies the extracted acoustic parameter sequence in the form of time-series data to the learning unit 3 and the recognition unit 5. Thereafter, the process proceeds to step S104.

In step S104, the recognition unit 5 performs a recognition process using the acoustic parameter sequence supplied from the feature extraction unit 2, that is, the acoustic parameter sequence of the speech uttered by the user in a similar manner as described above with reference to FIG. 13, and the recognition unit 5 supplies a node label indicating a winner node of the auditory SOM as a result of recognition of the speech uttered by the user to the generation unit 6 and the control unit 10. Thereafter, the process proceeds to step S105.

Hereinafter, the winner node of the auditory SOM obtained for the speech uttered by the user will be referred to as a speech winner node.

In step S105, the learning unit 3 performs a learning process using the acoustic parameter sequence supplied from the feature extraction unit 2, that is, the acoustic parameter sequence of the speech uttered by the user in a similar manner as described above with reference to FIG. 11. As a result, the auditory SOM stored in the storage unit 4 is updated. Thereafter, the process proceeds to step S106.

In steps S106 to 109, the generation unit 6 performs the generation process described above with reference to FIG. 15.

Figure 15:
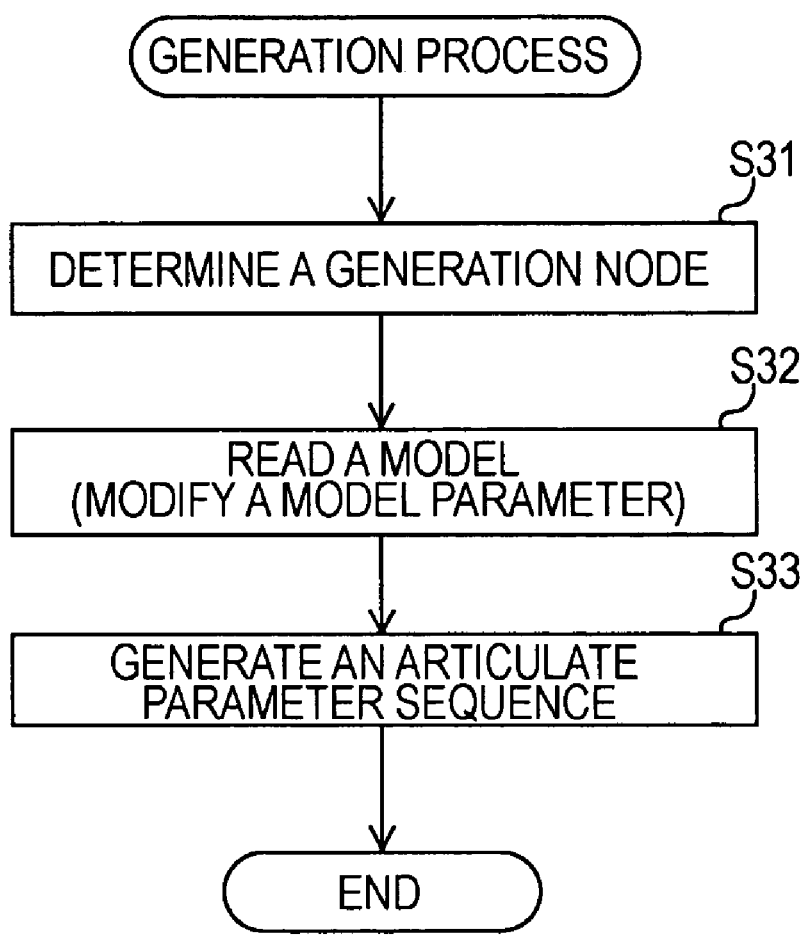
FIG. 15 is a flow chart showing a generation process performed by a generation unit.

That is, in step S106, as in step S31 shown in FIG. 15, the generation node determination unit 61 of the generation unit 6 (FIG. 14) detects a node which is one of the nodes of the articulate SOM stored in the storage unit 4 and which has a greatest connection weight with the speech winner node which is one of the nodes of the auditory SOM stored in the storage unit 4 and which is indicated by the node label supplied, in the immediately previous step S104, from the recognition unit 5, and the generation node determination unit 61 determines the detected node as the generation node. The generation node determination unit 61 then supplies a node label indicating the generation node to the model parameter modification unit 62. Thereafter, the process proceeds from step S106 to S107.

In step S107, as in step S32 shown in FIG. 15, the model parameter modification unit 62 of the generation unit 6 (FIG. 14) detects, from the nodes of the articulate SOM stored in the storage unit 4, the generation node identified by the node label supplied from generation node determination unit 61 and the model parameter modification unit 62 reads the generation node (more strictly, the model parameter of the time-series pattern model 21 (FIG. 5) associated with the generation node) from the storage unit 4.

Thereafter, the process proceeds from step S107 to S108. In step S108, in accordance with a command given by the control unit 10, the model parameter modification unit 62 modifies or does not modify the model parameter of the time-series pattern model 21 associated with the generation node (hereinafter, referred to simply as the model parameter of the generation node) read from the storage unit 4, and the model parameter modification unit 62 supplies the resultant model parameter of the generation node to the time-series data generation unit 63. Thereafter, the process proceeds to step S109.

The steps from S108 to S114 form a loop that is performed at least once for voice/sound data in one sound duration obtained for a speech uttered by a user. When step S108 is performed for the first time for voice/sound data in one sound duration of a speech uttered by the user, the control unit 10 control the model parameter modification unit 62 such that the model parameter of the generation node is directly supplied to the time-series data generation unit 63 without being modified. In a second and further following executions of step S108, the control unit 10 control the model parameter modification unit 62 such that the model parameter of the generation node is modified and the resultant model parameter is supplied to the time-series data generation unit 63.

In step S109, as in step S33 shown in FIG. 15, the time-series data generation unit 63 of the generation unit 6 (FIG. 14) generates a articulate parameter sequence from the model parameter of the generation node (more strict, the time-series pattern model 21 in the form of the HMM defined by the model parameter of the generation node) supplied from the model parameter modification unit 62, and the time-series data generation unit 63 supplies the generated articulate parameter sequence to the learning unit 7 and the driving unit 8. Thereafter, the process proceeds to step S110.

The time-series data generation unit 63 generates a articulate parameter sequence from the model parameter of the generation node supplied from the model parameter modification unit 62, in the above-described manner. Thus, in the case in which the model parameter of the generation node supplied to the time-series data generation unit 63 from the model parameter modification unit 62 was modified in step S108, a change occurs in the articulate parameter sequence generated in step S109 from the model parameter.

In step S110, the driving unit 8 performs a driving operation in accordance with the articulate parameter sequence supplied from the generation unit 6, that is, the driving unit 8 synthesizes a sound using the articulate parameter sequence supplied from the generation unit 6. The synthesized sound is output from the driving unit 8. Thereafter, the process proceeds from step S110 to S111.

The synthesized sound output in the previous step S110 by the driving unit 8 is observed by the observation unit 1. In step S111, the observation unit 1 detects a sound duration of the synthesized sound, based on the observed value, and the observation unit 1 supplies the voice/sound data in the sound duration to the feature extraction unit 2. Thereafter, the process proceeds to step S112.

In step S112, as in step S103, the feature extraction unit 2 extracts an acoustic parameter from voice/sound data supplied from the observation unit 1 and supplies the extracted acoustic parameter sequence in the form of time-series data to the recognition unit 5. Thereafter, the process proceeds to step S113.

In step S113, as in step S104, the recognition unit 5 performs the recognition process using the acoustic parameter sequence supplied from the feature extraction unit 2, that is, the acoustic parameter sequence of the synthesized sound output from the driving unit 8, in a similar manner as described above with reference to FIG. 13, and the recognition unit 5 supplies a node label indicating a winner node of the auditory SOM as a result of recognition of the synthesized sound output from the driving unit 8 to the control unit 10. Thereafter, the process proceeds to step S114.

Hereinafter, the winner node of the auditory SOM obtained for the synthesized sound output from the driving unit 8 will be referred to as a synthesized sound winner node.

In step S114, based on the speech winner node indicated by the node label supplied in step S104 from the recognition unit 5 and also based on the synthesized sound winner node indicated by the node label supplied in step S113 from the recognition unit 5, the control unit 10 determines whether an end condition is satisfied to end the modification of the articulate parameter sequence generated in step S109 by the generation unit 6 and thus the modification of the model parameter of the generation node in step S108.

The end condition may be, for example, that the speech winner node of the auditory SOM given as the result of recognition of the speech uttered by the user is identical to the synthesized sound winner node given as the result of recognition of the synthesized sound output by the driving unit 8. When this end condition is satisfied, the result of recognition of the synthesized sound output by the driving unit 8 (the winner node of the auditory SOM given as the recognition result) is identical to result of recognition of the speech uttered by the user (the winner node of the auditory SOM given as the recognition result), and thus the synthesized sound output by the driving unit 8 can be regarded as identical to the speech uttered by the user within an error unrecognizable by the auditory SOM. Note that the judgment is given as a reward (a positive reward or a negative reward) by a user as to whether the synthesized sound output by the driving unit 8 can be regarded as identical to the speech uttered by the user within an error unrecognizable to the auditory sense of the user. Thus, the satisfaction of the end condition does not necessarily mean that the synthesized sound output by the driving unit 8 can be regarded as identical to the speech uttered by the user within an error unrecognizable to the user but means that the information processing apparatus (robot) has determined that the synthesized sound output by the driving unit 8 is identical to the speech uttered by the user.

Another example of the end condition is that the inter-pattern distance between the synthesized sound winner node given as the result of recognition of the synthesized sound output by the driving unit 8 and the speech winner node which belongs to the auditory SOM and which was given as the result of recognition of the speech uttered by the user has become equal to or less than a predetermined threshold value (for example, 1).

In a second or further following execution of step S114 in the loop from step S108 to S114, the end condition may be that the inter-pattern distance between the synthesized sound winner node and the speech winner node is equal to or greater than the inter-pattern distance obtained in the previous execution of the loop (that is, a minimum value of the inter-pattern distance between the synthesized sound winner node and the speech winner node has been obtained).

If the determination in step S114 is that the end condition to end the modification of the model parameter of the generation node is not satisfied, that is, if the inter-pattern distance between the synthesized sound winner node and the speech winner node is greater than the threshold value and thus the information processing apparatus has determined that the synthesized sound output by the driving unit 8 is not similar to the speech uttered by the user, then the process returns to step S108 to repeat the above-described process.

When step S108 is performed in the second or following iteration of the loop, the control unit 10 controls the model parameter modification unit 62 such that the model parameter of the generation node is modified from that obtained in the first execution of the loop and the resultant modified model parameter is supplied to the time-series data generation unit 63.

That is, under the control of the control unit 10, the model parameter modification unit 62 modifies the model parameter of the generation node read in step S107 from the storage unit 4 and supplies the resultant modified model parameter to the time-series data generation unit 63.

The model parameter of the HMM associated with the generation node may be modified according to one of methods described below.

A first method is to first determine an internally dividing point between the model parameter of the HMM associated with the generation node and the model parameter of the HMM associated with a node which belongs to the articulate SOM and which has a second greatest connection weight with the speech winner node, and then employ the model parameter of the HMM represented by the internally dividing point as the modified model parameter of the generation node. A specific example of the method of determining the internally dividing point between model parameters of the HMM is disclosed in From Stochastic Motion Generation and Recognition to Geometric Symbol Development and Manipulation" (Tetsunari Inamura, Hiroaki Tanie and Yoshihiko Nakamura, Proc. of Int'l Conf. on Humanoid Robots (Humanoids 2003). Another example of the method is disclosed, for example, in Construction of proto-type symbol space for relationship description between abstract motion by Hidden Markov Models" (Inamura et al., Proc. of ROBOMEC 2003, 2P2-3F-B2).

A second method is to first determine an externally dividing point of the model parameter of the HMM associated with the generation node and the model parameter of the HMM associated with an arbitrary node of the articulate SOM other than the generation node and then employ the model parameter of the HMM represented by the externally dividing point as the modified model parameter of the generation node. The externally dividing point of the model parameters of the HMM can be determined in a similar manner to the internally dividing point.

A third method is to randomly modify the model parameter of the HMM associated with the generation node.

Note that methods of modifying the model parameter of the HMM associated with the generation node are not limited to the three methods described above. Also note that modification of the model parameter of the HMM associated with the generation node does not necessarily need to be performed using a fixed of the three methods described above, but the method may be varied as required.

For example, when the inter-pattern distance between the speech winner node and the synthesized sound winner node obtained as the result of recognition in the immediately previous step S113 for the synthesized sound is rather small (not very large), the model parameter may be modified using the first method. On the other hand, when the inter-pattern distance is very large, the model parameter may be modified using the second or third method.

If step S108 is completed, that is, if the model parameter modification unit 62 has modified the model parameter of the generation node in the above-described manner and supplies the modifies model parameter to the time-series data generation unit 63, the process proceeds to step S109. In step S109, the time-series data generation unit 63 of the generation unit 6 (FIG. 14) generates a articulate parameter sequence from the model parameter (of the time-series pattern model 21 in the form of the HMM) of the generation node supplied from the model parameter modification unit 62 and supplies the generated articulate parameter sequence to the learning unit 7 and the driving unit 8. Thereafter, the process proceeds to step S110. In step S110, the driving unit 8 generates a synthesized sound using the articulate parameter sequence supplied from the generation unit 6 and outputs the resultant synthesized sound. Thereafter, the process proceeds from step S110 to S111.

In this specific case, because the model parameter of the generation node supplied from the model parameter modification unit 62 to the time-series data generation unit 63 was modified in step S108, the articulate parameter sequence generated in present step S109 from this model parameter becomes different from that generated in the previous execution of step S109. Therefore, the synthesized sound generated from this articulate parameter sequence in the present execution of step S110 also becomes different from the that generated in the previous execution of step S110.

Thereafter, steps S111 to S113 are performed in a similar manner as described above, and a node label indicating a winner node of the auditory SOM obtained as a result of the recognition process shown in FIG. 13 on the synthesized sound generated in the immediately previous step S110 is supplied to the control unit 10 from the recognition unit 5. Thereafter, the process proceeds to step S114.

If it is determined in step S114 that the end condition to end the modification of the model parameter of the generation node is satisfied, that is, for example, if, as a result of the iterative execution of the loop from steps S108 to S114, the synthesized sound winner node obtained as a result of recognition of the synthesized sound generated based on the articulate parameter sequence generated from the model parameter of the HMM modified in step S108 has become identical to the speech winner node or if the inter-pattern distance between the synthesized sound winner node and the speech winner node has become equal to or less than the predetermined threshold value and thus the information processing apparatus had determined that the synthesized sound output by the driving unit 8 is similar to the speech uttered by the user, then the process proceeds to step S115. In step S115, the control unit 10 controls the learning unit 7 to modify the articulate SOM and the connection weights of the connection network stored in the storage unit 4. Thereafter, the process returns to step S102 to wait for a next speech to be uttered by the user. If a next speech is uttered, the above-described process is repeated.

In this case, if no reward has been given (that is, if the answer to step S46 shown in FIG. 17 is No), then the learning unit 7 modifies the self-learning connection weight under the control of the control unit 10 (in step S47 shown in FIG. 17). More specifically, the learning unit 7 modifies (by means of learning) the articulate SOM and the connection weights of the connection network stored in the storage unit 4 in accordance with the articulate parameter sequence supplied in the immediately previous step S109 from the generation unit 6, that is, in accordance with the articulate parameter sequence that has satisfied the end condition, in a similar manner as described above with reference to FIG. 17.

On the other hand, in the case in which a reward has been given (that is, when the answer to step S46 in FIG. 17 is Yes), the learning unit 7 modifies the supervised learning connection weight under the control of the control unit 10 in step S48 in FIG. 17). More specifically, the learning unit 7 modifies (by means of learning) the articulate SOM of the connection network stored in the storage unit 4 in accordance with the articulate parameter sequence supplied in the immediately previous step S109 from the generation unit 6, that is, in accordance with the articulate parameter sequence that has satisfied the end condition and the learning unit 7 also modifies the connection weights of the connection network stored in the storage unit 4 in accordance with the reward (as the training signal) for the phoneme output in the immediately previous step S110 by the driving unit 8 in a similar manner as described above with reference to FIG. 17.

Now, the details of the process of modifying the self-learning connection weight and the details of the process of modifying the supervised learning connection weight are described below.

First, the details of the process of modifying the self-learning connection weight is described.

That is, in the learning unit 7 (FIG. 16), as in step S41 in FIG. 17 described above, the score calculation unit 71 calculates the score indicating the similarity of each node of the articulate SOM stored in the storage unit 4 to the new articulate parameter sequence supplied in the immediately previous step S109 from the generation unit 6, and the score calculation unit 71 supplies the calculated score to the winner node determination unit 72 and the self-learning connection weight modification unit 76.

In response, as in step S42 in FIG. 17 described above, the winner node determination unit 72 selects a node having a highest score calculated by the score calculation unit 71 from all nodes of the articulate SOM, and the winner node determination unit 72 employs the selected node as the winner node. The winner node determination unit 72 supplies a node label indicating the winner node to the modification weight determination unit 73. In response, as in step S43 in FIG. 17 described above, modification weight determination unit 73 determines the determination weight for each node of the articulate SOM, depending on the inter-pattern distance between each node and the winner node indicated by the node label supplied from the winner node determination unit 72, and the modification weight determination unit 73 supplies the resultant determination weight for each node to the learning data modification unit 74.

The learning data modification unit 74 acquires new learning data by mixing the new articulate parameter sequence supplied from the generation unit 6 and old learning data of nodes of the articulate SOM stored in the learning data storage unit 22 at a ratio determined according to the determination weight associated with each node, in a similar manner as in step S44 in FIG. 17. Thus, the content of the data stored in the learning data storage unit 22 is updated by the new learning data.

Then, as in step S45 in FIG. 17 described above, model learning unit 75 modifies the time-series pattern model 21 of each node of the articulate SOM by performing learning on the time-series pattern model 21 (HMM) using the new learning data modified by the learning data modification unit 74 and stored in the learning data storage unit 22.

On the other hand, in the case in which no reward has been given, the self-learning connection weight modification unit 76 modifies the connection weights of the connection network stored in the storage unit 4, in accordance with the score supplied from the score calculation unit 71 in terms of the new articulate parameter sequence supplied from the generation unit 6, for each node of the articulate SOM, in a similar manner to steps S46 and S47 in FIG. 17 described above.

That is, the self-learning connection weight modification unit 76 modifies the connection weight between each node of the auditory SOM and the winner node of the articulate SOM, which is a node having a highest score calculated by the score calculation unit 71 and which thus has highest likelihood that the articulate parameter sequence obtained when the end condition is satisfied (the articulate parameter sequence supplied in the immediately previous step S109 from the generation unit 6) is observed, such that the connection weight between the speech winner node of the auditory SOM and the winner node of the articulate SOM is most greatly increased (strengthened).

More specifically, the self-learning connection weight modification unit 76 modifies the connection weights in accordance with the following equation.

$$cwnew(W,j)=cwold(W,j)+\beta \text{score\_in}(j)\text{score\_out}(W) \quad (2)$$

where W is an index indicating a node that belongs to the articulate SOM and that has highest likelihood that the articulate parameter sequence will be observed when the end condition is satisfied (that is, a winner node having a highest score calculated by the score calculation unit 71), and j is an index indicating a node of the auditory SOM. When the total number of nodes of the auditory SOM is N, the index j takes values 1, 2, . . . , N.

Herein, if a node indicated by index W in the articulate SOM (a node with highest likelihood that the articulate parameter sequence is observed when the end condition is satisfied) is denoted as node #W, and a node indicated by index j in the auditory SOM is denoted as node #j, then cwnew(W, j) in equation (2) denotes the modified connection weight between node #W of the articulate SOM and node #j of the auditory SOM, and cwold(W, j) denotes the immediately previous connection weight between node #W of the articulate SOM and node #j of the auditory SOM.

In equation (2), $\beta$ is a constant, score_in(j) denotes the score of node #j of the auditory SOM determined for the speech uttered by the user, and score_out(W) denotes the score of node #W of the articulate SOM determined for the articulate parameter sequence obtained when the end condition is satisfied, that is, the score of node #W of the articulate SOM which is the winner node for the articulate parameter sequence obtained when the end condition is satisfied.

In calculation of equation (2), the self-learning connection weight modification unit 76 acquires the score score_out(W) of node #W of the articulate SOM from the scores supplied from the score calculation unit 71, and the score score_in(j) of each node #j of the auditory SOM from the control unit 10. That is, the control unit 10 acquires the score score_in(j) of each node #j of the auditory SOM determined for the speech uttered by the user from the recognition unit 5 and supplies it to the self-learning connection weight modification unit 76. The self-learning connection weight modification unit 76 calculates equation (2) using the score score_in(j) supplied from the control unit 5.

In step S115, the self-learning connection weight modification unit 76 may also modify the connection weights of the connection network stored in the storage unit 4 as follows.

That is, the self-learning connection weight modification unit 76 modifies the connection weight between each node of the auditory SOM and the winner node of the articulate SOM having the highest score calculated by the score calculation unit 71 such that a greatest increase is given for the connection weight between a node of the articulate SOM having highest likelihood that the articulate parameter sequence obtained when the end condition is satisfied (the articulate parameter sequence supplied from the generation unit 6 in immediately previous execution of step S109) is observed, that is, the winner node having the highest score calculated by the score calculation unit 71 and the winner node of the auditory SOM determined for the observed value output by the observation unit 1 as the observed value of the synthesized sound that is output by the driving unit 8 in accordance with the articulate parameter generated from the winner node of the articulate SOM.

More specifically, the self-learning connection weight modification unit 76 modifies the connection weight in accordance with the following equation.

$$cwnew(W,j)=cwold(W,j)+\beta score\_in'(j)score\_out(W) \quad (3)$$

where W, j, cwnew(W, j), cwold(W, j), β, and score_out(W) are similar to those in equation (2), and score_in'(j) denotes the score of node #j of the auditory SOM determined for the synthesized sound that is generated by the driving unit 8 in accordance with the articulate parameter sequence generated from node #W of the articulate SOM.

When the connection weights are modified in accordance with equation (3), it is required to acquire the score score_in' (j) of node #j of the auditory SOM determined for the synthesized sound that is generated by the driving unit 8 in accordance with the articulate parameter sequence generated from node #W of the articulate SOM.

For the above-purpose, the control unit 10 controls the generation unit 6 to generate the articulate parameter sequence from node #W of the articulate SOM modified by the learning unit 7. More specifically, under the control of the control unit 10, the model parameter modification unit 62 of the generation unit 6 (FIG. 14) reads the model parameter of node #W of the articulate SOM from the storage unit 4 and directly supplies it to the time-series data generation unit 63.

The time-series data generation unit 63 generates the articulate parameter sequence from the model parameter (the HMM of the time-series pattern model 21 defined by the model parameter) of node #W supplied from the model parameter modification unit 62, and the time-series data generation unit 63 supplies the generated articulate parameter sequence to the driving unit 8.

The control unit 10 controls the driving unit 8 to generate a synthesized sound using the articulate parameter sequence supplied from the generation unit 6. The synthesized sound output by the driving unit 8 is observed by the observation unit 1. The observation unit 1 detects a sound duration of the synthesized sound, based on the observed value, and the observation unit 1 supplies the voice/sound data in the sound duration to the feature extraction unit 2. The feature extraction unit 2 extracts an acoustic parameter from voice/sound data supplied from the observation unit 1 and supplies the extracted acoustic parameter sequence in the form of time-series data to the learning unit 3 and the recognition unit 5. The recognition unit 5 performs the recognition process using the acoustic parameter sequence supplied from the feature extraction unit 2, that is, the acoustic parameter sequence of the synthesized sound output from the driving unit 8, in a similar manner as described above with reference to FIG. 13.

The control unit 10 acquires the score score_in'(j) of each node #j of the auditory SOM for the acoustic parameter sequence obtained for the synthesized sound via the recognition process performed by the recognition unit 5 under the control of the control unit 10, and the control unit 10 supplies the acquired score score_in'(j) to the self-learning connection weight modification unit 76. The self-learning connection weight modification unit 76 calculates equation (3) using the score score_in'(j) supplied from the control unit 5.

In the case in which the connection weights are modified by calculating equation (3) in step S115, the process proceeds to step S116 in a box represented by a broken line shown in FIG. 18 after the modification of the connection weights is completed. In step S116, the control unit 10 controls the learning unit 3 to modify the auditory SOM stored in the storage unit 4 using the acoustic parameter sequence of the synthesized sound generated by the driving unit 8 in accordance with the articulate parameter sequence generated from node #W of the articulate SOM.

That is, the acoustic parameter sequence of the synthesized sound generated by the driving unit 8 in accordance with the articulate parameter sequence generated from node #W of the articulate SOM is supplied from the feature extraction unit 2 to the learning unit 3 and the recognition unit 5 as described above. Under the control of the control unit 10, the learning unit 3 performs the learning described above with reference to FIG. 11 using the received acoustic parameter sequence of the synthesized sound thereby modifying the auditory SOM stored in storage unit 4.

The details of the modification of self-learning connection weights have been described above.

Now, the modification of supervised learning connection weights is described in detail below.

The supervised learning connection weight modification unit 77 modifies the connection weight between each node of the auditory SOM and a node of the articulate SOM having highest likelihood that the articulate parameter sequence obtained when the end condition is satisfied (the articulate parameter sequence supplied from the generation unit 6 in immediately previous execution of step S109) is observed, that is, the winner node having the highest score calculated by the score calculation unit 71 such that the connection weight associated with the speech winner node of the auditory SOM is increased most greatly when a positive reward is given, while the connection weight associated with the speech winner node of the auditory SOM is reduced most greatly when a negative reward is given.

More specifically, when the positive reward is given, the supervised learning connection weight modification unit 77 modifies the connection weights, for example, in accordance with the following equation.

$$cwnew(W,j)=(1+Ge)cwold(W,j) \qquad (4)$$

On the other hand, when the negative reward is given, the supervised learning connection weight modification unit 77 modifies the connection weights, for example, in accordance with the following equation.

$$cwnew(W,j)=(1-Ge)cwold(W,j) \qquad (5)$$

In equations (4) and (5), Ge is the gain for the connection weight cwold(W, j). The gain Ge is variable within the range from 0 to 1. The degree of increase or decrease in connection weights increases with the gain Ge.

There is no particular restriction on the method of determining the value of the gain Ge. For example, the gain Ge may be determined as follows. That is, the value of the gain Ge is determined by a function such that most strong learning is performed for the winner node of the auditory SOM in step S106 and for the node of the articulate SOM having highest likelihood that the articulate parameter sequence obtained when the end condition is satisfied (the articulate parameter sequence supplied from the generation unit 6 in immediately previous execution of step S109) is observed, that is, the winner node having the highest score calculated by the score calculation unit 71, and the influence of the function on the value of the gain Ge decreases with increasing inter-pattern distance between a node of the articulate SOM and a node of the auditory SOM.

In the example shown in FIG. 9 of the method of determining the modification weights in the learning using the combination of the HMM and SOMs, the modification weights are modified in accordance with the Gaussian curve. This method can also be used to determine the value of the gain Ge. That is, the value of the gain Ge may be determined in accordance with a Gaussian curve. If this method is employed, the value of the gain Ge decreases (toward zero) with increasing inter-pattern distance between a node of the articulate SOM and a node of the auditory SOM.

Instead of using the method described above, the value of the gain Ge may be determined taking into account the degree of influence of the reward on the learning (modification of supervised learning connection weights). A specific example of this method is described below with reference to FIG. 19.

In the modification of supervised learning connection weights, a right answer is given in the form of a reward from the external world, as described above. When the auditory SOM and the articulate SOM are in a converged state, if learning (modification) is performed such that the degree of strengthening or weakening is increased, it is possible to quickly establish the mapping (node connection weights) between the auditory SOM and the articulate SOM.

Herein the converged state refers to a state in which the self-organization maps (the auditory SOM and the articulate SOM) are established such that one arbitrary node thereof represents a certain phoneme, another node represents another phoneme, and so on.

At an early stage of the process of modifying the supervised learning connection weights, the auditory SOM and the articulate SOM are not yet converged. In such a state in which the auditory SOM and the articulate SOM are not yet converged, if learning is performed such that the degree of increase or decrease in the supervised learning connection weight is increased with progress of learning, there is a possibility that, with progress of learning, nodes come to represent categories different for the auditory SOM and the articulate SOM. In this situation, if connections of nodes between the auditory SOM and the articulate SOM have been strengthened, it becomes difficult to perform proper learning.

Figure 19:
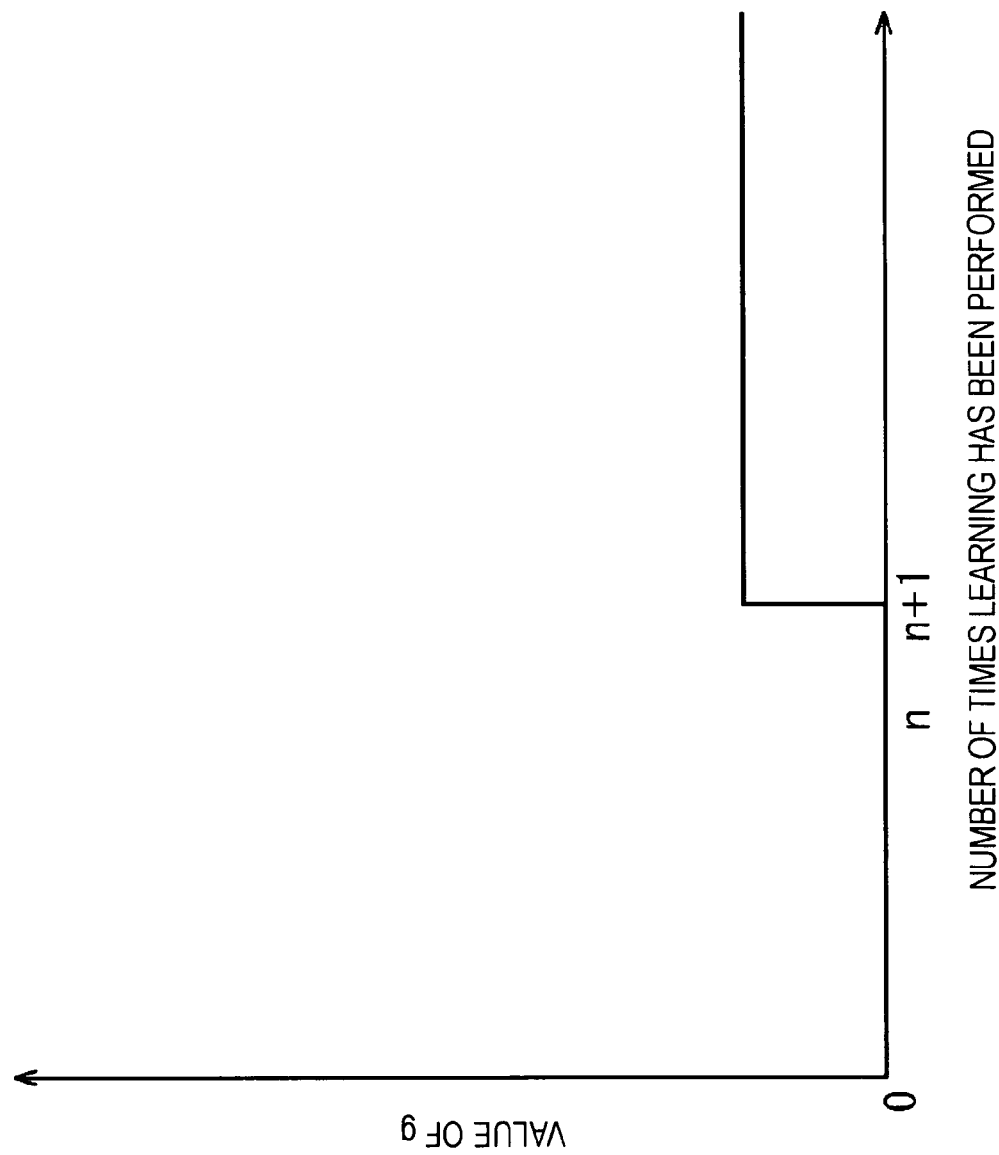
FIG. 19 shows an example of a method of supervised learning of connection weights based on rewards.

To avoid the problem described above, in the method of determining the value of the gain Ge shown in FIG. 19, the term of the gain Ge in equations (4) and (5) is defined, for example, by equation (6) shown below, and the value of g on the right-hand side of equation (6) is fixed to 0 at an early stage of modification of the supervised learning connection weights until the supervised learning connection weights have been modified a greater number of times than a predetermined value n, but the value of g is switched to a predetermine value (for example, 1.0) at the end of the early stage of the modification process as shown in FIG. 19.

$$Ge=g*C \qquad (6)$$

where, as described above, the value of g is determined depending on the number of times the connection weights have been modified, and C is a variable whose value is controlled by the supervised learning connection weight modification unit 77 in accordance with the inter-pattern distance between nodes of the articulate SOM and the auditory SOM and also in accordance with additional information as required.

Thus, in this method, at the early stage where the connection weights have been modified a less number of times than the predetermined number n and thus the auditory SOM and articulate SOM have not yet been converged, the supervised learning connection weights are not substantially modified even if a reward (training) is given, as can be seen from equations (4) and (5), that is, the supervised learning connection weights are not influenced by the reward (training).

When the connection weights have been modified the predetermined number (n) of times, and thus the auditory SOM and the articulate SOM have been converted to a certain degree, the modification of the supervised learning connection weights is substantially started. That is, in the modification performed after the connection weights have been modified the predetermined number (n) of time, the modification is influenced by the reward (training). In this modification mode, the supervised learning connection weight modification unit 77 properly varies the value of C in equation (6) so that the degree of increase or decrease in the connection weights is properly changed thereby properly adjusting the degree of influence of the reward (training). More specifically, the learning is substantially started at the point of time when the connection weights have been modified as many times as n+1, and thus the supervised learning connection weight modification unit 77 controls the value of C on the right-hand side of equation (6) so that the degree of increase or decrease in the connection weights is maintained low at the early stage of the learning (until the connection weights have been modified as many times as n+1) but the degree of strengthening or weakening of the connection weights is increased with the progress of learning (after the connection weights have been modified as many times as n+1) and thus the auditory SOM and the articulate SOM (more strictly, the self-organization maps thereof) are being converged. That is, the increasing in the degree of strengthening or weakening of the connection weights is performed such that the value of cwnew(W, j) is increased when a positive reward is given, but the value of cwnew(W, j) is decreased when a negative reward is given. This makes it possible to more quickly and accurately learn the mapping (that is, the connection weight between each node of the auditory SOM and each node of the articulate SOM).

Although the number of times the connection weights have been modified is defined by the number of times the supervised learning connection weights have been modified, the number of times the connection weights have been modified may be defined by the sum of the number of times the supervised learning connection weights have been modified and the number of times the self-evaluation connection weights have been modified.

The details of the process of modifying the self-learning connection weights and also the details of the process of modifying the supervised learning connection weights have been described above.

When it is desirable to further increase the influence of the reward (training) given by the user, the degree of strengthening (or weakening) of the supervised learning connection weights by the modification is increased greater than the degree of strengthening (or weakening) of the self-learning connection weights.

In the example shown in FIG. 18, the modification of the supervised learning connection weights is performed in step S115 when the answer to step S114 is Yes. However, there is no particular restriction on the timing of the modification of the supervised learning connection weights, and the modification may be performed at an arbitrary point of time after a reward is given regardless of the result of the answer to step S114.

In the information processing apparatus shown in FIG. 1, as described above, the auditory SOM is learned (modified) based on an acoustic parameter sequence of a speech uttered by a user, and a node of the auditory SOM having a highest score calculated for the acoustic parameter of the speech uttered by the user is determined as a winner node. Furthermore, a node of the articulate SOM having a greatest connection weight with the winner node of the auditory SOM is searched for, and a detected node is employed as the generation node. Furthermore, in the information processing apparatus shown in FIG. 1, the articulate parameter sequence generated from the generation node is modified by modifying the model parameter associated with the generation node, and a synthesized sound is generated in accordance with the resultant articulate parameter sequence. Furthermore, the determination is made as to whether the end condition is satisfied, based on the winner node (the synthesized sound winner node) of the auditory SOM determined for this synthesized sound and based on the winner node (the speech winner node) of the auditory SOM determined for the speech uttered by the user. If the end condition is satisfied, the connection weights are modified, and furthermore, the articulate SOM is learned (modified) based on the articulate parameter sequence obtained when the end condition is satisfied.

Thus, in a robot or the like using the information processing apparatus shown in FIG. 1, it is possible to actively change the action of the robot, self-evaluate the resultant action, and adapt the action to a stimulus applied to the robot from the external world. More specifically, for example, a speech (a synthesized sound) uttered as an action of the robot is actively changed, the resultant synthesized sound is self-evaluated, and the synthesized sound is adapted to a speech given as an external stimulus by the user.

Figure 20:
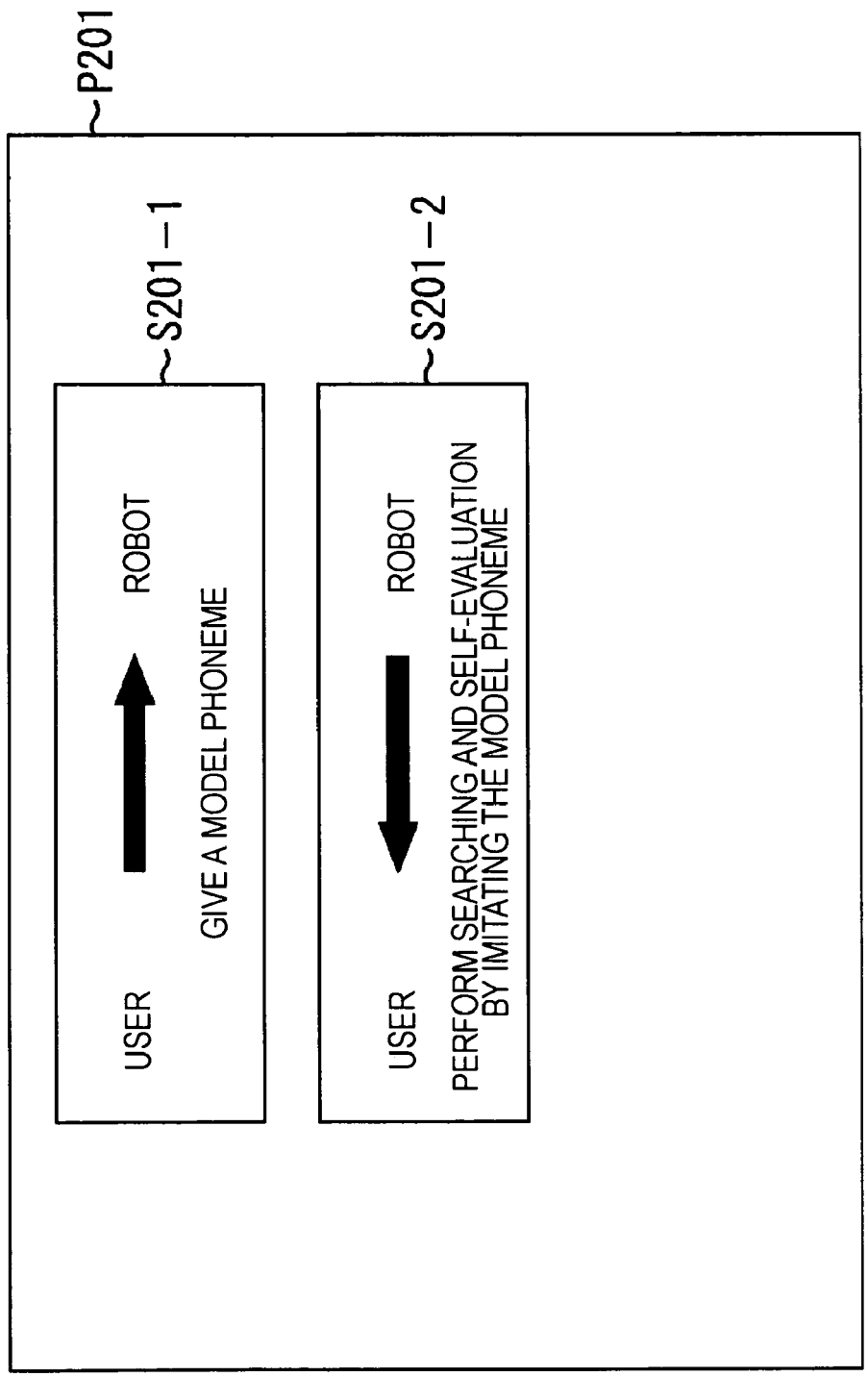
FIG. 20 shows an example of a protocol to learn connection weights based on self-evaluation.

That is, the information processing apparatus shown in FIG. 1 (and the robot using thereof) is capable of performing the process including communication with the user, in accordance with a protocol P201 shown in FIG. 20.

The protocol P201 includes steps S201-1 and S201-2, as described below.

In step S201-2, the user gives a model phoneme actually used in a society to which the user belongs to the robot by uttering a speech. The robot recognizes the speech uttered by the user using the auditory SOM and utters a synthesized sound generated by imitating the speech uttered by the user. In the generation of the synthesized sound, the robot modifies a articulate parameter of the articulate SOM, synthesizes a sound in accordance with the modified articulate parameter, and outputs the synthesized sound.

In step S201-2, the robot searches for a voice similar to the speech uttered by the user and self-evaluates the voice. More specifically, the robot performs voice recognition on the synthesized sound output by the robot itself, by using the auditory SOM, and self-evaluates whether the synthesized sound is similar to the speech uttered by the user, by determining whether the end condition is satisfied. If the self-evaluation is that the synthesized sound is sufficiently similar to the speech uttered by the user (that is, if the end condition is satisfied), a proper connection (mapping) between nodes of the articulate SOM and the auditory SOM is acquired by means of unsupervised learning by mapping corresponding nodes of the articulate SOM and the auditory SOM, that is, by strengthening the connection between the node of the articulate SOM that allows it to generate a synthesized sound similar to the speech uttered by the user and the node of the auditory SOM obtained as the result of recognition of the synthesized sound or the speech uttered by the user.

In this technique, if the user utters a speech, the robot (that is, the information processing apparatus shown in FIG. 1) modifies the articulate parameter by modifying the model parameter of the time-series pattern model 21 (FIG. 5) associated with the node of interest of the articulate SOM so as to achieve a goal (articulate target) that a articulate parameter (sequence) that allows it to generate a synthesized sound similar to the speech uttered by the user. Furthermore, in the robot (that is, in the information processing apparatus shown in FIG. 1), the driving unit 8 generates a synthesized sound in accordance with the modified articulate parameter. The resultant synthesized sound is recognized using the auditory SOM and self-evaluated to determine whether the synthesized sound becomes sufficiently similar to the speech uttered by the user, by determining whether the end condition is satisfied. Furthermore, in the robot (that is, in the information processing apparatus shown in FIG. 1), the mapping (the connection weight) between the articulate SOM and the auditory SOM is modified such that the connection is strengthened between the node of the articulate SOM that allows it to generate the synthesized sound similar to the speech uttered by the user and the node of the auditory SOM obtained as the result of recognition of the synthesized sound or the speech uttered by the user.

Thus, by applying the information processing apparatus shown FIG. 1 to the robot or the like in the above-described manner, it becomes possible to realize the robot that, when a user utters a speech, generates a synthesized sound repeatedly until the synthesized sound becomes sufficiently similar to the speech uttered by the user, that is, the robot that can directly imitate the speech uttered by the user.

A synthesized sound imitating a speech uttered by a user may be generated by using one of two methods. A first method is to perform voice recognition on a speech uttered by a user using a dictionary and generate a synthesized sound in accordance with a result of the voice recognition. A second method is to record a speech uttered by a user and play it back.

In the first method, because the voice recognition is performed using the dictionary, it is impossible to recognize a word that is not registered in the dictionary and thus it is impossible to synthesize such a word. That is, in the first method, it is possible to directly imitate a speech uttered by a user within a range of words registered in the dictionary.

In the second method, a speech uttered by a user is simply recorded and played back, and thus any slight difference or variation occurs between the speech uttered by the user and the sound uttered by the robot. This type of robot will not be interested much by the user. In the second method, the synthesized sound may be passed through a filter to convert the synthesized sound into a sound with frequency components different from those of the speech uttered by the user.

Specific examples of techniques to directly imitate a speech uttered by a user and examples of techniques to convert synthesized sounds are disclosed, for example, in Japanese Unexamined Patent Application Publication No. 11-9847, Japanese Patent No. 1758551, PCT Japanese Translation Patent Publication No. 2001-522471, Japanese Unexamined Patent Application Publication No. 09-179572, and Japanese Unexamined Patent Application Publication No. 2000-122699.

When the first or second method is applied to a robot, the robot utters a speech simply by imitating a speech uttered by a user, and thus the user does not have a feeling that the robot has become able to imitate a speech uttered by the user as a result of growing of the robot.

On the other hand, when the information processing apparatus shown in FIG. 1 is applied to a robot, it is possible to realize a robot that is capable of learning how to speak and that becomes able to imitate a speech uttered by a user better and better via the learning process. Synthesized sounds generated by the robot are limited by the articulate SOM that serves as a articulator (for example, limited by the total number of nodes of the articulate SOM, the node arrangement structure, parameters employed as articulate parameter, and the model employed as the time-series pattern model 21 (FIG. 5)). This limits the capability of the robot to imitate speeches uttered by a user, and the robot outputs synthesized sounds achieved as a result of best efforts to imitate speeches uttered by the user. This allows the robot to have particular individuality in imitating speeches uttered by the user. Furthermore, the user can have a feeling that the robot, which can not well imitate speeches uttered by the user at an early stage of learning, becomes able to imitate speeches uttered by the user better and better via the learning process.

As described above, the information processing apparatus shown in FIG. 1 is capable of acquiring the mapping between the auditory SOM and the articulate SOM (the node connection weights between the auditory SOM and the articulate SOM) by means of unsupervised learning based on self-evaluation. Once the mapping is acquired, the information processing apparatus can recognize speeches (voices) uttered by the user and can generate synthesized voices similar to voices uttered by the user.

Furthermore, by learning (modifying) the auditory SOM in the self-organizing manner, the information processing apparatus shown in FIG. 1 can acquire the capability of distinguishing arbitrary phonemes and thus can acquire the capability of recognizing any arbitrary phonemes. That is, the information processing apparatus can acquire the capability of imitating a set (a pattern) of arbitrary phonemes without using a prepared dictionary in which phonemes are defined, that is, the information processing apparatus can acquire phonemes used by the user and can imitate the phonemes used by the user.

If a speech is uttered by a user, the information processing apparatus shown in FIG. 1 outputs a synthesized sound (repeatedly) find a synthesized sound more similar to the speech uttered by the user. This behavior makes the user have a feeling that the information processing apparatus imitates the speech uttered by the user. Furthermore, it seems, for the user, that the information processing apparatus becomes able to imitate better and better with the progress of learning (modification) on the connection network, that is, the auditory SOM, the articulate SOM, and the connection weights.

Because the information processing apparatus shown in FIG. 1 generates synthesized sounds not randomly but so as to acquire sounds similar to those uttered by a user, the user has a feeling that the information processing apparatus is attempting to imitate the speech uttered by the user.

The process of learning (modifying) the connection network performed by the information processing apparatus shown in FIG. 1 seems, for the user, as if the information processing apparatus is playing a game to directly imitate a sound uttered by the user. This is very fun for the user.

The information processing apparatus shown in FIG. 1 outputs synthesized sounds achieved as a result of best efforts to imitate speeches uttered by the user, within the limit by the articulate SOM serving as the articulator. Thus, unlike the simple imitation of speeches uttered by a user by recording the speeches and playing them back, it is possible to have particular individuality in imitating speeches uttered by the user.

Furthermore, in the information processing apparatus shown in FIG. 1, each time a speech is uttered by a user, learning (modifying) of the connection network is performed in real time, the user can observe the progress of acquiring the capability of imitating speeches uttered by the user better and better.

However, in the information processing apparatus shown in FIG. 1, as described earlier, when the mapping (the node connection weights) between the auditory SOM and the articulate SOM is acquired by means of unsupervised learning based on only the self-evaluation, if the self-evaluation is wrong, the acquired mapping is also wrong.

There can be two types of wrong mapping. In a first type of wrong mapping, although a certain phoneme generated by the robot based on a articulate parameter is included in phonemes actually used in a human society, the phoneme is mapped to a wrong phoneme. In a second type of wrong mapping, a certain phoneme generated by the robot based on a articulate parameter is not included in phonemes actually used in a human society, and this phoneme is mapped to a particular phoneme actually used in the human society.

In the information processing apparatus shown in FIG. 1, to avoid the above problem, as described above, more accurate mapping is established by performing supervised learning based on reward given as a training signal by a user, in addition to the unsupervised learning. More specifically, for example, the information processing apparatus shown in FIG. 1 (and the robot using thereof) establishes the correct mapping by performing a process including communication with a user according to a protocol P202 shown in FIG. 21 or a protocol P203 shown in FIG. 22.

First, in protocol P202, a user teaches phonemes to the robot in a similar manner to a manner in which a human adult teaches phonemes to a human child. More specifically, the user gives various model phonemes to the robot, and the robot leans mapping (node connection weights) between the auditory SOM and the articulate SOM based on the given model phonemes. When the robot has learned the mapping to a certain degree, the user makes the robot execute a process according to protocol P203. That is, the user makes the robot utter sounds randomly (output synthesized sounds randomly) and gives reward to the robot depending on the synthesized sounds (phonemes). The robot learns the mapping associated with the synthesized sounds in accordance with the given reward. This makes it possible for the robot to acquire more accurate mapping.

The protocols P202 and P203 are described in further detail below.

Figure 21:
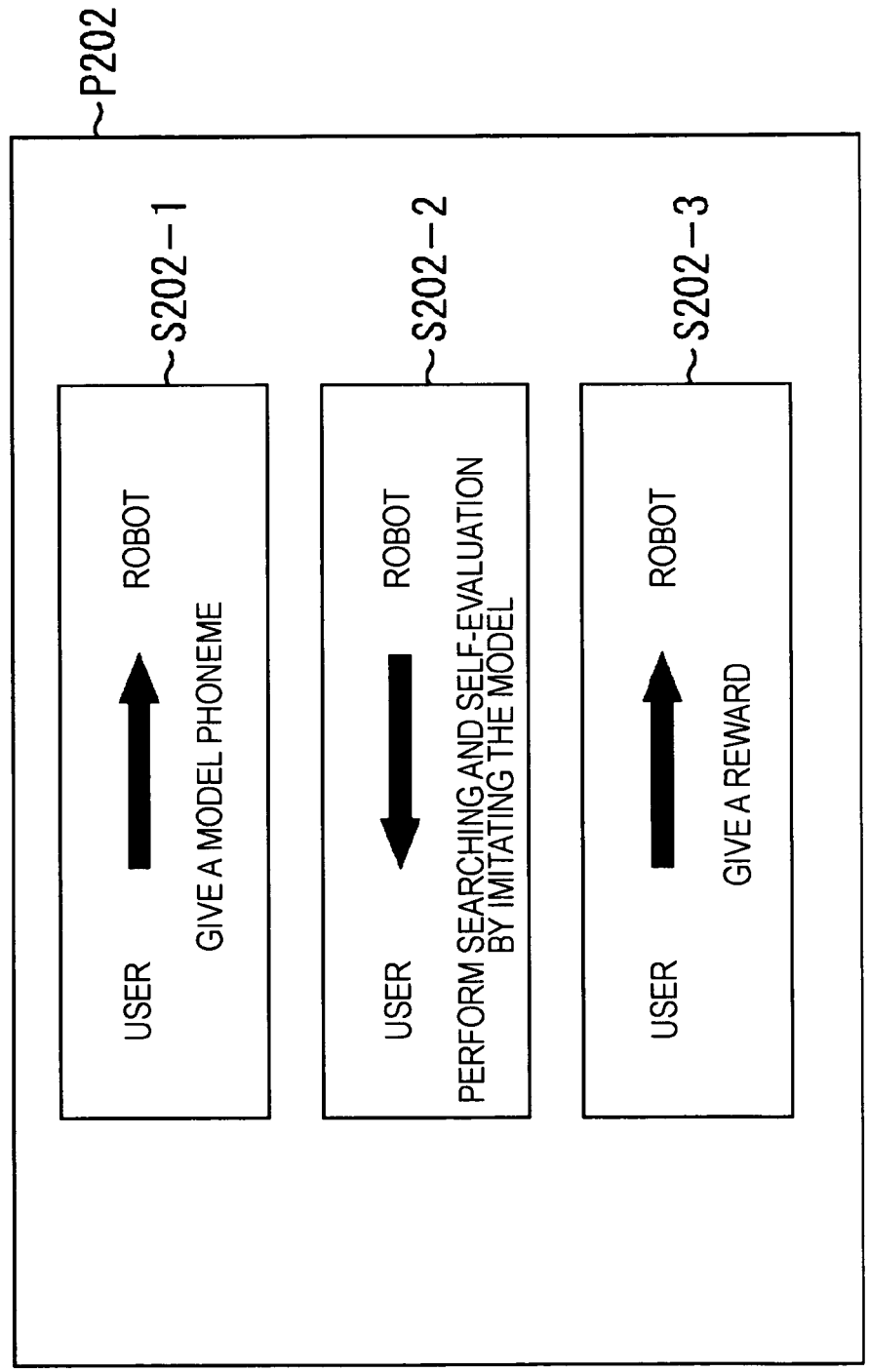
FIG. 21 shows an example of a protocol to perform supervised learning of connection weights based on rewards.

First, referring to FIG. 21, protocol P202 is described.

Protocol P202 includes steps S202-1, S202-2 and S202-3.

Steps S202-1 and S202-2 are basically similar to respective steps S201-1 and S201-2 of protocol P201 described above with reference to FIG. 20, and thus a duplicated explanation thereof is omitted.

When a phoneme is uttered by the robot as a result of the process in step S202-2, if the user evaluates it as being in the same category as that of one of model phonemes given in step S202-1 by the user, then, in step S202-3, the user gives a positive reward to the robot. In response to receiving the positive reward, the robot modifies connection weights so that the connection weight is strengthened between the node of the HMM of the auditory SOM corresponding to the model phoneme recognized in step S202-1 and the node of the HMM of the articulate SOM corresponding to the phoneme uttered in step S202-2 by the robot.

On the other hand, when a phoneme is uttered by the robot as a result of the process in step S202-2, if the user evaluates it as not being in any category of model phonemes given in step S202-1 by the user, then, in step S202-3, the user gives a negative reward to the robot. In response to receiving the negative reward, the robot modifies connection weights so that the connection weight is weakened between the node of the HMM of the auditory SOM corresponding to the model phoneme recognized in step S202-1 and the node of the HMM of the articulate SOM corresponding to the phoneme uttered in step S202-2 by the robot. This causes the robot to utter this phoneme less and less frequently.

Now, referring to FIG. 22, protocol P203 is described below.

At an arbitrary point of time, as described above, the robot can generate a articulate parameter (a articulate parameter sequence) based on a node of the HMM of the articulate SOM using the articulator of the robot (the information processing apparatus shown in FIG. 1) and can utter a synthesized sound (a phoneme) according to the generated articulate parameter. The user can also give a reward for such a sound spontaneously uttered by the robot. Protocol P203 shown in FIG. 22 is an example of a protocol to give such a reward.

Protocol P203 includes steps S203-1 and S203-2.

In step S203-1, the robot utters a sound corresponding to a randomly selected node of the articulate SOM.

For example, when a synthesized sound uttered in step S203-1 by the robot is identical to a sound that the user can also utter, that is, when the synthesized sound uttered by the robot is identical to one of sounds actually used in a human society, then, in step S203-2, the user gives a positive reward to the robot. In response to receiving the positive reward, the robot determines the node of the auditory SOM employed to recognize the synthesized sound (phoneme) uttered in step S203-1 by the robot itself as the speech winner node of the auditory SOM. Furthermore, the robot determines the node of the articulate SOM used to synthesize the sound uttered in step S203-1 as the winner node of the articulate SOM. The robot then modifies connection weight between the winner node of the articulate SOM and each node of the auditory SOM such that the connection weight is most increased (strengthened) between the winner node of the articulate SOM and the speech winner node of the auditory SOM.

On the other hand, when a synthesized sound uttered in step S203-1 by the robot is a sound that is not used in the human society to which the user belongs, then, in step S203-2, the user gives a negative reward to the robot. In response to receiving the negative reward, the robot determines the node of the auditory SOM employed to recognize the synthesized sound (phoneme) uttered in step S203-1 by the robot itself as the speech winner node of the auditory SOM. Furthermore, the robot determines the node of the articulate SOM used to synthesize the sound uttered in step S203-1 as the winner node of the articulate SOM. The robot then modifies connection weight between the winner node of the articulate SOM and each node of the auditory SOM such that the connection weight is most decreased (weakened) between the winner node of the articulate SOM and the speech winner node of the auditory SOM. This causes the robot to utter this phoneme uttered in step S203-1 less frequently thereafter.

Figure 22:
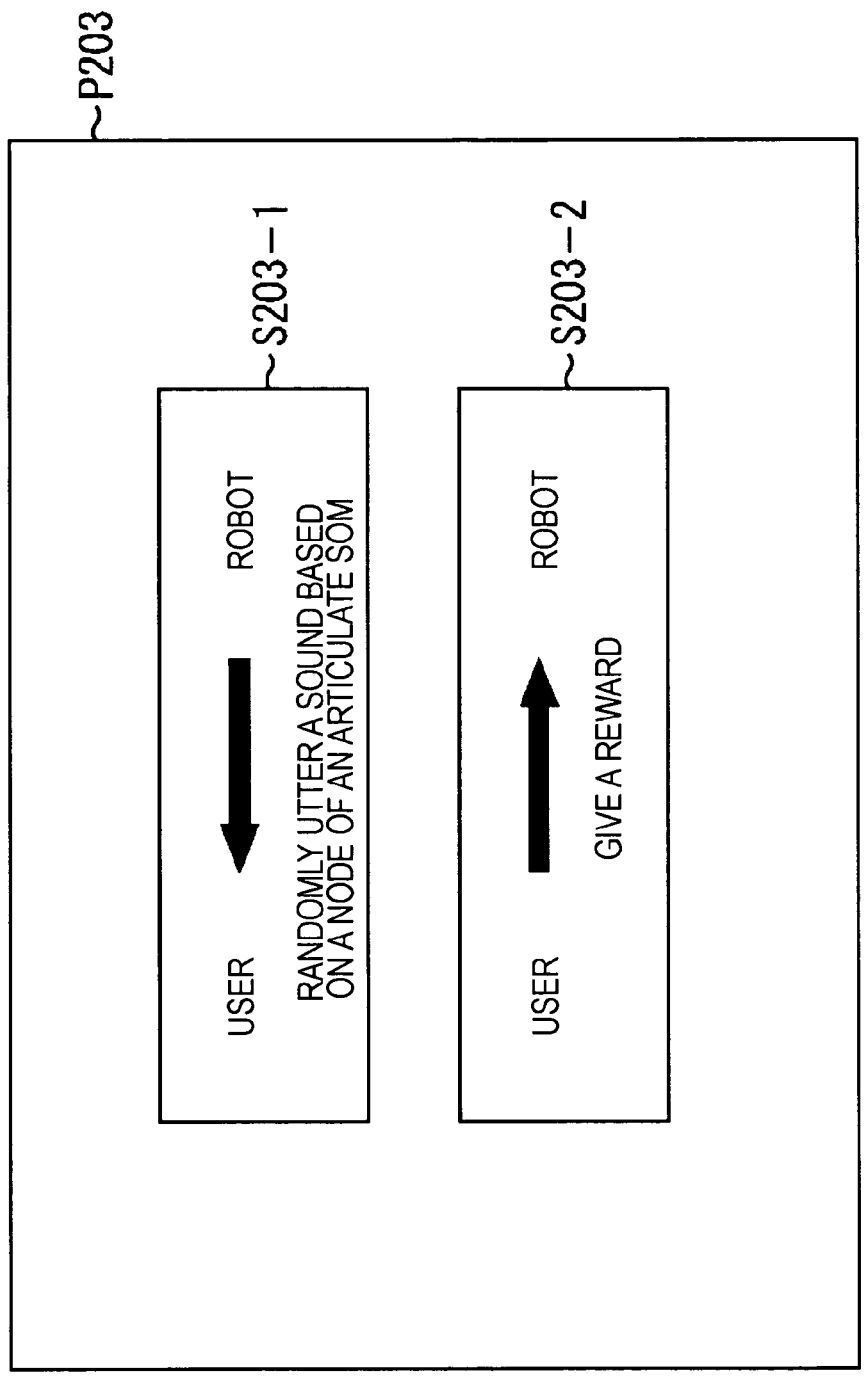
FIG. 22 shows an example of a protocol to perform supervised learning of connection weights based on rewards.

In the embodiment described above, protocol P202 shown in FIG. 21 and protocol P203 shown in FIG. 22 are used together. Alternatively, these protocols may be used separately.

For example, by using protocol P203 shown in FIG. 22 singly, it is possible correctly remove phonemes that are not used in a human society from phonemes that the robot can generate.

With reference to FIGS. 21 and 22, protocols 202 and 203 have been explained above as examples of protocols to learn mapping (node connection weights) between the auditory SOM and the articulate SOM.

In protocols P202 and P203, there is no particular restriction on the method to give rewards to the robot from the user. In the specific examples of protocols P202 and P203 described above, it is assumed that the information processing apparatus shown in FIG. 1 is applied to the robot, and thus it is possible to employ one of two methods described below.

In a first method, to give a positive reward to the robot, the user pats the robot on its head thereby giving a positive reward signal to a touch sensor (not shown) disposed on the head of the robot. On the other hand, to give a negative reward to the robot, the user taps the robot on its head thereby giving a negative reward signal to the touch sensor disposed on the head of the robot.

In a second method, to give a positive reward to the robot, the user tenderly imitates a sound uttered by the robot. On the other hand, to give a negative reward to the robot, the user ignores the sound uttered by the robot (that is, the user does not respond to the sound uttered by the robot). When the second method is used, it is desirable that the reward acquisition unit 9 be constructed so as to have a voice input function or be constructed in the observation unit (the voice input unit) 1 so that the reward acquisition unit 9 can use the voice input function of the observation unit 1.

As described above, the information processing apparatus shown in FIG. 1 is capable of not only learning the mapping (the node connection weights) between the auditory SOM and the articulate SOM by means of unsupervised learning in protocol P201 shown in FIG. 20 based on the self-evaluation but also supervised learning (modification of the supervised learning connection weights) based on positive or negative rewards such as that learning via protocol P202 shown in FIG. 21 or protocol P203 shown in FIG. 22 to more accurately establish the mapping. Even when the information processing apparatus shown in FIG. 1 utters a phoneme (synthesized sound) that is not actually used in a human society, mapping associated with that phoneme is gradually weakened via the supervised learning, and thus the frequency of uttering such a phoneme is gradually reduced. Eventually, the phoneme comes not to be uttered at all.

The processing sequence described above may be executed by hardware or software. When the processes are performed by software, a software program is installed on a general-purpose computer or the like.

Figure 23:
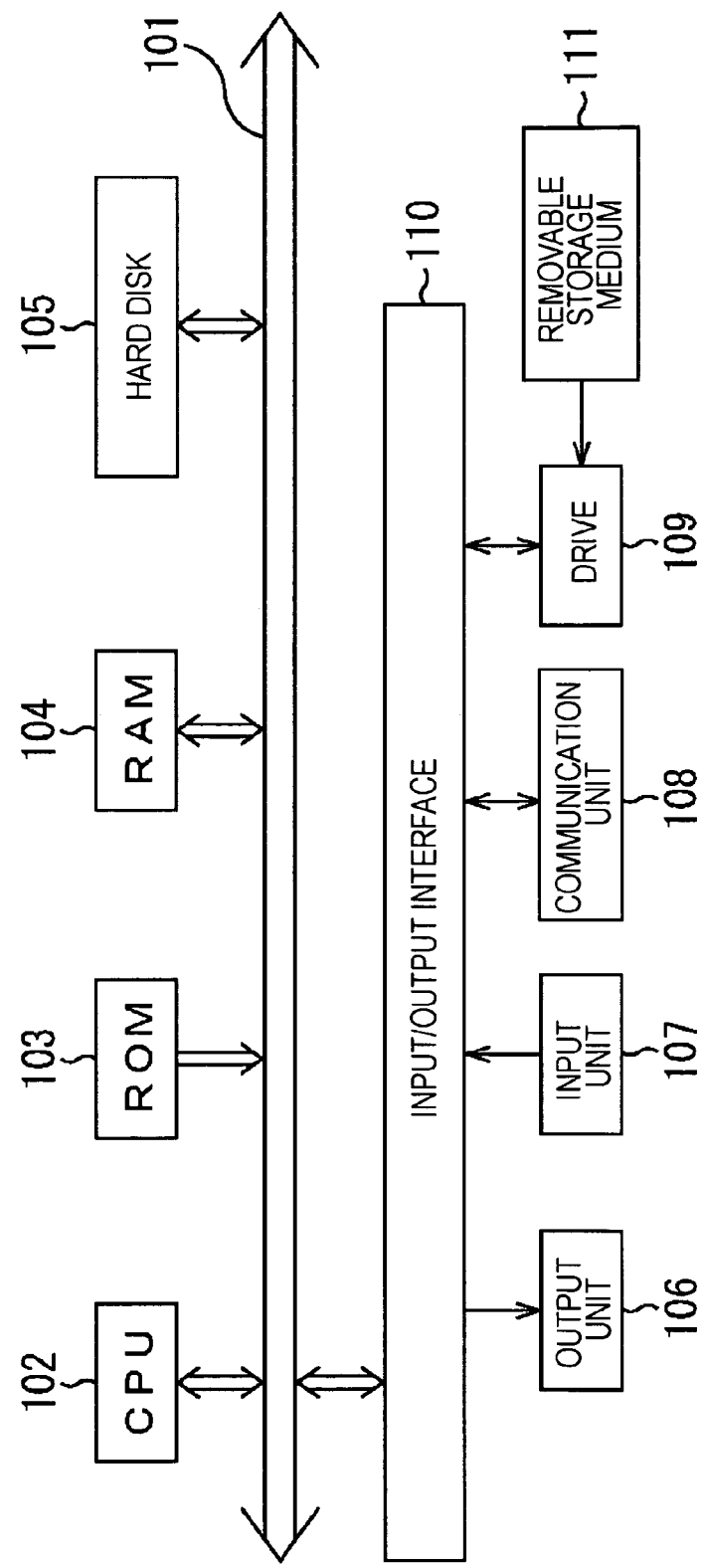
FIG. 23 is a block diagram showing an information processing apparatus according to an embodiment of the present invention.

FIG. 23 illustrates an embodiment of the invention in which a program used to execute the processes described above is installed on a computer.

The program may be stored, in advance, on a hard disk 105 or a ROM 103 serving as a storage medium, which is disposed inside the computer.

Alternatively, the program may be stored (recorded) temporarily or permanently on a removable storage medium 111 such as a floppy disk, a CD-ROM (Compact Disc Read Only Memory), a MO (Magnetooptical) disk, a DVD (Digital Versatile Disc), a magnetic disk, or a semiconductor memory. Such a removable storage medium 111 may be provided in the form of so-called package software.

Instead of installing the program from the removable storage medium 111 onto the computer, the program may also be transferred to the computer from a download site via a digital broadcasting satellite by means of radio transmission or via a network such as a LAN (Local Area Network) or the Internet by means of wire communication. In this case, the computer receives, using a communication unit 108, the program transmitted in the above-described manner and installs the program on the hard disk 105 disposed in the computer.

The computer includes a CPU (Central Processing Unit) 102. The CPU 102 is connected to an input/output interface 110 via a bus 101. If the CPU 102 receives, via the input/output interface 110, a command issued by a user using an input unit 107 including a keyboard, a mouse, microphone, or the like, the CPU 102 executes the a program stored in a ROM (Read Only Memory) 103. Alternatively, the CPU 102 may execute a program loaded in a RAM (Random Access Memory) 104 wherein the program may be loaded into the RAM 104 by transferring a program stored on the hard disk 105 into the RAM 104, or transferring a program which has been installed on the hard disk 105 after being received from a satellite or a network via the communication unit 108, or transferring a program which has been installed on the hard disk 105 after being read from a removable recording medium 111 loaded on a drive 109. By executing the program, the CPU 102 performs the process described above with reference to the flow charts or the block diagrams. The CPU 102 outputs the result of the process, as required, to an output unit 106 including a LCD (Liquid Crystal Display) and/or a speaker via the input/output interface 110. The result of the process may also be transmitted via the communication unit 108 or may be stored on the hard disk 105.

In the present invention, the processing steps described in the program to be executed by a computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote location and may be executed thereby.

The information processing apparatus shown in FIG. 1 may be applied not only to an actual robot but also to a virtual robot such as a character displayed on a display.

Although in the embodiments described above, the HMM, which is one of state transition probability models, is employed as the time-series pattern model 21 (FIG. 5) associated with each node of the auditory SOM and articulate SOM, another state transition probability model may used as the time-series pattern model 21.

A specific example of such a state transition probability model usable as the time-series pattern model 21 is a Bayesian network.

In the Bayesian network, modeling is performed by representing a dependency relationship between variables using a graph structure, and assigning a conditional probability to each node. In this technique, time-series data can be modeled by establishing a state transition model along a time axis.

The graph structure of the Bayesian network may be determined, for example, taking into account the likelihood of learning data and the complexity of the graph structure, and conditional probabilities may be estimated, for example, using the maximum likelihood estimation method or the EM (Expectation Maximization) algorithm. For further details of the Bayesian network, see, for example, "Bayesian networks as representation for uncertainty modeling" (Yoichi Kimura, Tutorial on Bayesian Networks, 2001).

As for the time-series pattern model 21 (FIG. 5), not only a state transition probability model such as a HMM or a Bayesian network may be used as described above, but also a model that approximates a function (hereinafter, referred to as a function approximation model) may also be used.

In a function approximation model, the model is represented by a function $f(\ )$ in the form of a differential equation $\{x(t)\}'=f(x(t))$ or in the form of a difference equation $x(t+1)=f(x(t))$ whereby time-series patterns are characterized by function $f(\ )$, where t denotes time (sampling point), $x(t)$ denotes a sampled value of time-series data at time t or time-series data observed at time t, $\{x(t)\}'$ denotes a first-order differential of time-series data $x(t)$ with respect to time t.

Determining of a function $f(\ )$ that represents a time-series pattern from learning data (time-series data) is referred to as function approximation. A specific example of function approximation is to express function $f(\ )$ using a polynomial and determine coefficients in the polynomial from learning data. Another example is to express function $f(\ )$ using a neural network and determine parameters used in the neural network from learning data.

In function approximation using function $f(\ )$ expressed by a polynomial, coefficients of the polynomial may be determined, for example, using a steepest descent method. In the case of function approximation using function $f(\ )$ expressed by a neural network, parameters of the neural network may be determined, for example, using a back-propagation method. In the back-propagation method, input data and output data are given to th neural network, and parameters of the neural network are leaned so that the relationship between the input data and the output data is satisfied.

For example, when a function approximation model is used as the time-series pattern model 21 to represent a time-series pattern using function $f(\ )$ in the form of a difference equation $x(t+1)=f(x(t))$, a connection weight (an intermediate layer) between an input layer $x(t)$ and an output layer $x(t+1)$ is a parameter of the neural network, and this parameter is learned using learning data (time-series data). The learning of the parameter of the neural network can be performed using the back-propagation method for properly given initial values. As for the neural network, for example, a recurrent neural network may be used.

In the case in which the auditory SOM and the articulate SOM are each composed of nodes each having a time-series pattern model 21 using function f( ) represented by a neural network, it is needed to determine a winner node in the learning of the neural network as in the case in which the time-series pattern model 21 is represented using a HMM, To determine the winner node, it is needed to calculate the score for a acoustic parameter sequence or a articulate parameter sequence given as new time-series data, for each node of the auditory SOM or the articulate SOM.

The score may be defined, for example, by the sum of squares of differences between the observed values (actual values) of the new time-series data and theoretical values of the new time-series data determined from the time-series pattern model 21 using function f( ) represented by the neural network. In this case, a node having the smallest score is determined as the winner node that most matches the new time-series data.

After the winner node is determined, the modification weight for each node is determined. Subsequently, the parameter (of the neural network) associated with each node is modified in a similar manner to a manner in which modification is performed for the time-series pattern model 21 using the HMM.

Note that it is not necessarily needed that time-series pattern models 21 associated with respective nodes should be of the same type for the auditory SOM and the articulate SOM. For example, a HMM may be used as the time-series pattern model 21 for each nodes of the auditory SOM, while a neural network may be used as the time-series pattern model 21 for each node of the articulate SOM.

In the embodiments described above, as described above with reference to FIG. 5, each node of the auditory SOM has the time-series pattern model 21 to represent the time-series pattern and the learning data storage unit 22 to store learning data in the form of time-series data used in the learning of the time-series pattern model 21. However, each node of the auditory SOM does not necessarily need to have the time-series pattern model 21 and the learning data storage unit 22. For example, each node of the auditory SOM may have a simple parameter (a acoustic parameter) as in a conventional self-organization map such as that disclosed in Non-Patent Document 1. When each node of the auditory SOM is realized using a time-series pattern model 21, it is possible to determine a winner node for input time-series data (that is, it is possible to recognize input time-series data) and also it is possible to generate time-series data for an input node label, however when each node of the auditory SOM is realized using a simple parameter (an acoustic parameter) as in the conventional self-organization map, it is only possible to determine a winner node in the auditory SOM for input data with a fixed length and generate data with a fixed length. In other words, it is difficult to determine a winner node for input time-series data with a variable length and it is also difficult to generate time-series data with a variable length. This is also true for the articulate SOM.

In the embodiments described above, a auditory SOM used to recognize voices (synthesized sounds) and a articulate SOM used to generate synthesized sounds are prepared. A speech uttered by a user is recognized using the auditory SOM. A synthesized sound is generated using the articulate SOM, and this synthesized sound is recognized using the auditory SOM. The node connection weights between the auditory SOM and the articulate SOM are modified, that is, the mapping between the auditory SOM and the articulate SOM is established so that a speech uttered by a user can be recognized using the auditory SOM and a synthesized sound similar to this speech recognized using the auditory SOM can be generated using the auditory SOM. Alternatively, mapping may be established between self-organization maps different in type from those described above.

For example, in a robot capable of moving by driving an actuator, a self-organization map used to recognize an image (hereinafter, referred to as a vision SOM) and a self-organization map used to drive the actuator (or used to generate a parameter thereby to drive the actuator) (hereinafter, referred to as a motion SOM) are prepared. The motion of a user is recognized using the vision SOM. The actuator is driven using the motion SOM, and the resultant motion of the robot is recognized using the vision SOM. The mapping between the vision SOM and the motion SOM is established so that motion of the user can be recognized using the vision SOM and motion similar to that recognized using the vision SOM can be created by driving the actuator using the motion SOM. The motion of the robot itself can be recognized using the vision SOM by disposing a mirror at a proper location and observing an image of the robot in the mirror.

In an alternative example of a robot capable of moving by driving an actuator, a auditory SOM and a motion SOM are prepared. A melody of a musical sound created by a user by playing a musical instrument is recognized using the auditory SOM. The actuator is driven using the motion SOM to play a musical instrument, and the resultant melody created by the robot is recognized using the auditory SOM. The mapping between the auditory SOM and the motion SOM is established so that a melody created by the user by playing the musical instrument can be recognized using the auditory SOM and a melody similar to that recognized using the auditory SOM can be created by driving the actuator using the motion SOM.

In this case, in addition to the auditory SOM and the motion SOM, a vision SOM may be further prepared so that the motion of the user to play the musical instrument can be recognized using the vision SOM. In this robot, the mapping between the vision SOM and the motion SOM may be established so that the motion of the robot created by driving the actuator using the motion SOM can be recognized using the vision SOM, and motion of the robot similar to the motion of the user recognized using the vision SOM is created by driving the actuator using the motion SOM. In this robot, a node of the motion SOM having a greatest connection weight with a winner node of the auditory SOM is not necessarily the same as a node of the motion SOM having a greatest connection weight with a winner node of the vision SOM. In such a case, it is needed to determine which node of the motion SOM should be used as a generation node to generate a parameter (a second parameter) used to drive the actuator. For example, the determination may be made such that a node of the motion SOM that is greatest in the sum of the connection weight with the winner node of the auditory SOM and the connection weight with the winner node of the vision SOM is employed as the generation node.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
  a processor and associated computer memory to process a connection network storage means for storing a connection network which includes a first self-organization map and a second self-organization map each including a plurality of nodes and which also includes connection weights indicating connection strengths of nodes between the first self-organization map and the second self-organization map;

first learning means for learning the first self-organization map, based on a first parameter extracted from an observed value output by observation means that observes an external world and outputs the observed value;

winner node determination means for detecting a node having highest likelihood that the first parameter is observed at the node in the first self-organization map and determining the detected node as a winner node;

searching means for searching the second self-organization map for a node having highest connection strength with the winner node and employing the detected node as a generation node;

parameter generation means for generating a second parameter from the generation node;

modification means for modifying the second parameter generated from the generation node;

determination means for determining whether an end condition is satisfied to end modification of the second parameter, the modification being performed in accordance with the winner node determined for a value which is observed by the observation means when driving means performs a driving operation in accordance with the second parameter;

first connection weight modification means for modifying the connection weight when the end condition is satisfied;

second connection weight modification means for modifying the connection weight when evaluation by a user on the result of driving performed by the driving means is given as a reward by the user; and second learning means for learning the second self-organization map based on the second parameter obtained when the end condition is satisfied.

2. The information processing apparatus according to claim 1, wherein the reward is a positive reward or a negative reward; and the second connection weight modification means performs the modification such that the connection weight is increased when the positive reward is given by the user, while the connection weight is decreased when the negative reward is given by the user.

3. The information processing apparatus according to claim 2, wherein the second connection weight modification means modifies the connection weight such that the ratio of increasing or decreasing the connection weight by the second connection weight modification means is greater than the ratio of increasing or decreasing the connection weight by the first connection weight modification means.

4. The information processing apparatus according to claim 2, wherein the second connection weight modification means modifies by the connection weight by changing the ratio of increasing or decreasing the connection weight, depending on the number of times the connection weight has been modified.

5. An information processing method comprising the steps of:

based on a first parameter extracted from an observed value output by observation means that observes an external world and outputs the observed value, learning a first self-organization map stored in connection network storage means that stores a connection network which includes a first self-organization map and second self-organization map each including a plurality of nodes and which also includes connection weights indicating connection strengths of nodes between the first self-organization map and the second self-organization map;

determining a winner node by detecting a node having highest likelihood that the first parameter is observed at the node in the first self-organization map and determining the detected node as the winner node;

searching the second self-organization map for a node having highest connection strength with the winner node and employing the detected node as a generation node;

generating a second parameter from the generation node;

modifying the second parameter generated from the generation node;

determining whether an end condition is satisfied to end modification of the second parameter, the modification being performed in accordance with the winner node determined for a value which is observed by the observation means when driving means performs a driving operation in accordance with the second parameter;

modifying the connection weight when the end condition is satisfied;

modifying the connection weight when evaluation by a user on the result of driving performed by the driving means is given as a reward by the user; and learning the second self-organization map based on the second parameter obtained when the end condition is satisfied.

6. A program to be executed by a computer embodied on a computer readable medium, the program comprising the steps of:

based on a first parameter extracted from an observed value output by observation means that observes an external world and outputs the observed value, learning a first self-organization map stored in connection network storage means that stores a connection network which includes a first self-organization map and second self-organization map each including a plurality of nodes and which also includes connection weights indicating connection strengths of nodes between the first self-organization map and the second self-organization map;

determining a winner node by detecting a node having highest likelihood that the first parameter is observed at the node in the first self-organization map and determining the detected node as the winner node;

searching the second self-organization map for a node having highest connection strength with the winner node and employing the detected node as a generation node;

generating a second parameter from the generation node;

modifying the second parameter generated from the generation node;

determining whether an end condition is satisfied to end modification of the second parameter, the modification being performed in accordance with the winner node determined for a value which is observed by the observation means when driving means performs a driving operation in accordance with the second parameter;

modifying the connection weight when the end condition is satisfied;

modifying the connection weight when evaluation by a user on the result of driving performed by the driving means is given as a reward by the user; and learning the second self-organization map based on the second parameter obtained when the end condition is satisfied.

7. An information processing apparatus comprising:

a connection network storage unit that stores a connection network which includes a first self-organization map and a second self-organization map each including a plurality of nodes and which also includes connection weights indicating connection strengths of nodes between the first self-organization map and the second self-organization map;

a first learning unit that learns the first self-organization map, based on a first parameter extracted from an observed value output by an observation unit that observes an external world and outputs the observed value;

a winner node determination unit that detects a node having highest likelihood that the first parameter is observed at the node in the first self-organization map and determines the detected node as a winner node;

a searching unit that searches the second self-organization map for a node having highest connection strength with the winner node and employs the detected node as a generation node;

a parameter generation unit that generates a second parameter from the generation node;

a modification unit that modifies the second parameter generated from the generation node;

a determination unit that determines whether an end condition is satisfied to end modification of the second parameter, the modification being performed in accordance with the winner node determined for a value which is observed by the observation unit when a driving unit performs a driving operation in accordance with the second parameter;

a first connection weight modification unit that modifies the connection weight when the end condition is satisfied;

a second connection weight modification unit that modifies the connection weight when evaluation by a user on the result of driving performed by the driving unit is given as a reward by the user; and a second learning unit that learns the second self-organization map based on the second parameter obtained when the end condition is satisfied.

* * * * *